US012617131B2

(12) United States Patent (10) Patent No.: US 12,617,131 B2
Lamb et al. (45) **Date of Patent: *May 5, 2026**

(54) CONTINUOUS ROLL MOLDING SYSTEM AND METHOD; FRANGIBLE CAP STRIP AND METHOD OF MAKING USING CONTINUOUS ROLL MOLDING

(71) Applicant: PNEU-TOOLS, INC., Arlington, TN (US)

(72) Inventors: Frederick William Lamb, McDonald, PA (US); Frederick William Lamb, II, Canonsburg, PA (US)

(73) Assignee: Pneu-Tools, Inc., Arlington, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/032,965

(22) Filed: Jan. 21, 2025

(65) Prior Publication Data

US 2025/0162211 A1     May 22, 2025

Related U.S. Application Data

(63) Continuation of application No. 18/613,927, filed on Mar. 22, 2024.

(Continued)

(51) Int. Cl.
 *B29C 43/46*        (2006.01)
 *B29C 43/24*        (2006.01)
 (Continued)

(52) U.S. Cl.
 CPC .............. *B29C 43/46* (2013.01); *B29C 43/24* (2013.01); *B29C 43/52* (2013.01);
 (Continued)

(58) Field of Classification Search
 CPC .............. B29C 43/46; B29C 2043/463; B29C 2043/464; B29C 2043/465;
 (Continued)

(56) References Cited

U.S. PATENT DOCUMENTS 2,366,510 A * 1/1945 Frank ...................... F16B 19/06
                                                             206/820
3,221,584 A * 12/1965 Novick ................... B31B 70/83
                                                             392/413

(Continued)

FOREIGN PATENT DOCUMENTS

DE          9411222 U1      3/1994
DE     102006043732 A1      3/2008
WO       WO 99/39878 A1     8/1999

OTHER PUBLICATIONS

International Search Report and Written Opinion for PCT/US24/21195 dated Jul. 24, 2024.

*Primary Examiner* — Jeffrey M Wollschlager
(74) *Attorney, Agent, or Firm* — Reed Smith LLP; Matthew P. Frederick; Cheryl L. Gastineau

(57)                ABSTRACT

A continuous roll molding system and method are provided. The system and method may be for manufacturing parts and may include conveying a thermoplastic material through a sheet die to form a thermoplastic sheet material, conveying the thermoplastic sheet material through a calendering system, and conveying the thermoplastic sheet material through a continuous roll molder to form the thermoplastic sheet material into parts. Parts formed by the continuous roll molding system and method may include frangible cap strips.

17 Claims, 66 Drawing Sheets

Related U.S. Application Data

(60) Provisional application No. 63/454,239, filed on Mar. 23, 2023.

(51) Int. Cl.
B29C 43/52 (2006.01)
B29K 23/00 (2006.01)
B29K 509/00 (2006.01)

(52) U.S. Cl.
CPC *B29C 2043/464* (2013.01); *B29C 2793/0045* (2013.01); *B29K 2023/065* (2013.01); *B29K 2509/00* (2013.01); *B29K 2905/12* (2013.01)

(58) Field of Classification Search
CPC .............. B29C 2043/467; B29C 43/52; B29C 2043/522; B29C 43/58; B29C 2043/5816; B29C 2793/0045; B29C 51/22; B29C 51/225; B29C 51/24; B29C 51/32; B29C 51/44; B29C 51/445; B29C 51/42; B29C 48/35; B29C 48/0011; B29C 48/0017; B29C 48/0022
See application file for complete search history.

(56) References Cited

U.S. PATENT DOCUMENTS

| | | | | | |
|---|---|---|---|---|---|
| 3,479,695 | A | * | 11/1969 | Fischbach | B29C 45/706 164/343 |
| 3,518,334 | A | * | 6/1970 | Maclam | B26F 1/40 425/384 |
| 3,743,087 | A | | 7/1973 | Wise | |
| 3,905,475 | A | | 9/1975 | Pritulsky et al. | |
| 4,024,747 | A | | 5/1977 | Bergmann et al. | |
| 4,341,303 | A | | 7/1982 | Britt | |
| 4,420,300 | A | * | 12/1983 | Winstead | B29C 51/24 425/149 |
| 4,615,672 | A | * | 10/1986 | Smith | A21C 3/02 425/315 |
| 5,451,356 | A | * | 9/1995 | Hebert | B29C 51/32 264/321 |
| 5,750,645 | A | * | 5/1998 | Huang | B29C 43/24 524/427 |
| 5,931,622 | A | * | 8/1999 | Gupta | F16B 15/08 411/443 |
| 6,010,291 | A | | 1/2000 | Schwingle | |
| 6,145,725 | A | * | 11/2000 | Omli | B25C 5/1693 227/18 |
| 6,478,209 | B1 | | 11/2002 | Bruins et al. | |
| 6,779,700 | B2 | | 8/2004 | Bruins et al. | |
| 6,779,958 | B2 | | 8/2004 | Rosenbaum | |
| 6,968,945 | B2 | | 11/2005 | Bruins et al. | |
| 7,207,095 | B2 | * | 4/2007 | Bruins | F16B 15/08 206/343 |
| 7,232,050 | B2 | | 6/2007 | Omli | |
| 7,344,058 | B2 | | 3/2008 | Bruins et al. | |
| 7,481,346 | B2 | | 1/2009 | Vanden Berg et al. | |
| 7,506,789 | B2 | | 3/2009 | Shor | |
| 7,530,483 | B2 | | 5/2009 | Bruins et al. | |
| 7,628,305 | B2 | | 12/2009 | Vanden Berg et al. | |
| 7,699,202 | B2 | | 4/2010 | Shor | |
| 8,047,366 | B2 | | 11/2011 | Nakagawa et al. | |
| 8,251,273 | B2 | | 8/2012 | Shor | |
| 8,721,244 | B2 | | 5/2014 | Nakagawa et al. | |
| 8,985,927 | B2 | | 3/2015 | Ashton et al. | |
| 2003/0024424 | A1 | * | 2/2003 | Pasman | B26D 7/2635 101/226 |
| 2003/0057248 | A1 | | 3/2003 | Bruins et al. | |
| 2004/0118719 | A1 | * | 6/2004 | Powers | F16B 43/00 206/338 |
| 2004/0118720 | A1 | * | 6/2004 | Powers | F16B 43/00 206/346 |
| 2004/0208947 | A1 | | 10/2004 | Parrinello | |
| 2005/0265807 | A1 | * | 12/2005 | Bruins | F16B 15/08 411/480 |
| 2008/0111275 | A1 | * | 5/2008 | Kline | B29C 43/305 425/515 |
| 2008/0317563 | A1 | * | 12/2008 | Shida | F16B 15/08 411/443 |
| 2009/0050664 | A1 | | 2/2009 | Henza | |
| 2010/0032076 | A1 | | 2/2010 | Turney et al. | |
| 2013/0193182 | A1 | | 8/2013 | Chien | |
| 2013/0259602 | A1 | | 10/2013 | Yao | |
| 2013/0259603 | A1 | | 10/2013 | Yao | |
| 2013/0259605 | A1 | | 10/2013 | Yao | |
| 2015/0322995 | A1 | | 11/2015 | Omil | |
| 2018/0163406 | A1 | | 6/2018 | Omli et al. | |
| 2019/0061410 | A1 | | 2/2019 | Burlingame et al. | |
| 2022/0333635 | A1 | * | 10/2022 | Colyn | B25C 7/00 |
| 2024/0240665 | A1 | * | 7/2024 | Omli | F16B 43/00 |

* cited by examiner

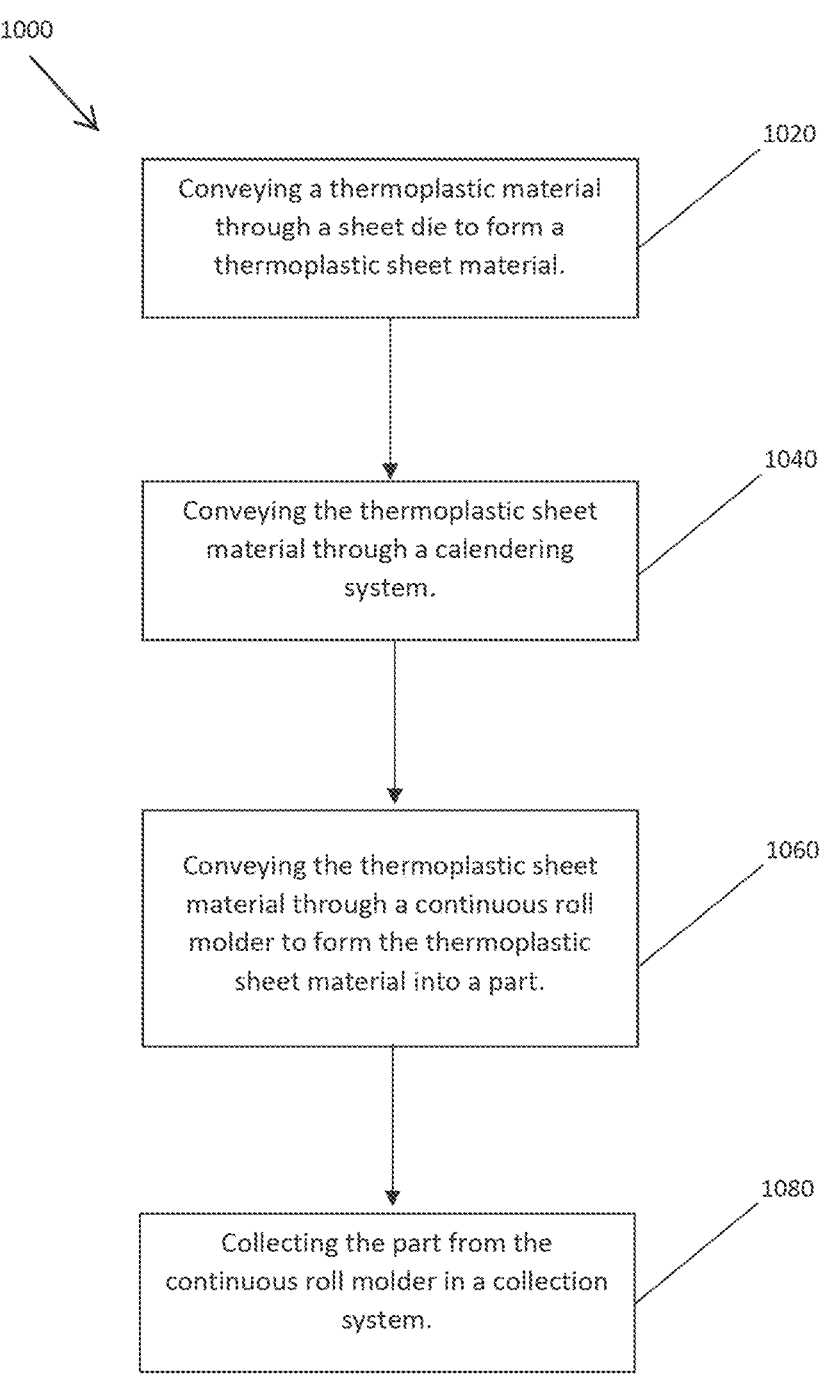

1000

1020

Conveying a thermoplastic material through a sheet die to form a thermoplastic sheet material.

1040

Conveying the thermoplastic sheet material through a calendering system.

1060

Conveying the thermoplastic sheet material through a continuous roll molder to form the thermoplastic sheet material into a part.

1080

Collecting the part from the continuous roll molder in a collection system.

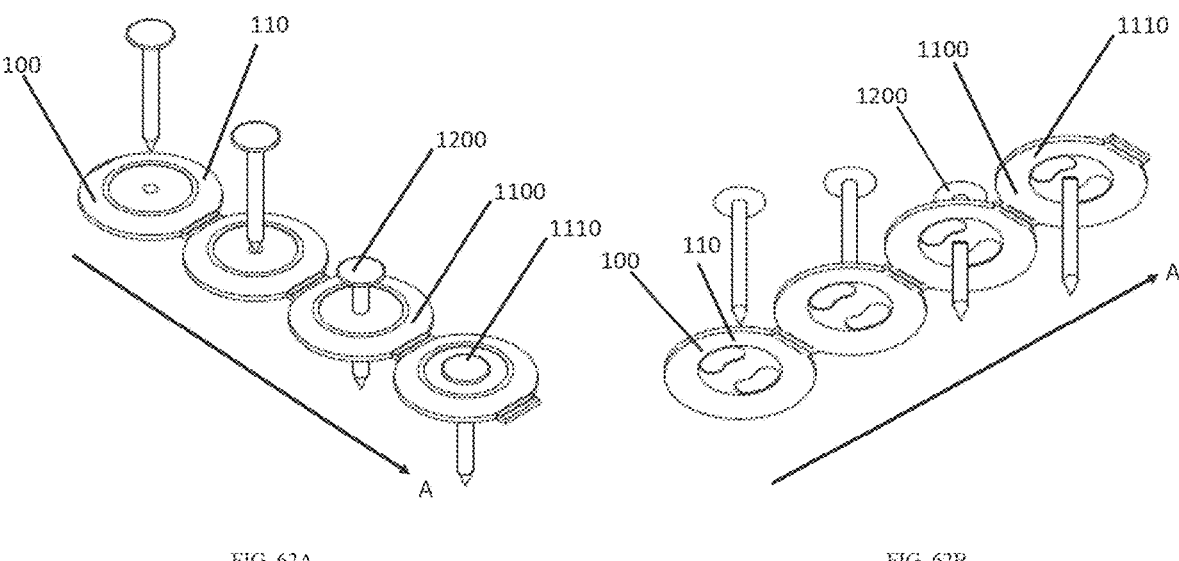
FIG. 62A                    FIG. 62B

CONTINUOUS ROLL MOLDING SYSTEM AND METHOD; FRANGIBLE CAP STRIP AND METHOD OF MAKING USING CONTINUOUS ROLL MOLDING

CROSS-REFERENCE TO RELATED APPLICATIONS

This application is a continuation of U.S. patent application Ser. No. 18/613,927 filed Mar. 22, 2024, which claims the benefit of U.S. Provisional Application No. 63/454,239, filed Mar. 23, 2023, each of which is incorporated herein in their entirety by this reference.

FIELD

Embodiments of the present invention relate to a system and method for manufacturing parts using continuous roll molding.

BACKGROUND

Parts, such as plastic or metal consumer products, may be made using various manufacturing methods. Injection molding is one method that produces parts by heating material to beyond its melting point and adding molten material into a mold shaped to form the particular part. The material is then cooled to allow for part removal from the mold.

Examples of parts that may be formed by manipulating plastic or metal include fasteners for securing materials to a work surface, such as staples having legs. The fasteners may beneficially protect the surface from damage while allowing the nail to secure the material to the surface. Such fasteners may be generally circular caps made from metal or plastic. Each cap may receive the legs of the nail and surround the legs as the nail is engaged with a surface. Cap feeders are powered tools that drive nails through caps to secure a material to a surface.

SUMMARY

Embodiments provide a method of forming a strip of frangibly connected parts. The method may include providing a thermoplastic material and conveying the thermoplastic material through a continuous roll molder including a first roller and an opposing second roller. The first roller may have a circumference, and further may have a first series of first shapes arranged around the circumference of the first roller. The second mold may have a circumference, and further may have a second series of second shapes arranged around the circumference of the second roller. The rollers may be configured so that the first series of first shapes opposes the second series of second shapes to form the strip of frangibly connected parts comprising a three dimensional shape on both sides of the strip of frangibly connected parts. A first shape of the first roller and a corresponding second shape of the second roller may be configured to form a first part of the strip of frangibly connected parts. At least one of the first shapes and the second shapes may have a projection portion projecting radially from the circumference of the respective first and second roller and is configured for imparting a three-dimensional shape on a surface of one of the parts of the strip of frangibly connected parts. The first shapes further may have knives at least partially surrounding the projection portion and configured to cut the thermoplastic sheet material, and the second shapes further may have anvil surfaces against which the knives of the first mold are configured to cut against. The method may further include one or more channels configured to receive a temperature-controlled fluid of the temperature control system; forming a frangible zone between adjacent parts of the strip of frangibly connected parts utilizing the knives and anvil surfaces; cutting the thermoplastic sheet material into the strip of frangibly connected parts utilizing the knives and anvil surfaces; and separating the strip of frangibly connected parts from a waste thermoplastic sheet material such that the strip of frangibly connected parts and the waste thermoplastic sheet material are separated after release from the continuous roll molder.

In some embodiments, providing a thermoplastic sheet material may include conveying a thermoplastic material through a sheet die to form a thermoplastic sheet material, the thermoplastic sheet material comprising a first surface, a second surface, and an intermediate portion disposed between the first surface and the second surface.

In some embodiments, the thermoplastic sheet material may include a single layer.

In some embodiments, the method may further include between conveying the thermoplastic sheet material through the sheet die to form a thermoplastic sheet material and conveying the thermoplastic sheet material through the continuous roll molder: conveying the thermoplastic sheet material through a calendering system configured to reduce a temperature of the first surface and the second surface when conveying the thermoplastic sheet material through the calendering system.

In some embodiments, the continuous roll molder may include a bar and a nip roller, the bar configured to receive the frangibly connected parts being conveyed along a first stream released from the knives, and the nip roller configured to receive the waste thermoplastic sheet material being conveyed along a second stream released from the anvil surfaces.

In some embodiments, the first stream and the second stream may be angled away from one another, an angle between the first stream and the second stream being an obtuse angle.

In some embodiments, the gap may have a distance of approximately five microns.

In some embodiments, the thermoplastic material may include high density polyethylene and calcium carbonate.

In some embodiments, the thermoplastic material may include between about 20% and about 30% calcium carbonate by weight.

In some embodiments, the method may further include wherein the strip of frangibly connected parts comprises a frangible cap strip comprising: a plurality of fastening caps arranged consecutively along the frangible cap strip, the fastening caps being spaced from one another; a plurality of frangible tabs, each of the frangible tabs configured to join adjacent fastening caps and to extend along a first axis extending through a center of each of the fastening caps along the frangible cap strip, each of the frangible tabs comprising: a frangible zone comprising a divot, the divot being closer along the first axis to a first one of a pair of adjacent fastening caps than to a second one of the pair of adjacent fastening caps; a first tab portion formed between the divot and the first one of the pair of adjacent fastening caps; and a second tab portion formed between the divot and the second one of the pair of adjacent fastening caps.

In some embodiments, the frangible zone further may include a depression and a shear line, wherein the divot is disposed at the shear line, and wherein the depression is disposed at the second tab portion.

In some embodiments, the depression of each of the frangible tabs may extend below a medial plane defined by a bottom side of each of the fastening caps.

In some embodiments, the depression of each of the frangible tabs may be substantially T-shaped.

In some embodiments, the method may further include wherein the second tab portion is configured to form a hinge configured to increase compression, and prevent inversion of the fastening cap from overshooting or overpressing the fastening cap down onto a working surface.

In some embodiments, the frangible zone may include a thermoplastic material having a molecular alignment, and wherein the molecular alignment is in a general direction of the first axis.

In some embodiments, the method does not include injection molding.

In some embodiments, the method may further include wherein each of the fastening caps may include a top side and a bottom side opposing the top side, each of the bottom sides may include at least one depression, and wherein the at least one depression may include at least one of a kidney shape and a circular shape.

BRIEF DESCRIPTION OF THE DRAWINGS

The disclosed embodiments will hereinafter be described in conjunction with the appended drawings, provided to illustrate and not to limit the disclosed embodiments, wherein like designations denote like elements.

FIG. 1 shows a method of producing a part by continuous roll molding according to various embodiments.

FIG. 42 shows a side cross-section view of the upper continuous roll mold and the lower continuous roll molder of FIG. 16 along line 42-42.

FIG. 62A shows a top perspective view of a nail cap strip according to various embodiments.

FIG. 62B shows a bottom perspective view of the nail cap strip of FIG. 62A.

DETAILED DESCRIPTION

Figure 2:
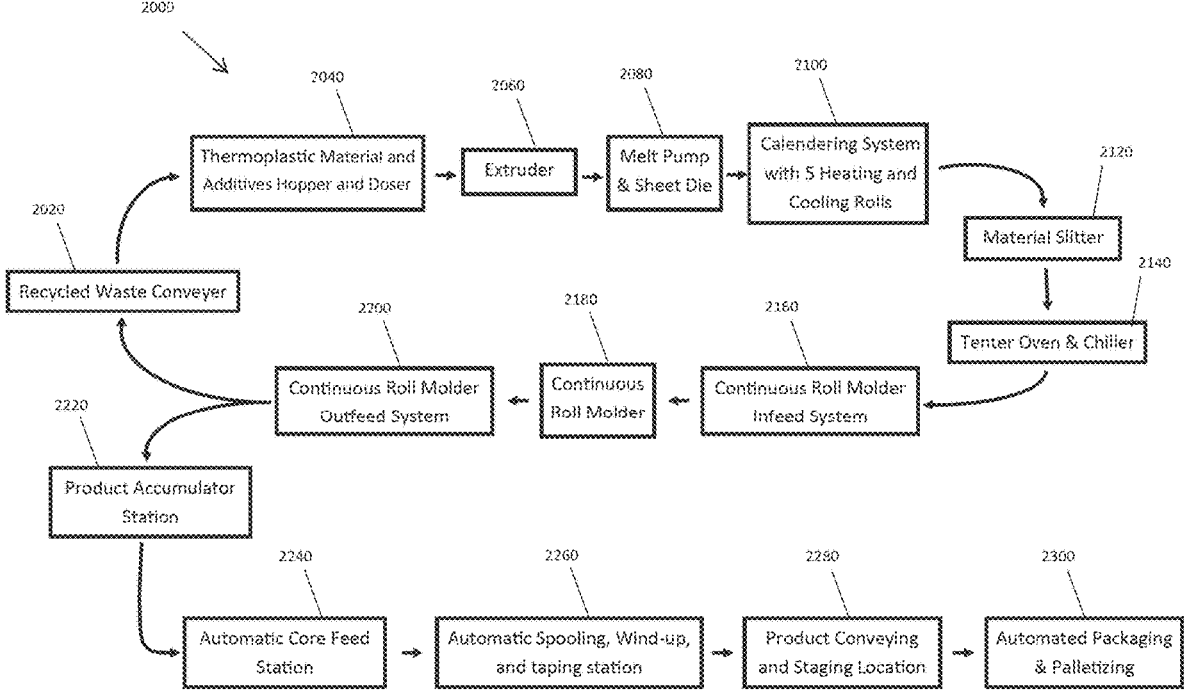
FIG. 2 shows a method of producing a part by the continuous roll molding of FIG. 1.

Various embodiments of the novel systems, apparatuses, and methods disclosed herein are described more fully hereinafter with reference to the accompanying drawings. This disclosure may, however, be embodied in many different forms and should not be construed as limited to any specific structure or function presented throughout this disclosure. Rather, these embodiments are provided so that this disclosure will be thorough and will fully convey the scope of the disclosure to those skilled in the art. Based on the teachings herein, one skilled in the art would appreciate that the scope of the disclosure may be intended to cover any embodiment of the novel systems, apparatuses, and methods disclosed herein, whether implemented independently of, or combined with, any other embodiment of the disclosure. For example, an apparatus may be implemented or a method may be practiced using any number of the embodiments set forth herein. In addition, the scope of the disclosure may be intended to cover such an apparatus or method that may be practiced using other structure, functionality, or structure and functionality in addition to or other than the various embodiments of the disclosure set forth herein. It should be understood that any embodiment disclosed herein may be implemented by one or more elements of a claim.

Although particular embodiments are described herein, many variations and permutations of these embodiments fall within the scope of the disclosure. Although some benefits and advantages of certain embodiments are mentioned, the scope of the disclosure is not intended to be limited to particular benefits, uses, and/or objectives. The detailed description and drawings are merely illustrative of the disclosure rather than limiting, the scope of the disclosure being defined by the appended claims and equivalents thereof.

It will be recognized that while certain embodiments of the disclosure are described in terms of a specific sequence of steps of a method, these descriptions are only illustrative of the broader methods of the disclosure, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the disclosure disclosed and claimed herein.

While the disclosure has been illustrated and described in detail in the drawings and foregoing description, such illustration and description are to be considered illustrative or exemplary and not restrictive. The disclosure is not limited to the disclosed embodiments. Variations to the disclosed embodiments and/or implementations may be understood and effected by those skilled in the art in practicing the claimed disclosure, from a study of the drawings, the disclosure and the appended claims.

The systems and methods described herein are for improved manufacturing of parts. In some embodiments, the parts are made from thermoplastics. In still further embodiments, the parts include thermoplastic parts molded from a thermoplastic sheet. In other embodiments, the thermoplastic parts have certain 3-dimensional features. In some embodiments, the parts include a frangible cap strip. In certain embodiments, the manufacturing process may be a continuous roll molding process that may include conveying a thermoplastic material through a sheet die to form a thermoplastic sheet material, conveying the thermoplastic sheet material through a calendering system, and then conveying the thermoplastic sheet material through a continuous roll molder to form the thermoplastic sheet material into a part. In certain embodiments, the continuous roll molding process may include conveying the thermoplastic sheet material through a continuous roll molder to form the thermoplastic sheet material into a part, the thermoplastic sheet material being spooled, or otherwise stored, before being conveyed through the continuous roll molder.

Some systems and methods for producing parts may utilize injection molding and other more complex part capable processes. In certain embodiments, the manufacturing process according to embodiments of this disclosure provides improved systems and methods for producing parts, such as a frangible cap strip that may be more easily sheared. In additional embodiments, the continuous roll molding process may allow for dimensionally complex engineered part production. As described, embodiments of continuous roll molding may use a combination of material temperature, material handling, pressure, line speed, die shapes, and macromolecular flow directions to achieve high-speed production of dimensionally complex thermoplastic parts. Continuous roll molding may also have an even flow of parts constantly being produced at high speeds on multiple continuous roll molds through which thermoplastic material is conveyed, as described herein.

The frangible cap strip described herein may include a plurality of caps arranged consecutively along the frangible cap strip. The frangible cap strip may also include a plurality of frangible tabs, each of the frangible tabs configured to join adjacent fastening caps. Each frangible tab may be sheared more easily to allow for release of a cap from the frangible cap strip.

The systems and methods described herein will now be described with reference to the figures. The continuous roll mold system and method will be described first with reference to FIGS. 1-44 and 65. Manufacturing a frangible cap strip product by the continuous roll molding system and method will then be described with reference to FIGS. 1-50 and 65. The frangible cap strip product is described with reference to FIGS. 51-64.

The Continuous Roll Molding System and Method

FIG. 1 shows a continuous roll molding method 1000 of producing a part according to various embodiments. In step 1020, method 1000 may include conveying a thermoplastic material through a sheet die to form a thermoplastic sheet material 300. The thermoplastic material may be raw thermoplastic material, (e.g., thermoplastic material that has not been processed) or recycled thermoplastic material. In some embodiments, the continuous roll molding process may include the use of up to 100% recycled thermoplastic material in the process, such as between about 30% recycled thermoplastic material and about 100% recycled thermoplastic material, such as between about 40% recycled thermoplastic material and about 60% recycled thermoplastic material, such as about 50% recycled thermoplastic material. In contrast, injection molding may require a certain amount of raw plastic material (e.g., previously unused plastic) to be present so that there is part consistency. As used herein, unless specified otherwise, thermoplastic "raw material" may mean virgin material, recycled material, and combinations thereof.

The thermoplastic material may be formed into a sheet during the continuous roll molding method 1000. The thermoplastic material may be formed into other shapes or profiles instead of sheet structures. For example, the thermoplastic material may form shapes or profiles having rod, square, or rectangle cross-sections, etc.

Other embodiments include two or more thermoplastics of the same material being coextruded at different temperatures to assist in the flow of the thermoplastic sheet material 300 through the continuous roller molds of the continuous roll molder at different rates for part formation. The coextruded thermoplastic material at two different temperatures allows for the material above the melt temperature on the top of the sheet to flow more quickly and mold more rapidly in the continuous roller molds, where the mold cavities have greater depth and more volume to fill than the molds on the other side of the sheet. This allows for the mold with more volume needed in it to fill at the same rate of speed as the one below.

In certain embodiments, the sheet material passes through the continuous roller molds at a speed of about 30 to about 1,000 linear feet per minute (min), such as about 40 to about 500 linear feet per min, such as about 50 to about 200 linear feet per minute, such as about 100 linear feet per min.

In some embodiments, before step 1020, method 1000 may include inserting raw thermoplastic material into a hopper to mix and dose the raw thermoplastic material into the extruder, and conveying the thermoplastic material through an extruder by an extruder screw to the sheet die.

In other embodiments, before step 1020, method 1000 may include inserting recycled material into a hopper configured to mix and dose the recycled material into an extruder, and conveying the thermoplastic material through an extruder by an extruder screw to a sheet die. The recycled material may be ground for re-use and mixed with colorants, any additives, and raw material in a hopper for mixing and dosing into the extruder.

In some embodiments, before step 1020, method 1000 may include adding additives to the thermoplastic material. Colorant may be the primary additive, along with ultraviolet radiation (UV) protection additives. In some embodiments, secondary additives may be added, such as talc and calcium, which may increase the rigidity of the thermoplastic material, and facilitate shearing. For example, talc increases rigidity, and decreases shear strength, while calcium increases the impact strength of the thermoplastic material. In some embodiments, processing additives may be added to improve material flow. In some embodiments, stabilizers may be added to raw thermoplastic material to help prevent material degradation.

As will be discussed further below, thermoplastic sheet material 300 may include high density polyethylene (HDPE). In some embodiments, the thermoplastic material includes HDPE, and the HDPE includes calcium carbonate added to the HDPE. In one embodiment, a mixture of HDPE and calcium carbonate to form thermoplastic sheet material 300 may include between about 20% and about 30% calcium carbonate by weight. The addition of calcium carbonate may allow for thermoplastic sheet material 300 to be introduced to the continuous roll molding process at an ambient temperature, without requiring heating or cooling.

Calcium carbonate may have a rounded structure, which may improve flow of thermoplastic sheet material 300 while maintaining shape and rigidity for part formation. In one embodiment, the HDPE may have a density of 0.955 grams per centimeters cubed, a melt mass-flow rate of 0.35 grams per 10 minutes, an environmental stress-cracking resistance of 25.0 hour, a tensile modulus of 185000 pound per square inch, a tensile strength of 4000 pound per square inch, and a tensile elongation of greater than 500%. In one embodiment, the calcium carbonate may have a melt index of 2 grams per 10 minutes, a density of 1.95 gram per cubic centimeter, a moisture of less than 1000 parts per million, and a particle size of 3 micron.

In step 1040, method 1000 may include conveying thermoplastic sheet material 300 through a calendering system. In step 1060, method 1000 may include conveying thermoplastic sheet material 300 through a continuous roll molder. In step 1080, method 1000 may include collecting the part from the continuous roll molder in a collection system. In some embodiments, the continuous roll molder may include one or more molds to form the thermoplastic sheet material into the part.

In one embodiment, continuous roll molder may make one or more strips of parts from thermoplastic sheet material 300, or any other material. In some embodiments, the parts may be separated by frangible zones to allow for separation of parts from one another. In another embodiment, the parts may be cut by a cutting machine before or after conveyance through the continuous roll molder. In another embodiment, the parts may be cut by the continuous roll molder and collected.

As will be discussed, the continuous roll molder may include one or more molds, such as an upper mold and a lower mold, between which the thermoplastic sheet material 300, or any other material, is conveyed. At least one of the molds may include a knife, or sharp edge, for cutting parts. For example, the upper mold may include a series of shapes, each shape having knives, such as a sharp edge on either end of the shape. The lower mold may also include a series of shapes, each shape forming at least part of an anvil surface upon which the knives cut parts. The upper mold and the lower mold may rotate towards one other during the continuous roll molding process, allowing the upper mold shapes and the lower mold shapes to roll towards one another, a pair of one upper mold shape and one lower mold shape contacting the material at substantially the same time to form a part. The cutting process may include kiss cutting, in which the upper mold knives cut the part by landing on the same plane as the surfaces of the lower mold shape. In this way, the overall shape of the part may be imparted onto the material. Another cutting process may be implemented and may include crush cutting, in which the knives fully lower into or beyond surfaces of the lower mold shape. The crush cutting may cut and compress the material to form parts.

In some embodiments, the molds may cut openings in the parts. In some embodiments, the parts do not have any openings and are devoid of openings. The molds may cut create one or more shapes on the parts, such as a shape surrounded by a frangible zone to be removed in a larger process. The parts, after cutting, may be separated from waste material by the molds. After cutting, the parts may be coupled to the molds, allowing release of waste material. Downstream of the molds, one or more components may provide tension to release parts and waste material from the molds along separate streams. The parts may continue along a stream separate from a stream of waste material. In this way, parts are formed without residual waste coupled to parts. The components for creating the separate streams may include nip rollers or bars.

FIG. 2 includes a more detailed embodiment of FIG. 1, and embodiments of the invention herein may include some or all of the steps shown in FIG. 1 or FIG. 2. FIG. 2 includes a continuous roll molding method 2000 of producing a part according to various embodiments. In step 2020, method 2000 may include conveying waste from a continuous roll molding process for recycling in a subsequent continuous roll molding process. In step 2040, method 2000 may include inserting the recycled thermoplastic material and additives into a hopper that mixes and doses the thermoplastic material in set amounts. In step 2060, method 2000 may include conveying the thermoplastic material down into the throat of the extruder and through the extruder. In step

2080, method 2000 may include pushing the thermoplastic material through a screen filter and into a melt pump. The melt pump may transfer and regulate the flow of the thermoplastic material from the extruder to a temperature-controlled sheet die, through which the thermoplastic material may be conveyed to form thermoplastic sheet material 300 (e.g., FIG. 3A). The extruder may have varying degrees of backpressure (e.g., due to the rotation of the extruder screw) that may affect the consistency of thermoplastic sheet material 300 being formed out of the sheet die. Accordingly, the melt pump may cause the thermoplastic material to flow more evenly into the sheet die, therefore producing more even sheet flow, as the pressure it produces on the thermoplastic material flowing through the sheet die may be more even.

In step 2100, method 2000 may include conveying thermoplastic sheet material 300 through a calendering system with one or more temperature-controlled rolls. In one embodiment, the calendering system may include five heating and cooling nip rollers. In step 2120, method 2000 may include conveying thermoplastic sheet material 300 through a material slitter to trim and even edges of thermoplastic sheet material 300 before entering the continuous roll molder. In step 2140, method 2000 may include conveying thermoplastic sheet material 300 through a secondary heating or cooling system to be heated and/or cooled, respectively. In some embodiments, thermoplastic sheet material 300 may be heated in a tenter oven. In some embodiments, thermoplastic sheet material 300 may be cooled by a chiller.

In step 2160, method 2000 may include conveying thermoplastic sheet material 300 through a continuous roll molder infeed system, which may feed thermoplastic sheet material 300 to a continuous roll molder. In some embodiments, the infeed system may be a conveyor that leads thermoplastic sheet material 300 to the continuous roll molder.

In step 2180, method 2000 may include conveying thermoplastic sheet material 300 through a continuous roll molder, which may intake thermoplastic sheet material 300 from the continuous roll molder infeed system from step 2160.

In step 2200, method 2000 may include conveying thermoplastic sheet material 300 through a continuous roll molder outfeed system. The outfeed system may output parts molded by the continuous roll molder from step 2180. In some embodiments, the outfeed system may be a conveyor that leads parts away from the continuous roll molder from step 2180.

In step 2220, method 2000 may include collecting parts from the continuous roll molder outfeed system from step 2200. Additionally or alternatively, parts may be collected from an exit stream of parts from the continuous roll molder. The parts may be guided away from the continuous roll molder along a stream separate from a stream of waste thermoplastic sheet material. These exit streams will be discussed further below with reference to FIGS. 35-40.

In another embodiment, parts may be collected at a product accumulator station. In some embodiments, the product accumulator station may be a vertical accumulation station for handling multiple lanes containing roller bars that lift up and lower down on an elevator. Continuous strands of parts or discrete parts may be weaved through the roller bars of the product accumulation station. The product accumulation station may balance the speed differences in the production line and the accumulation processing of the parts, creating a time delay and a time buffer that supports the intermittent process of spooling continuous strands of parts.

In step 2240, method 2000 may include conveying parts through an automatic core feed station. In some embodiments, the automatic core feed station may pull a continuous strands of parts from the product accumulator station in step 2220. In some embodiments, the automatic core feed station may then convey continuous strands of parts for spooling, wind-up, and taping in step 2260 via a track that runs down to a position in line with the spooling station.

In step 2260, method 2000 may include conveying parts through an automatic spooling, wind-up, and taping station. The parts may be lowered onto a spool from a track above, pinched onto the spool, and rotated. In some embodiments, parts may go to a winding station, where they are spun onto cores, counted, cut, sealed, and ejected as a finished spool for packaging. This spooler may act not only to spool the parts, but also acts to add a few last elements to the product. In certain embodiments, the speed of the spooler may be set higher than the continuous roll molder, the spooler acting to stretch out frangible elements of parts, thinning them further to reduce the shear pressure needed to cut them. In other embodiments, the spooler may be set to a speed slower than the continuous roll molder, the spooler acting to thicken frangible elements to increase the shear pressure needed to cut them. Accordingly, this spooler may be used to adjust the shear properties of frangible elements of parts. An end of the parts may be cut and taped to the spool.

In step 2280, method 2000 may include conveying parts through a staging location. The staging location may receive and setup spools of parts for packaging and palletizing in step 2300. In some embodiments, a staging table may have a pick and place robot to lift the spools and place them in a box. In certain embodiments, the robot includes visual sensors.

In step 2300, method 2000 may include conveying parts for automated packaging and palletizing. In some embodiments, spools of parts may be packaged together and secured to pallets for transportation.

Figure 65:
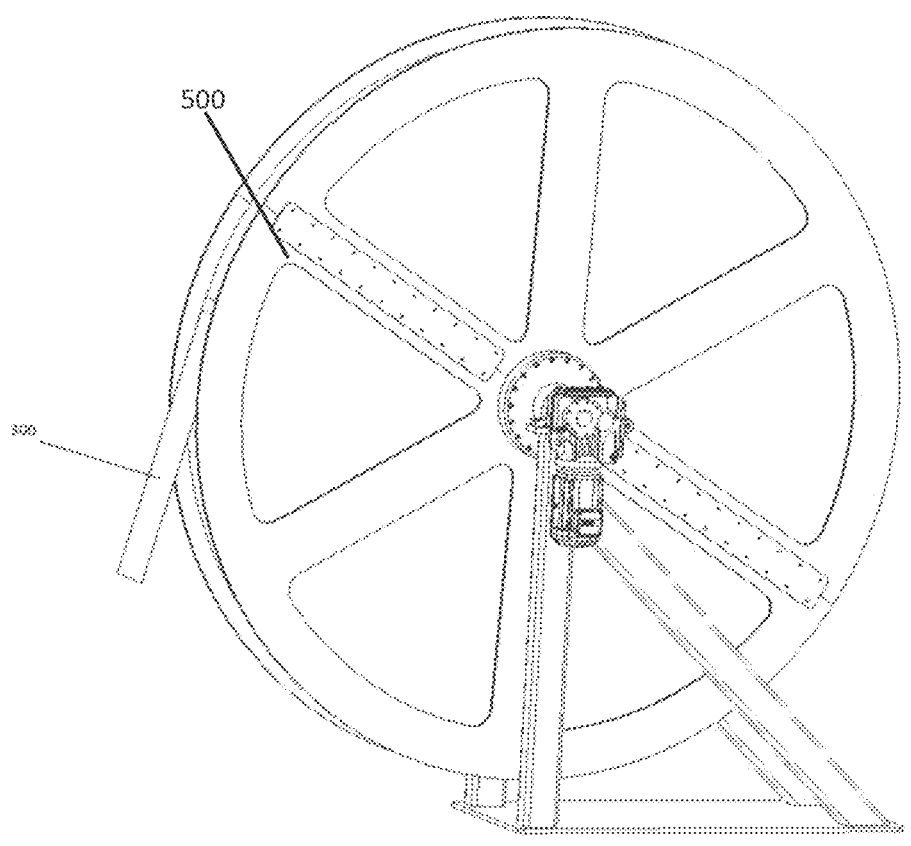
FIG. 65 shows a spool having thermoplastic sheet material 300 according to various embodiments.

Referring to FIG. 65, in certain embodiments, the continuous roll molding process may start with thermoplastic sheet material 300 being provided to the process. As shown, thermoplastic sheet material 300 may be rolled, or spooled, around a spool 500. Spool 500 may be stored at an ambient temperature. Thermoplastic sheet material 300 may be provided directly to the process from spool 500, or an intermediate roller, which may be steel stored at an ambient temperature, may provide thermoplastic sheet material 300 to the process.

Referring to FIGS. 3-5B, in certain embodiments, the continuous roll molding process may start with a thermoplastic material that is formed into sheet form, e.g., thermoplastic sheet material 300 described above. The resulting thermoplastic sheet material may be formed into parts, such as frangible cap strips, according to embodiments. However, any other parts may also be made by the roll molder.

In certain embodiments, continuous roll molding may produce parts with material that is either highly crystalline and/or amorphous. As described herein, a thermoplastic material may be used. In some embodiments, the thermoplastic material may be selected from the group consisting of, but not limited to, polyethylenes, HDPE, polypropylene, low density polyethylene, acrylonitrile butadiene styrene, polystyrene, high impact polystyrene, polyvinylchloride, polyethylene terephthalate, aliphatic polyamides, polylactic acid, and high-impact polystyrene.

In some embodiments, the thermoplastic material may additionally or alternatively be selected from the group consisting of polyamides, polyethylene terephthalate, polyimide, polyolefin, perfluoroalkoxy alkane, polyvinylidene fluoride, polyacrylonitrile, polymethyl methacrylate, fluorinated ethylene propylene, and polyphenylene sulfide. In other embodiments, the thermoplastic material includes polyethylene, PVC, polystyrene, and polyamides. In other embodiments, the thermoplastic material may include a thermoplastic elastomer, copolymers, and polymer blends. In other embodiments, additives may be added to the thermoplastic material in order to improve certain properties.

In certain embodiments, the thermoplastic material may be amorphous, crystalline, or semi-crystalline. Amorphous thermoplastic materials may have a melt temperature $T_M$, and a glass transition temperature $T_G$. Semi-crystalline and crystalline materials may form crystalline regions in between $T_M$ and $T_G$.

In certain embodiments, during extrusion, the continuous roll molding process may have greater control over the direction of the macromolecules compared to other manufacturing methods, as extrusion may align the direction of the polymer strands. Polymers, when extruded and calendered through the calendering process, may allow for setting the molecular direction in the feed flow direction. In this way, part production by the continuous roll molder may be improved, as the molds may be filled more evenly.

Figures 3A, 3B:
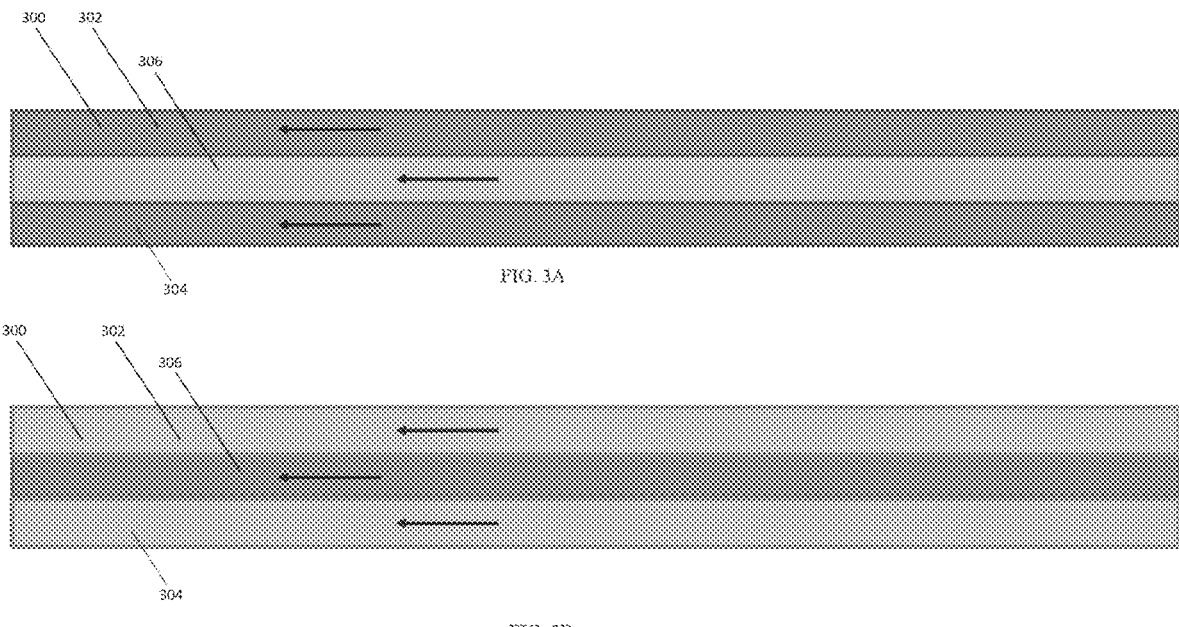
FIG. 3A shows a schematic side view of thermoplastic sheet material according to various embodiments.
FIG. 3B shows a schematic side view of thermoplastic sheet material according to various embodiments.

As shown in FIGS. 3A-B, a thermoplastic sheet material 300 may include an upper surface 302, a lower surface 304, and an intermediate portion 306 disposed between upper surface 302 and lower surface 304. As referenced in regards to FIGS. 3A-5B, cooler zones may be below $T_G$, in other embodiments are above $T_G$ but below $T_M$, and in further embodiments, are above $T_M$. In some embodiments, as shown in FIG. 3A, intermediate portion 306 may be hotter than upper surface 302 and lower surface 304. As referenced in regards to FIGS. 3A-5B, hotter zones may be above $T_M$, and in other embodiments, are above $T_G$. In this way, for example, upper surface 302 and lower surface 304 may form a cooler "skin" of sheet around a molten core as shown in FIG. 3A. In one embodiment, this is accomplished by cooling the upper and lower surfaces 302, 304 while maintaining a warmer, core, or even a molten core via intermediate portion 306.

In other embodiments, as shown in FIG. 3B, intermediate portion 306 may be cooler than upper surface 302 and lower surface 304. In some embodiments, intermediate portion 306 is below $T_G$, in other embodiments is above $T_G$ but below $T_M$, and in further embodiments, are above $T_M$. In some embodiments, upper surface 302 and lower surface 304 are above $T_M$, and in other embodiments, are above $T_G$ but below $T_M$. Molten surfaces on a cooler rigid center may be created by running a cooled sheet through heat systems at high speeds to impact only the surfaces 302, 304 of the material while preserving rigidity of the core 306.

FIGS. 4A-5B show variations of the temperature differentials imparted into thermoplastic sheet material 300 from the different processes of calendering, temperature adjusting stations, continuous roll molding, and forming, which will be described herein. Heating or cooling parts of thermoplastic sheet material 300 (FIG. 3A) may cause the speed of material flow through a continuous roll molder to be adjusted. For example, the speed of flow of cooler parts of the material may be faster relative to warmer parts due to friction and pressure in the continuous roll molder pulling and squeezing the cooler material through. Hotter portions may flow through a continuous roll molder more slowly relative to cooler portions but may be more easily squeezed and fill into more complex dimensions of a roll molder due to the hotter portions being more fluid and flexible.

Figures 4A, 4B, 4C, 4D:
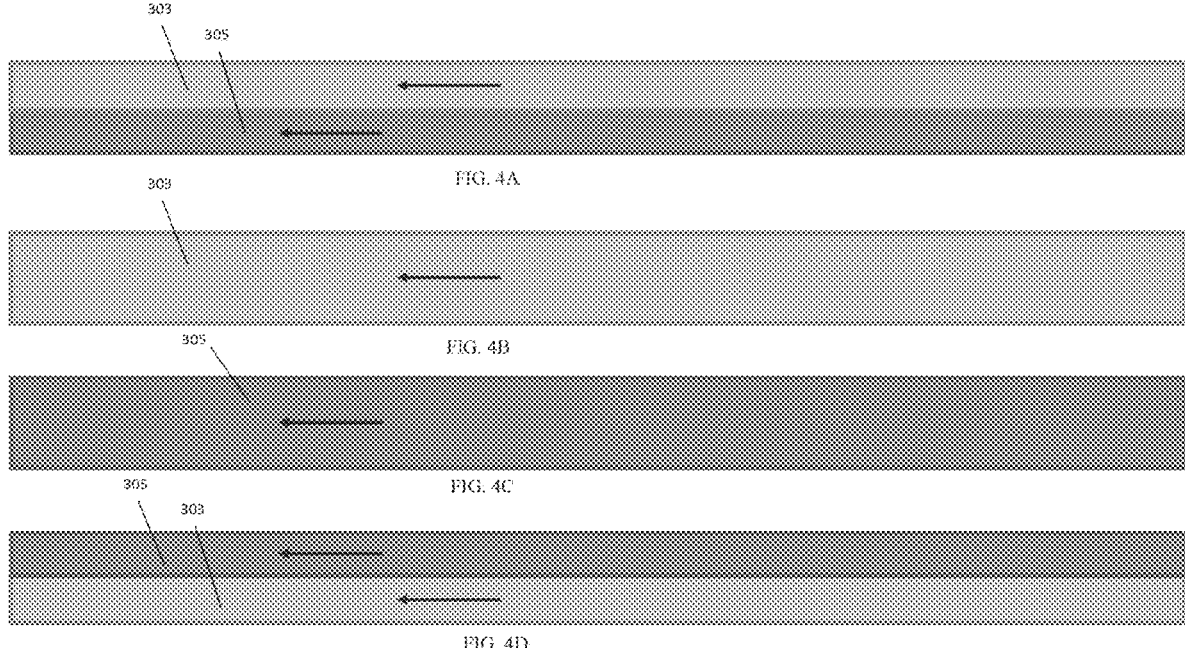
FIG. 4A shows a schematic side view of thermoplastic sheet material according to various embodiments.
FIG. 4B shows a schematic side view of thermoplastic sheet material according to various embodiments.
FIG. 4C shows a schematic side view of thermoplastic sheet material according to various embodiments.
FIG. 4D shows a schematic side view of thermoplastic sheet material according to various embodiments.
Figures 5A, 5B:
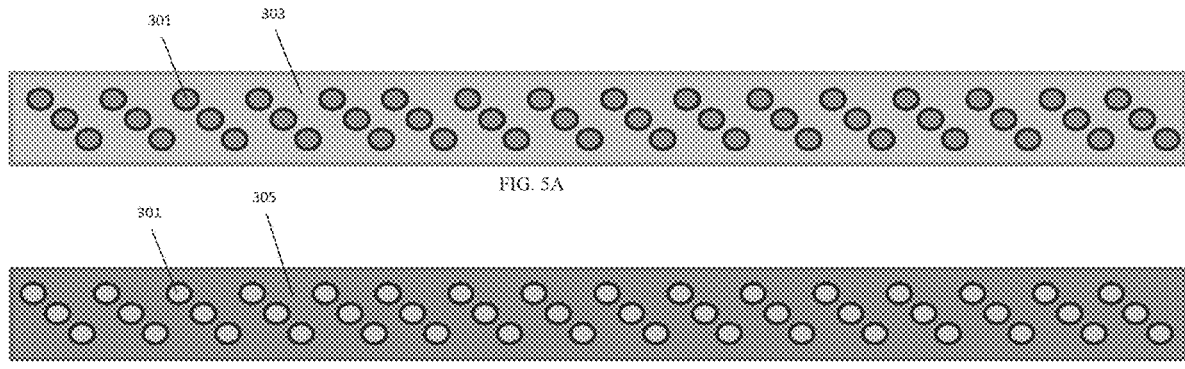
FIG. 5A shows a schematic top view of thermoplastic sheet material according to various embodiments.
FIG. 5B shows a schematic top view of thermoplastic sheet material according to various embodiments.

In some embodiments, different zones of thermoplastic sheet material 300 (FIG. 3A) may be hotter or cooler. For example, as shown in FIG. 4A thermoplastic sheet material 300 may include a hotter zone 303 above and cooler zone 305 below. As shown in FIG. 4B, thermoplastic sheet material 300 may include a hotter zone 303 throughout thermoplastic sheet material 300. As shown in FIG. 4C, thermoplastic sheet material 300 may include a cooler zone 305 throughout. As shown in FIG. 4D, thermoplastic sheet material 300 may be cooler above, via cooler zone 305, and hotter below, via hotter zone 303. In some embodiments, with reference to FIGS. 5A and 5B, thermoplastic material 300 may have one or more targeted temperature zones 301. Variations in temperature at different parts of thermoplastic sheet material 300 may be achieved by the different processes of calendering, temperature adjusting stations, continuous roll molding, and forming. FIGS. 5A and 5B may show the thermoplastic sheet from above or below, or it may show a cross-section of a thermoplastic sheet indicating internal variations in temperature.

In the embodiments of FIGS. 3-5B, the above paragraphs discuss the figures as showing a top or bottom view, or cross-section of the plastic sheet. However, a plastic sheet may also be heated and cooled in relative zones spanning the width of the plastic sheet.

Figure 6:
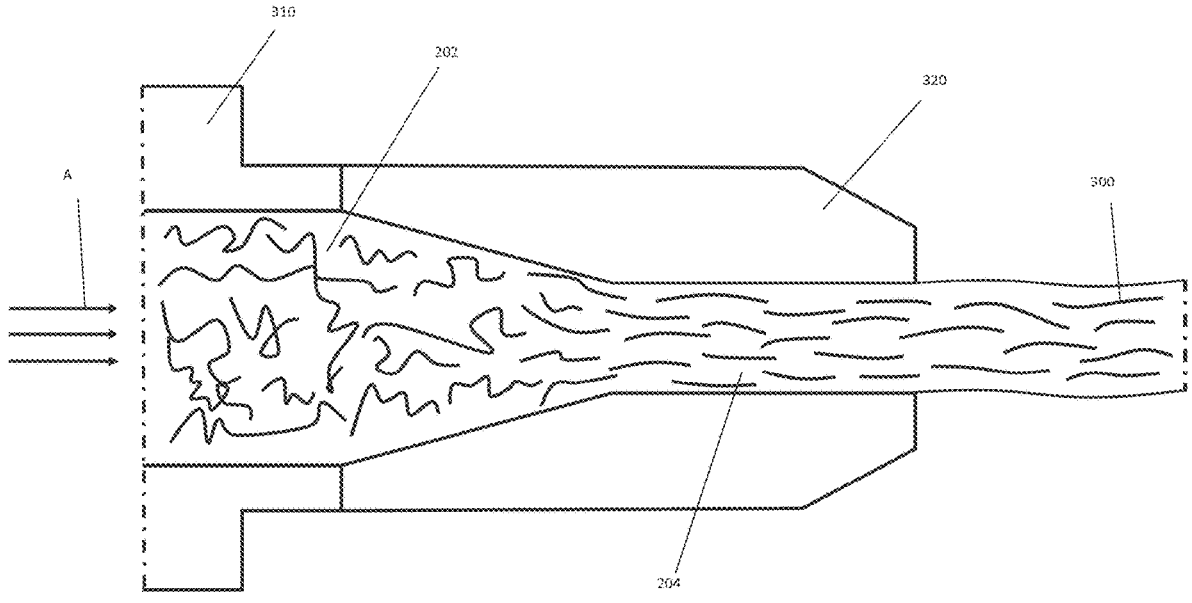
FIG. 6 shows a schematic of polymer material flow through a sheet die according to various embodiments.

The feed flow direction A of an embodiment of the thermoplastic material may be seen in FIG. 6. As shown in this cross-section, the thermoplastic material is conveyed through an extruder 310 and a sheet die 320. Extruder 310 may be disposed upstream of sheet die 320 to extrude the thermoplastic material by an extruder screw to sheet die 320.

Figure 7:
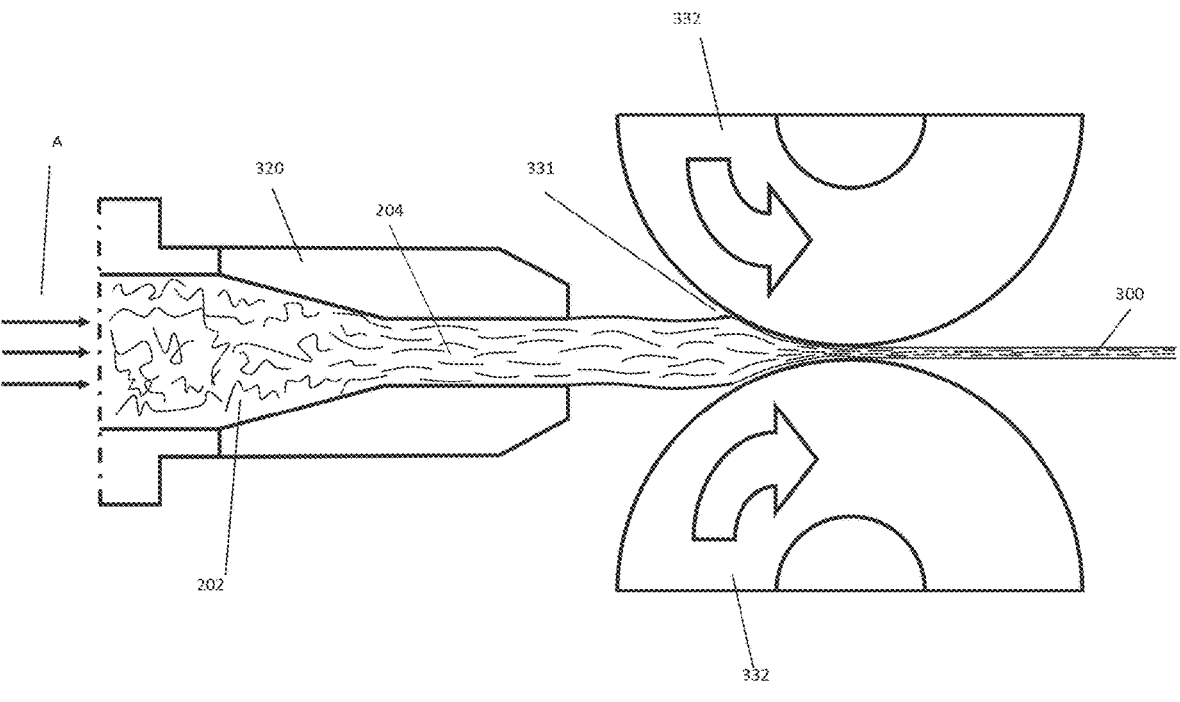
FIG. 7 shows a schematic of polymer material flow through the sheet die and calendering rolls according to various embodiments.

Extrusion may align the direction of the polymer strands. In sheet die 320, HDPE macromolecules, for example, may be aligned as they extrude through sheet die 320. With reference to FIGS. 6-7, unaligned molecules 202 of the thermoplastic material may become aligned molecules 204 such that thermoplastic sheet material 300 exiting sheet die 320 may include aligned molecules 204. Aligned molecules 204 may be aligned, substantially aligned, or more aligned than a similar part from an injection molding process.

When the thermoplastic material is being mixed by the extruder screw and the melt pump, the molecules of thermoplastic sheet material 300 may be oriented randomly due to mixing and shearing. As the melted material is forced through thinner and wider openings in sheet die 320, the molecules begin to align along themselves, due to flow, friction, and being forced into a sheet profile.

In some embodiments, thermoplastic sheet material 300 may flow out of sheet die 320, thermoplastic sheet material 300 may be extruded directly into a nip gap 331 of calendering nip rollers 332, shown in FIG. 7. Nip rollers 332 may rotate counter to each other, so that when thermoplastic sheet material 300 enters nip 331, thermoplastic sheet material 300 may be squeezed along the width of nip 331. In certain embodiments, the sheet material 300 may be pulled through the nip 331 faster than the linear speed at which it exits the sheet die 320. In other embodiments, the sheet material 300 may be pulled through the nip 331 between about 1% and about 3% faster than the speed at which it exits sheet die 320.

In some embodiments, the thickness of thermoplastic sheet material 300 before entering sheet die 320 may be between about 0.045 inches and about 0.06 inches. In some embodiments, thermoplastic sheet material 300 may thin by between about 0.05 inches and about 0.55 inches. In effect, the nip rollers 332 may thin the thermoplastic sheet material 300 by stretching it. Thinning of thermoplastic sheet material 300 may also further pull and align the macromolecular structures of thermoplastic sheet material 300 in feed flow direction A. In some embodiments, the maximum thickness of thermoplastic sheet material 300 after exiting sheet die 320 may be between about 0.5 inch and about 2 inches, such as about 1 inch.

In certain embodiments, crystallization by stretching may increase the crystallization of a thermoplastic material beyond melt crystallization, or may cause crystallization to occur more rapidly. In this process, the polymer is forced through, e.g., a nozzle that creates tensile stress which partially aligns its molecules. Such alignment may be considered as crystallization and it affects the material properties. For example, the strength of the fiber is greatly increased in the longitudinal direction. Some elastomers which are amorphous in the unstrained state undergo rapid crystallization upon stretching. In certain embodiments, use of sheet die 320 and nip rollers 332 may enhance crystallization of the thermoplastic sheet material 300 over the same thermopolymer that is injection molded, or over an extrusion process not using a sheet die 320 and/or nip rollers 332.

In some embodiments, the thickness of thermoplastic sheet material 300 after exiting sheet die 320 may be between about 0.04 inches and about 0.06 inches. Thermoplastic sheet material 300 after being conveyed through sheet die 320 may have aligned molecules 204 and may be more crystalline and less amorphous, for example, compared to a similar part that is injection molded. Crystallinity may depend on the thermoplastic material used. In some embodiments, thermoplastic sheet material 300 may have a crystallinity of between about 60% and about 85%. In some embodiments, the thermoplastic material is HDPE. Crystallinity may increase through the continuous roll molding process as the molecules are aligned and as the temperature is manipulated.

In some embodiments, the thermoplastic material may be heated in extruder 310 and sheet die 320, which may mix the thermoplastic material for extrusion into thermoplastic sheet material 300 that is at or above its melt temperature $T_M$. In certain embodiments, e.g., for HDPE, $T_M$ may be between about 60 degrees Celsius and about 330 degrees Celsius, such as between about 100 and about 250 degrees Celsius, such as between about 190 and about 210 degrees Celsius. The melt temperature may be measured on a surface of thermoplastic sheet material 300 immediately upon exiting sheet die 320.

Figure 8:
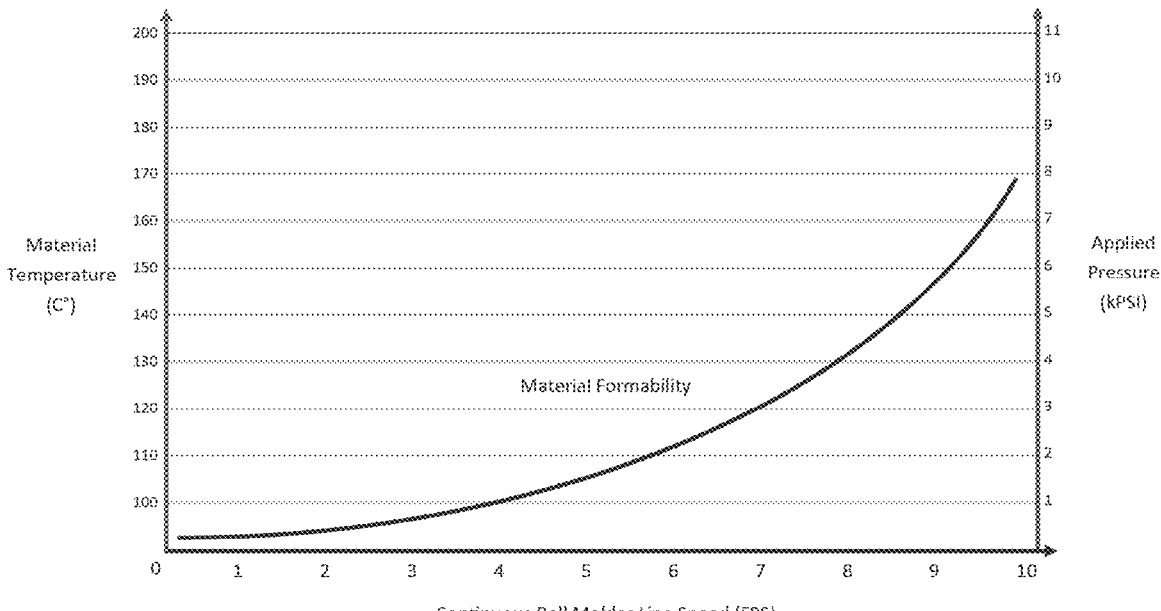
FIG. 8 shows a model of the relationship of material formability to line speed of the continuous roller molds according to various embodiments.

In some embodiments, method 1000 (FIG. 1) or method 2000 (FIG. 2) may be operated by a programmable logic controller (PLC), which may adjust the conveying speeds and production rates. With reference to FIG. 8, the relationship of material formability to line speed of the continuous roller molds may be graphically depicted. As shown, the higher the feet per second (FPS) of the line speed, the higher the applied pressure (kilopound per square inch) from the continuous roll molders and the higher the material temperature (degrees Celsius) of thermoplastic sheet material 300 is needed to maintain the formability of the parts.

Figure 9:
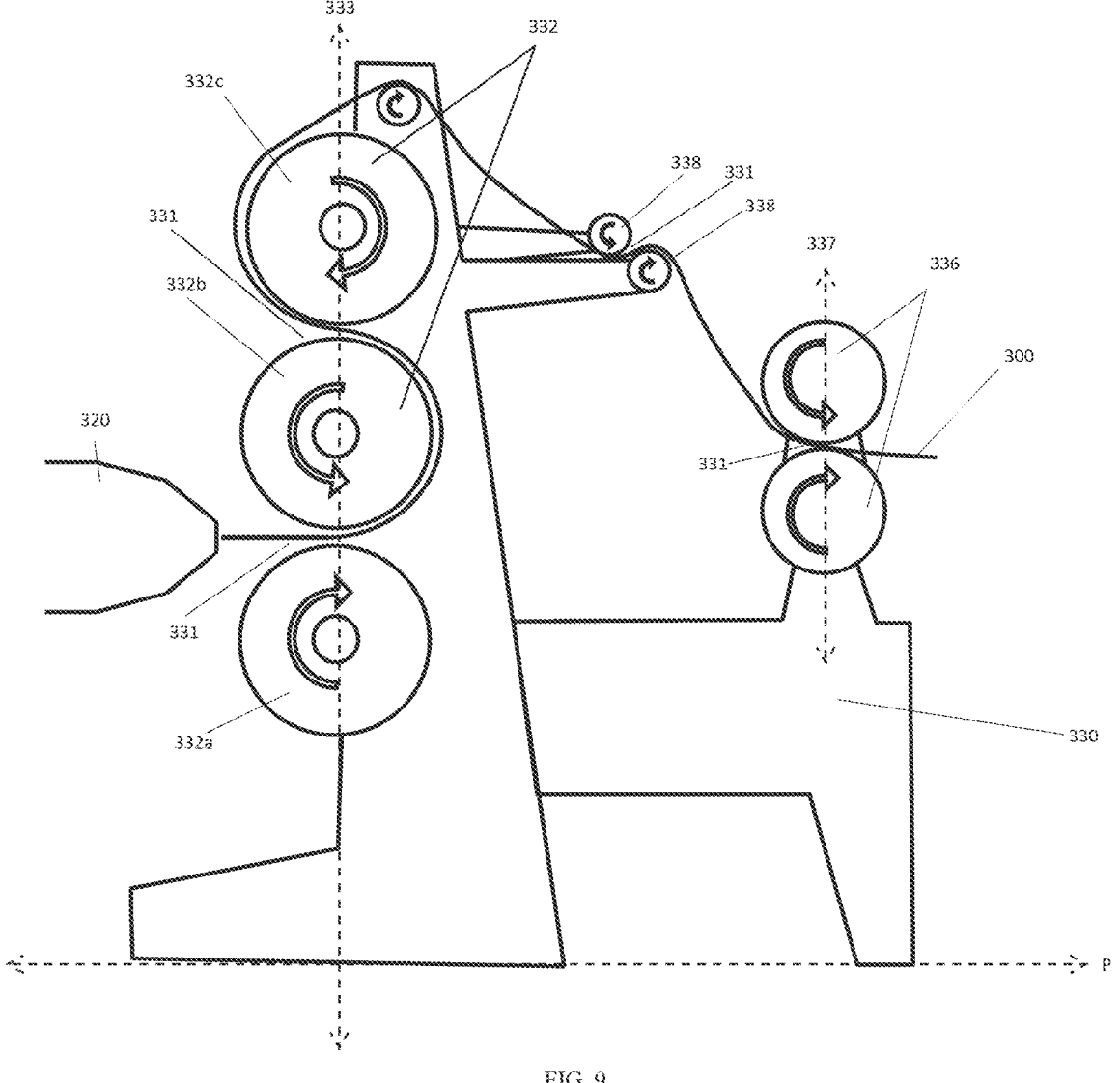
FIG. 9 shows a calendering machine according to various embodiments.

In some embodiments, after conveying thermoplastic sheet through sheet die 320 and before conveying thermoplastic sheet material 300 (FIG. 3A) through continuous roll molder 360 (FIG. 14), thermoplastic sheet material 300 may be conveyed through a calendering system 330, an example of which is shown in FIG. 9. Melted thermoplastic material may exit sheet die 320 in sheet form as thermoplastic sheet material 300 and into calendering system 330. In other words, calendering system 330 may be disposed between sheet die 320 and continuous roll molder 360 such that calendering system 330 is downstream of sheet die 320 and upstream of continuous roll molder 360. Accordingly, calendering system 330 may convey thermoplastic sheet material 300 from sheet die 320 to continuous roll molder 360.

Calendering may cool thermoplastic sheet material 300 to a temperature below its melt transition point $T_M$, or below the temperature at the exit of sheet die 320 (FIG. 7). In particular, calendering system 330 for the continuous roll molding process may be set to specific temperatures and specific speeds to control the properties of thermoplastic sheet material 300 being calandered. With reference to FIG. 9, the calendering process by calendering system 330 may heat or cool one or more surfaces of thermoplastic sheet material 300. For example, the cooling of upper surface 302 (FIG. 3A) and lower surface 304 (FIG. 3A) of thermoplastic sheet material 300 may be accomplished, in part, by flash chilling the extruded sheet at high speeds through a high-speed calendering system.

Calendering system 330 may reduce or increase the temperature of one or more parts of thermoplastic sheet material 300 via one or more temperature-controlled nip rollers 332, 336. In addition, in some embodiments, thermoplastic sheet material 300 may be cooled and heated in different stages, dependent on the material properties needed for specific part formation in continuous roll molder 360 (e.g., FIG. 14). The material properties needed for specific part formation in continuous roll molder 360 may be, for example, density, the ability of the material to flow into the roll mold, chemical resistance, impact resistance, electrical insulation, moisture resistance, dimensional stability, brittleness, tensile strength, and flexibility.

In some cases, for example regarding HDPE, even if the sheet material is cooled quickly, the molecules of HDPE thermoplastic sheet material 300 may become more ordered and compact within the polymer chain, reducing the free volume of thermoplastic sheet material 300 and increasing crystallinity within the polymer chain. HDPE may have a glass transition temperature $T_G$ of between about −100 degrees Celsius and about −130 degrees Celsius, such as about −110 degrees Celsius, allowing HDPE thermoplastic sheet material 300 a broader working range for cooling such that the molecules may crystallize. Increasing order and compactness of the molecules via crystallization may result in a more stable, resistant, and strong material and may improve the chemical resistance, moisture resistance, and electrical insulation properties of the material more resistant to chemical attack and moisture absorption. In addition, the more ordered and compact structure of the molecules may improve the impact resistance, dimensional stability, and tensile strength of the material, as the more closely packed and stable structure of the molecules may make the material more resistant to deformation and more able to withstand external forces. The more ordered and compact structure may indicate crystallinity, which may be measured with differential scanning calorimetry, thermogravimetric analysis, and thermomechanical analysis.

In certain embodiments, the calendering process may control heat dissipation as thermoplastic sheet material 300 is fed through a plurality of temperature-controlled nip rollers 332, 336. Calendering in the continuous roll molding process, therefore, may create a constant and even contact with thermoplastic sheet material 300 to create even heat dissipation and prevent or limit warping. In contrast, quick cooling in injection molding may be uncontrolled. Accordingly, the crystallinity and form of parts as injection molded parts often shrink in the mold and at least some part elements do not contact the cavity in the mold, creating uneven cooling that may warp parts.

According to embodiments, the calendering process may introduce additional macromolecular alignment in the direction of material flow, as the process pulls and squeezes thermoplastic sheet material 300 in one feed direction. The macromolecular alignment from the calendering process may increase tensile strength and density of thermoplastic sheet material 300 to strengthen the material and improve part formation. In some embodiments, referring to FIG. 9, thermoplastic sheet material 300 passing through nip rollers 332, 336, being squeezed more tightly in feed flow direction A (FIG. 7) as it is cooled, may further increase the molecular crystallinity in thermoplastic sheet material 300, and set the molecular direction of thermoplastic sheet material 300 in the direction of the material flow. In these embodiments, prior to entering continuous roll molder 360 (FIG. 14), the macromolecular direction of the sheet material may be pre-set in a particular orientation, in line with the flow of production.

In an embodiment, calendering system 330 may reduce the thickness of thermoplastic sheet material 300 by adjusting the gap distance, speed and temperature of nip rollers 332, 336. In some embodiments, nip rollers 332, 336 may be arranged adjacent one another. In one embodiment, nip rollers 332 may be positioned along an axis 333 without intermediate structures such that they are adjacent. Similarly, nip rollers 336 may be positioned along an axis 337 without intermediate structures such that nip rollers 336 are adjacent. In some embodiments, two adjacent nip rollers 332, 336 may form a nip roller pair. Two or more adjacent nip rollers 332, 336 may be adjacent and proximate one another such that thermoplastic sheet material 300 may be conveyed through a nip gap 331 between two adjacent nip rollers 332, 336. In some embodiments, nip rollers 332, 336 may be arranged in a series, or linearly. Accordingly, nip rollers 332 may be positioned along axis 333 such that they are aligned. Similarly, nip rollers 336 may be positioned along axis 337 such that they are aligned. In some embodiments, nip rollers 332, 336 may be arranged vertically with respect to a surface plane P. In other words, nip rollers 332 may be aligned on axis 333, which may be perpendicular to surface plane P. Similarly, nip rollers 336 may be aligned on axis 337, which may be perpendicular to surface plane P.

As shown in FIG. 9, in some embodiments, calendering system 330 may have one or more temperature-controlled nip rollers. In one embodiment, the calendering system 330 may have five temperature-controlled nip rollers 332, 336. In some embodiments, nip rollers 332, 336 may be arranged in pairs. For example, as shown, a first nip roller 332a and a second nip roller 332b may be adjacent and proximate one another and may form a nip roller pair. Second nip roller 332b and a third nip roller 332c may be adjacent and proximate one another and may form a nip roller pair. Nip rollers 336 may be adjacent and proximate one another and may form a nip roller pair. Accordingly, nip rollers 332, 336 may convey thermoplastic sheet material 300 between adjacent nip rollers 332, 336 in each pair of nip rollers 332, 336. In other embodiments, calendering system 330 may have fewer or more nip rollers than five.

Figure 14:
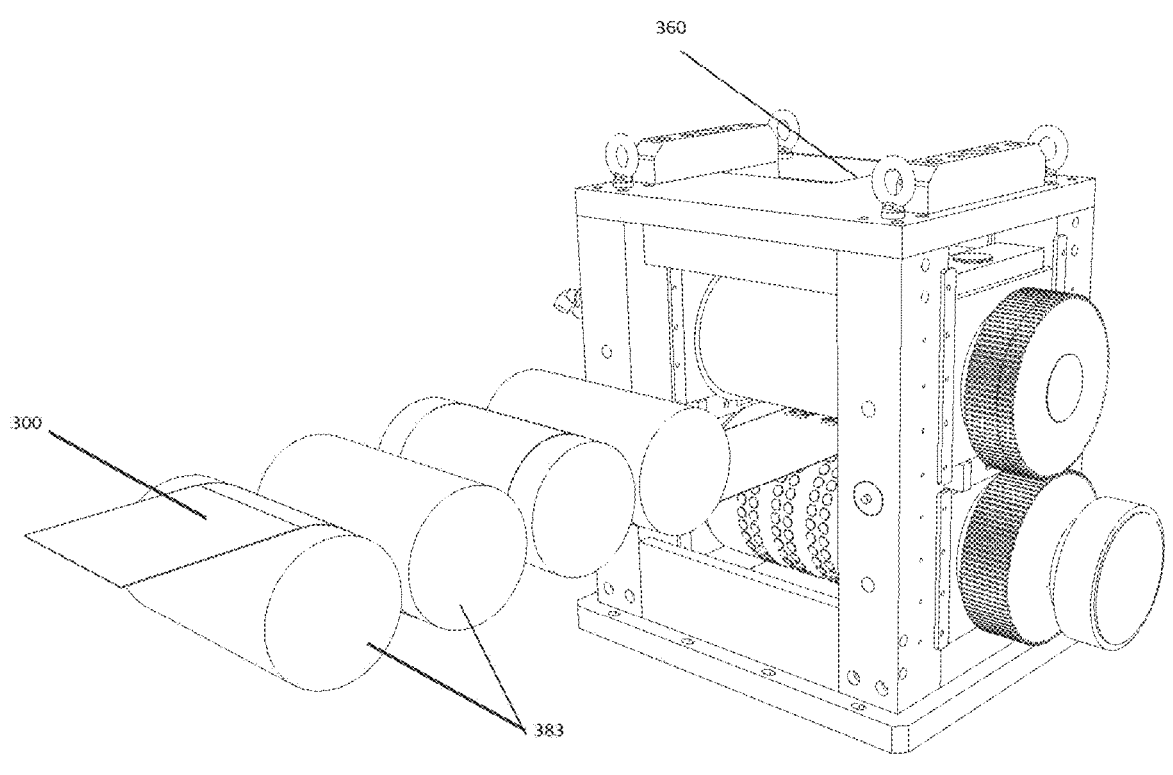
FIG. 14 shows temperature control nip rollers and a continuous roll molder according to various embodiments.

In some embodiments, calendering in calendering system 330 may impart a surface finish onto thermoplastic sheet material 300. In one embodiment, imparting a surface finish may be used to either increase or decrease material flow speeds in continuous roll molder 360 (FIG. 14). In some embodiments, there are three types of finishes applied to thermoplastic sheet material 300—mirror finish, matte finish, and satin finish. In one embodiment, the surface topography finish of the mirror surface is measured below about 16 Ra, to about 0.2 Ra, which imparts a gloss finish to thermoplastic sheet material 300. In other embodiments, the surface topography finish of the matte surface is measured from about 16 Ra to about 60 Ra which impart a non-gloss finish to the thermoplastic material. In still further embodiments, the surface topography finish of the satin surface is measured from about 60 Ra to about 300 Ra.

In some embodiments, nip rollers 332, 336 may have a gloss chrome, satin, or matte finish. In some embodiments, finishes from a gloss chrome surface may be between about 5 Ra and about 30 Ra, such as about 10 Ra, finishes from a matte surface may be between about 20 Ra and about 40 Ra, such as about 30 Ra, and finishes from a satin finish may be between about 70 Ra and about 130 Ra, such as about 100 Ra.

In some embodiments, each successive temperature-controlled pair of nip rollers 332, 336 in feed flow direction A (FIG. 7) of thermoplastic sheet material 300 may include at least one of a decreasing temperature and an increasing surface roughness.

In some embodiments, nip rollers 332, 336 may be set between about 30 degrees Fahrenheit and about 500 degrees Fahrenheit. In some embodiments, first nip roller 332a may approximately match the temperature of thermoplastic sheet material 300 (FIG. 3A) as it exits sheet die 320.

In some embodiments, with reference to FIG. 9, the nip size of nip rollers 332, 336, may progressively decrease, as shown by secondary nip rollers 336 having a smaller size in comparison to nip rollers 332. As shown in FIG. 9, the nip size shown is representative, and not to scale. The final sheet thickness needed for the parts being made as thermoplastic sheet material 300 may be achieved by conveying thermoplastic sheet material 300 through nip rollers 332, intermediate guide and tension rolls 338, and then through secondary nip rollers 336. In other words, temperature-controlled pairs of nip rollers 332, 336 may reduce the thickness of thermoplastic sheet material 300 from when thermoplastic sheet material 300 exits sheet die 320 (FIG. 7) to when thermoplastic sheet material 300 exits calendering system 330.

In some embodiments, at the first stage of calendering in calendering system 330, nip rollers 332 may be at a greater temperature than secondary nip rollers 336 in the second stage of calendering in calendering system 330, dependent on the temperature and type of sheet material. In some embodiments, nip rollers 332, 336 may progressively cool from one nip roller 332, 336 to the next until thermoplastic sheet material 300 is cooled down enough to be below its melt transition $T_M$, or reaches a desirable temperature for further processing.

In one embodiment, in setting secondary nip rollers 336 to be cooler than nip rollers 332, secondary nip rollers 336 may be referred to as chiller rolls, and may create a cooler upper surface 302 (FIG. 3A) and lower surface 304 (FIG. 3A) around a hotter or molten intermediate portion 306 (e.g., FIG. 3A) of thermoplastic sheet material 300. In further embodiments, the speed of nip rollers 332, 336 may be adjusted in accordance with the temperatures required for achieving a particular thickness of thermoplastic sheet material 300 to be formed. In other words, in rollers 332, 336 may thin the thermoplastic sheet material 300 by stretching the material. In some embodiments, stretch may occur between die 320 and nip rollers 332. In other embodiments, stretch may occur between nip rollers 332 and 336. In some embodiments, stretch may only occur in one or both locations.

Figure 10:
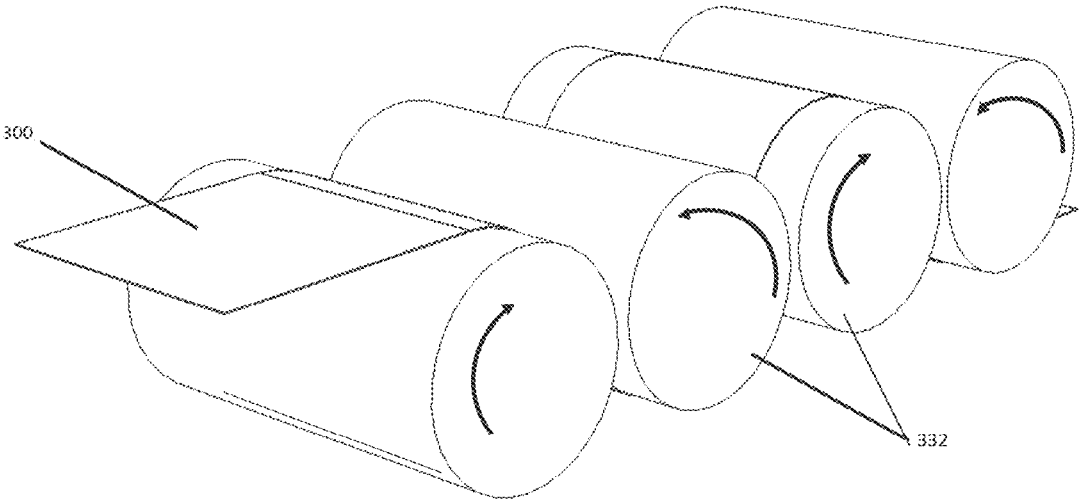
FIG. 10 shows temperature control nip rollers or calendering rolls according to various embodiments.

Instead of being arranged vertically as in FIG. 9, as shown in FIG. 10, nip rollers 332 may be arranged horizontally, in some embodiments, e.g., along an axis parallel to surface plane P (FIG. 9).

Figure 11:
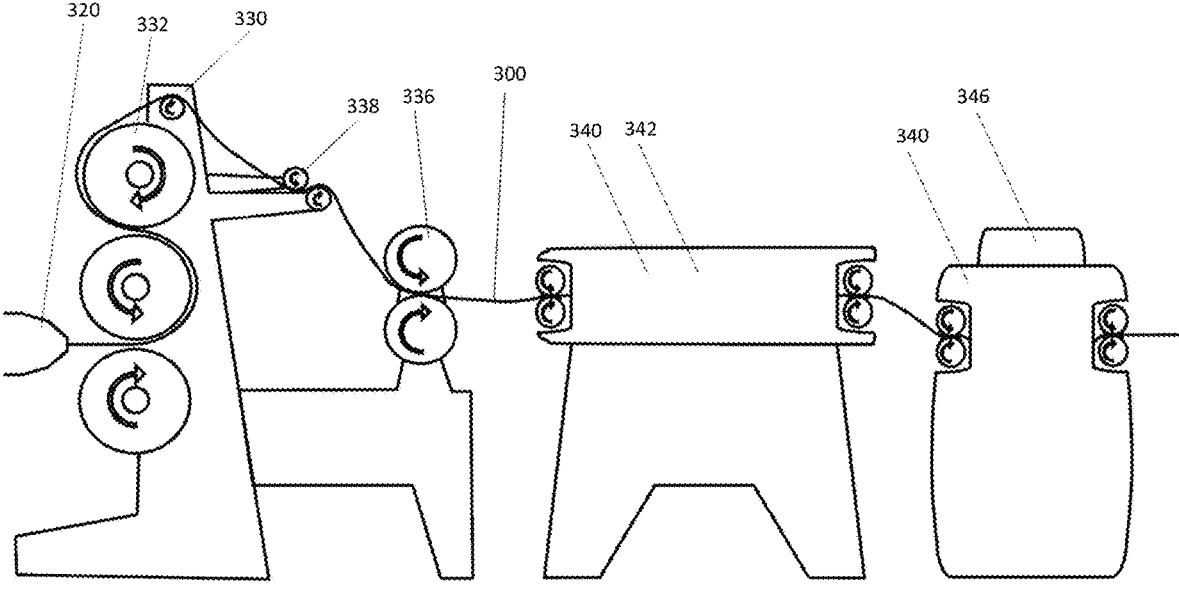
FIG. 11 shows the calendering machine of FIG. 9 and temperature control stations according to various embodiments.
Figure 12:
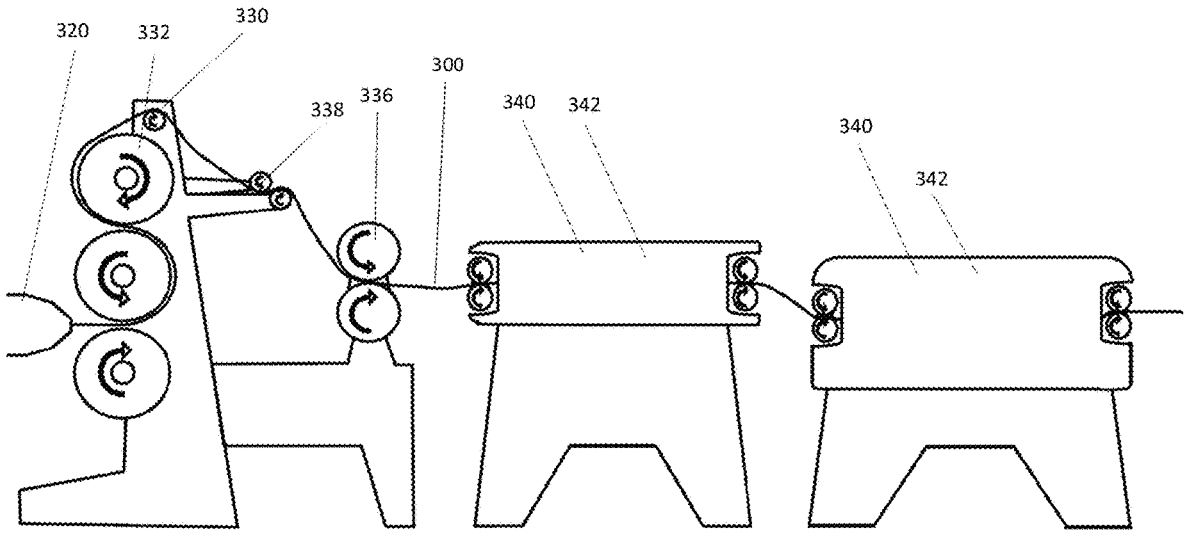
FIG. 12 shows the calendering machine of FIG. 9 and temperature control stations according to various embodiments.

In some embodiments, the cooling of upper surface 302 (FIG. 3A) and lower surface 304 (FIG. 3A) of thermoplastic sheet material 300 may be accomplished, in part, by flash chilling the extruded sheet at high speeds through a high speed calendering system. With reference to FIGS. 11-12, following calendering system 330, thermoplastic sheet material 300 may be conveyed through one or more temperature control stations 340 for secondary heating or cooling.

Certain embodiments may provide for the reduction of memory in thermoplastic sheet material 300 through the pressurizing, heating and cooling of thermoplastic sheet material 300 through the continuous roller molds process. In other words, pre-cooled and/or pre-formed and spooled thermoplastic sheet material 300 that is in the format of a large spool maintains a memory of the shape of itself in the spool form, and e.g., may have a curve shape to the sheet. To remove this memory and prevent parts from being curved in the same way thermoplastic sheet material 300 is spooled, thermoplastic sheet material 300 may be heated to or above its melting point $T_M$ such that it is molten, and then chilled back down under its melting point $T_M$, or its glass transition point To again, thereby giving it a new memory and/or shape. In certain embodiments, this process may be achieved through temperature control stations 340.

In certain embodiments, as shown in FIGS. 11-12, for example, temperature control stations 340 may be disposed between calendering system 330 and continuous roll molder 360 (FIG. 14) such that the temperature control stations 340 are downstream of calendering system 330 and upstream of continuous roll molder 360. In some embodiments, a plurality of temperature control stations 340 may be disposed between calendering system 330 and continuous roll molder 360. Temperature control stations 340 may modify the temperature of thermoplastic sheet material 300 by one of raising or lowering a temperature of thermoplastic sheet material 300.

In some embodiments, a temperature control station 340 may be a heating station 342, e.g., a tenter oven, to provide heating. In some embodiments, a temperature control station 340 may be a cooling station 346, e.g., a cryogenic cooling station, to provide cooling. In some embodiments, a temperature control station 340 may be a cooling station 348, e.g., a water bath, to provide cooling.

In certain embodiments, heating and cooling temperature control stations 340 may be used or not used depending on what operations are required. If both heating and cooling are required, both heating station 342 and cooling station 348 may be used. For example, both heating and cooling may be required if upper surface 302 (FIG. 3A) or lower surface 304 (FIG. 3A) require more density and a higher brittleness. In some embodiments, with a more brittle outer surface, higher detailed markings may be imparted (e.g., for decorative markings), while maintaining flexibility of intermediate portion 306 (FIG. 3A).

In some embodiments, if only heating is required, cooling station 348 may be offline. Similarly, if only cooling is required, heating station 342 may be taken offline. Temperature control stations 340 that are offline may convey thermoplastic sheet material 300 without active heating or cooling. In other words, temperature control stations 340 that are not used may be bypassed, or the thermoplastic sheet may traverse the temperature control station 340 without active cooling or heating being performed.

In some embodiments, the cooling of upper surface 302 (FIG. 3A) and lower surface 304 (FIG. 3A) may also be accomplished, in part, by a secondary chilling system. In some embodiments, cooling station 348 may be a water bath such that the chilling is more uniform throughout the thickness of thermoplastic sheet material 300.

In other embodiments, secondary heating or cooling by temperature control stations 340 may prepare thermoplastic sheet material 300 for part formation. Calendering may facilitate setting the temperatures and introduce lower pressure levels in a manner that begins to affect the polymer chain rotation and reptation of the macromolecules of the thermoplastic sheet and either reduce or increase free volume of the material. In some embodiments, this may help preset the macromolecular flow direction within thermoplastic sheet material 300 which may assist in optimizing the process of part formation in the continuous roll molders by creating more predictable material flow rates and enabling more accurate part shaping.

In other embodiments, secondary heating or cooling may adjust rotational speed of the polymer chains of the macromolecules of thermoplastic sheet material 300 (FIG. 3A) on upper surface 302 (FIG. 3A) and lower surface 304 (FIG. 3A). In some embodiments, increasing or reducing the speed of the rotations of the polymer chains on the surface of the material may have effects. Specifically, increasing the speed of rotations of the polymer chains in a linear, crystalline polymer like HDPE, may increase the surface hardness and stiffness due to the increased orientation of the polymer chains. In other embodiments, if the polymer material is a more amorphous material, like polystyrene or polyvinyl chloride, increasing or reducing the speed of the rotations of the polymer chains may result in a more isotropic material with more uniform properties in all directions across the surfaces of thermoplastic sheet material 300. This may be desirable in applications where strength and toughness are important, as a more isotropic material will have better impact resistance.

Figure 13:
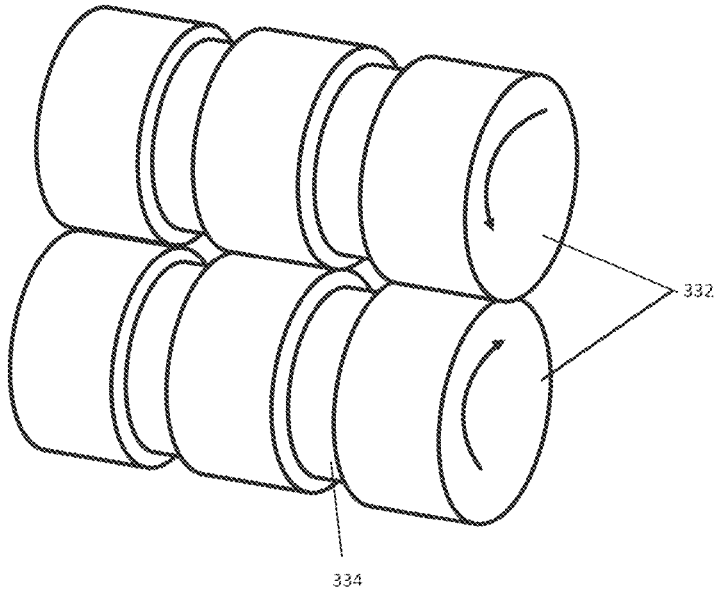
FIG. 13 shows temperature control nip rollers or calendering rolls according to various embodiments.

In some embodiments, parts of calendering rolls may be configured to have slots, e.g., gaps 334, to limit or prevent temperature change, for example. In some embodiments, parts of thermoplastic sheet material 300 (FIG. 3A) may be selectively cooled or heated except for one or more gaps 334 in nip rollers 332, for example, as shown in FIG. 13. In some embodiments, gaps 334 may facilitate bypassing temperature changes on select parts of thermoplastic sheet material 300 based on which parts of thermoplastic sheet material 300 engage gaps 334. In other embodiments, nip rollers 332 may have different temperature zones instead of gaps to achieve different temperatures across the width of thermoplastic sheet material 300.

In certain embodiments, calendering HDPE thermoplastic material 300 may reduce the free volume and increase density. In some embodiments, free volume may decrease by up to about 40% to about 50%. In some embodiments, the HDPE thermoplastic material 300 may be calendered under pressure between about 8,000 psi and about 30,000 psi. The increased density may limit warp and shrinkage in part formation. In certain embodiments, experimental shrinkage rates may be between about 0.1% and 1% at temperatures between about 70 degrees Celsius and about 120 degrees Celsius and pressures between about 2,500 psi and about 80,000 psi.

Prior to being conveyed into continuous roll molder 360, in some embodiments, HDPE thermoplastic sheet material 300 may be stored and later reintroduced into the continuous roll molding process. For example, after calendering, HDPE thermoplastic sheet material 300 may be stored. HDPE thermoplastic sheet material 300 may be stored at any step before calendering alternative. HDPE thermoplastic sheet material 300 may spooled, for example, for storage.

Figure 15:
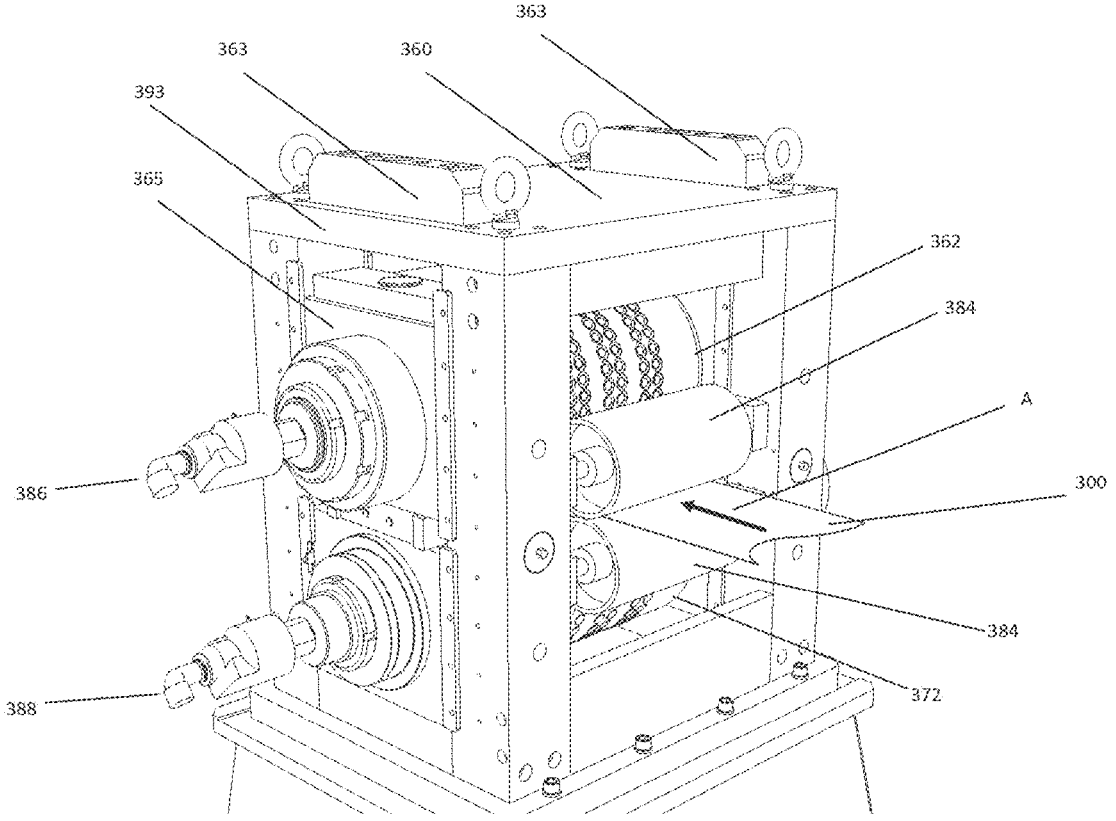
FIG. 15 shows a front perspective view of a continuous roll molder according to various embodiments.

In some embodiments, after calendering, thermoplastic sheet material 300 may be conveyed into continuous roll molder 360, shown in FIGS. 14-15. In some embodiments, nip rollers 383 may be calendering rolls, for example, that may convey thermoplastic sheet material 300 in feed flow direction A to continuous roll molder 360 via infeed roller guides 384. In such embodiments, nip rollers 383 are temperature controlled such that secondary cooling or heating between the calendering and continuous roll molding is not needed.

In some embodiments, thermoplastic sheet material 300 may include a first density when exiting sheet die 320 (FIG. 7) and a second density greater than the first density when entering continuous roll molder 360. Density may be measurable when thermoplastic sheet material 300 begins to crystallize after calendering as thermoplastic sheet material 300 begins to cool.

With reference to FIGS. 7 and 9, in some embodiments, thermoplastic sheet material 300 may be at a first temperature after exiting sheet die 320. In some embodiments, upper surface 302 and lower surface 304 may be at the first temperature after exiting sheet die 320.

Referring again to FIGS. 14-15, in some embodiments, after exiting sheet die 320 and before entering continuous roll molder 360, thermoplastic sheet material 300 may be cooled to below its melt temperature $T_M$ but above $T_G$ and more closely matched to the temperatures of continuous roll molder 360. In one embodiment a target temperature for thermoplastic sheet material 300 may be between about 30 degrees Fahrenheit and about 350 degrees Fahrenheit, such as between about 70 degrees Fahrenheit and about 90 degrees Fahrenheit. In some embodiments, thermoplastic sheet material 300 may enter cold into continuous roll molder 360. The cold temperature can be between about 60 degrees Fahrenheit and about 100 degrees Fahrenheit. In some embodiments, thermoplastic sheet material 300 may enter hot into continuous roll molder 360. The hot temperature can be between about 180 degrees Fahrenheit and about 220 degrees Fahrenheit.

In some embodiments, thermoplastic sheet material 300 may be at a second temperature when entering continuous roll molder 360. In some embodiments, the second temperature may be lower than the first temperature of thermoplastic sheet material 300 after exiting sheet die 320 (FIG. 7). In some embodiments, upper surface 302 (FIG. 3A) and lower surface 304 (FIG. 3A) may be at the second temperature when entering continuous roll molder 360. In some embodiments, the second temperature may be an ambient temperature, such as when thermoplastic sheet material 300 includes calcium carbonate.

In some embodiments, continuous roll molder 360 may include heating and cooling lines 386 for a first mold, such as an upper mold 362. In some embodiments, continuous roll molder 360 may include heating and cooling lines 386 for a second mold, such as lower mold 388. In this way, upper mold 362 and lower mold 388 may be heated or cooled, thereby heating or cooling thermoplastic sheet material 300.

In an embodiment, intermediate portion 306 (FIG. 3A) of thermoplastic sheet material 300 (FIG. 3A) may be at a fourth temperature greater than the second temperature when entering continuous roll molder 360.

In some embodiments, continuous roll molder 360 may include a surface at a fifth temperature lower than the second temperature of upper surface 302 (FIG. 3A) and lower surface 304 (FIG. 3A) of thermoplastic sheet material 300 (FIG. 3A) when entering continuous roll molder 360. In some embodiments, continuous roll molder 360 may include heating and cooling lines 386 for a first mold, such as an upper mold 362. In some embodiments, continuous roll molder 360 may include heating and cooling lines 386 for a second mold, such as lower mold 388. In this way, upper mold 362 and lower mold 388 may be heated or cooled, thereby heating or cooling thermoplastic sheet material 300.

In some embodiments, one or more metal tracks and guides may align thermoplastic sheet material 300 to direct it through infeed roller guides 384 or nip rollers 383 in front of continuous roll molder 360 such that thermoplastic sheet material 300 enters continuous roll molder 360 evenly without buckling the sheet. Nip rollers 383 in front of continuous roll molder 360 may be matched to the speed of continuous roll molder 360 to provide for an even flow upon entry. In certain embodiments, the speed of nip rollers 383 may be set as low as about 20 feet per min after startup, and may be ramped up to over about 1,000 feet per min upon entry of thermoplastic sheet material 300.

With reference to FIG. 14, in some embodiments, nip rollers 383 at the entrance of continuous roll molder 360 may have braking capabilities. When nip rollers 383 at the entrance of continuous roll molder 360, or another infeed system, apply braking to thermoplastic sheet material 300, thermoplastic sheet material 300 may be slowed upon entering continuous roll molder 360. This may be done independently of the speed of continuous roll molder 360 via the PLC. In some embodiments, braking may be timed to slow thermoplastic sheet material 300 as it enters the zone of continuous roll molder 360 where a frangible element of a part is molded, allowing for thermoplastic sheet material 300 to be stretched thinner (e.g., reduction in thickness). In some embodiments, the part may be stretched up to about 600% elongation of its original length within continuous roll molder 360, and in other embodiments between about 20% and about 300%. In some embodiments, thermoplastic sheet material 300 may be thinned just at these frangible points of a part to reduce the shear needed to e.g., cut a part, e.g., a cap from a frangible cap strip part. In some embodiments, without braking, speed of the infeed system may be the same as the speed of the molds of continuous roll molder 360. In some embodiments, when the braking is applied, the speed of the infeed system may be reduced by between about 1% and about 10% in comparison to the speed of the molds of continuous roll molder 360. In certain embodiments, as braking is applied, thermoplastic material 300 may be selectively thinned because continuous roll molder 360 intakes thermoplastic material 300 at a faster rate than the thermoplastic material 300 is being fed through the nip rollers 383 or 384, causing it to stretch forward in the direction of the feed flow A, shown in FIG. 15. In other words, in certain embodiments, continuous roll molder 360 may be spinning at a linear speed faster than the nip rollers 383, 384.

In some embodiments, with reference to FIGS. 15 and 65, thermoplastic sheet material 300 may be conveyed from spool 500 to continuous roll molder 360. Accordingly, extruding, temperature control, and calendering may be omitted from the continuous roll molding process, in some embodiments. Spool 500 and any intermediate rollers may be at ambient temperature such that thermoplastic sheet material 300 enters continuous roll molder 360 at an ambient temperature.

Referring to FIG. 15, in some embodiments, continuous roll molder 360 may include one or molds to impart one or more shapes onto thermoplastic sheet material 300 as thermoplastic sheet material 300 is conveyed through continuous roll molder 360 to form a part. In some embodiments, the part is a frangible cap strip.

In some embodiments, the continuous roll mold process using continuous roll molder 360 may limit complexity by shaping a part, e.g., a frangible cap strip, after an extrusion process. In other words, continuous roll molding is a post material processed part formation manufacturing process such that the thermoplastic material has already been processed through a sheet extrusion phase, prior to being formed into parts. In contrast to injection molding, continuous roll molding does not produce a part by forcing molten thermoplastics into a die to cool. In certain embodiments, continuous roll molding may allow thermoplastic sheet material 300 (FIG. 3A) to either be hot or cold, e.g., in its glass state, its glass transition phase, its rubber phase, its molten phase, or a mix of these phases in the same sheet, prior to part formation.

In certain embodiments, as shown in FIG. 15, continuous roll molder 360 may include one or more blocks 363, e.g., steel blocks 363, above the frame of continuous roll molder 360. Blocks 363 may press against bearing blocks 365 to apply pressure to thermoplastic sheet material 300 to form parts. In some embodiments, heating thermoplastic sheet material 300 (FIG. 3A) may allow the applied pressure to be lower as the thermoplastic sheet material 300 is more malleable. For example, HDPE thermoplastic sheet material 300 having a thickness of about 0.045 inches at room temperature (e.g., about 21 degrees Celsius) may require a pressure of about 75,000 psi to form parts. Increasing the temperature of HDPE thermoplastic sheet material 300 to about 70 degrees Celsius may allow the pressure to be lowered to about 3,500 psi.

Figure 16:
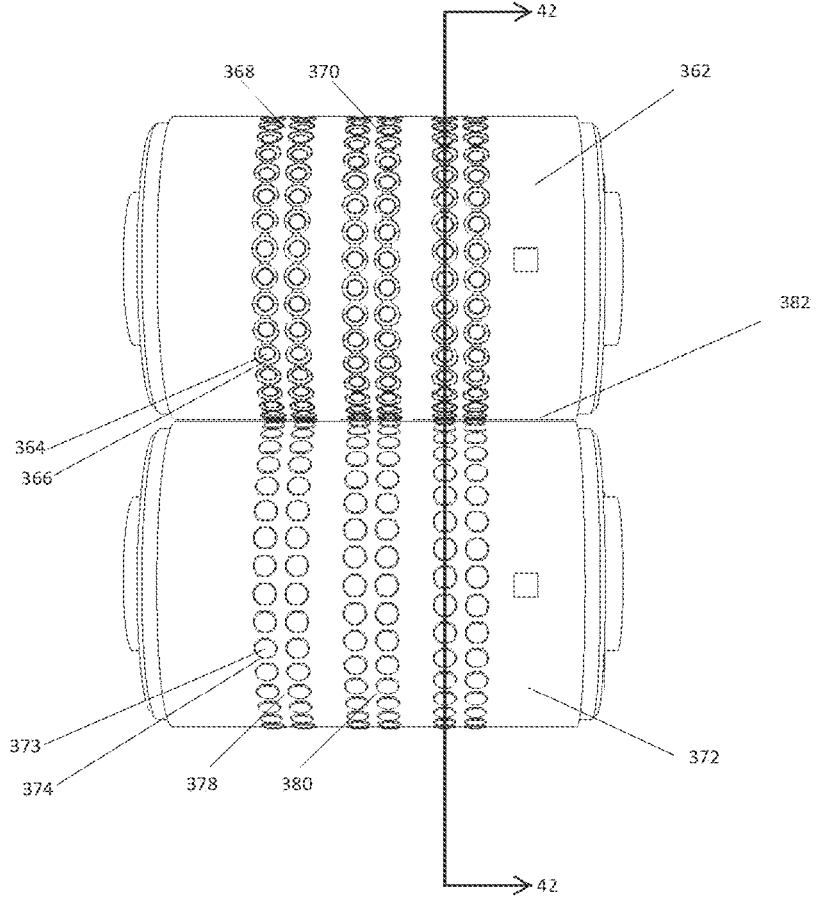
FIG. 16 shows a side view of an upper continuous roll mold and a lower continuous roll mold of FIG. 15.

In certain embodiments, continuous roll molder 360 may include one or more molds circuitously aligned around a roller. As shown in FIG. 16, in some embodiments, continuous roll molder 360 may include upper mold 362 and lower mold 372. Upper mold 362 and lower mold 372 may be round elements having part molds machined into outer surfaces or into segment molds inserted into upper mold 362 and lower mold 372. In certain embodiments, both upper mold 362 and lower mold 372 may include engineered designs for forming parts. As described herein, upper mold 362 may be disposed above lower mold 372 in continuous roll molder 360. However, it should be understood that lower mold 372 may be above or adjacent to upper mold 362, in some embodiments.

In some embodiments, roll molder nip gap 382, shown in FIG. 16, may be disposed between upper mold 362 and lower mold 372. In an embodiment, thermoplastic sheet material 300 (FIG. 3A) may enter continuous roll molder 360 through roll molder nip gap 382. In some embodiments, upper mold 362 may form a top surface of a part. In some embodiments, lower mold 372 may form a bottom surface of a part.

In some embodiments, upper mold 362 may include one or more shapes 364. Shapes 364 as shown in FIG. 16 are illustrative for one particular shape of part, and it will be understood that shapes 364 may be adjusted to form differently shaped parts. Shapes 364 may press onto thermoplastic material 300 (FIG. 3A) to form a part. In some embodiments, shapes 364 may include one or more knives 366 to cut thermoplastic material 300. In an embodiment, knives 366 may facilitate cutting and/or perforating of a part on lower mold 388. In some embodiments, upper mold 362 may include one or more horizontal knives 367. In some embodiments, knives 366 may run perpendicularly to feed flow direction A (FIG. 7) of thermoplastic sheet material 300. In some embodiments, shapes 364 may include horizontal knives 367 to facilitate cutting for creating a shear zone on a part.

Figure 17:
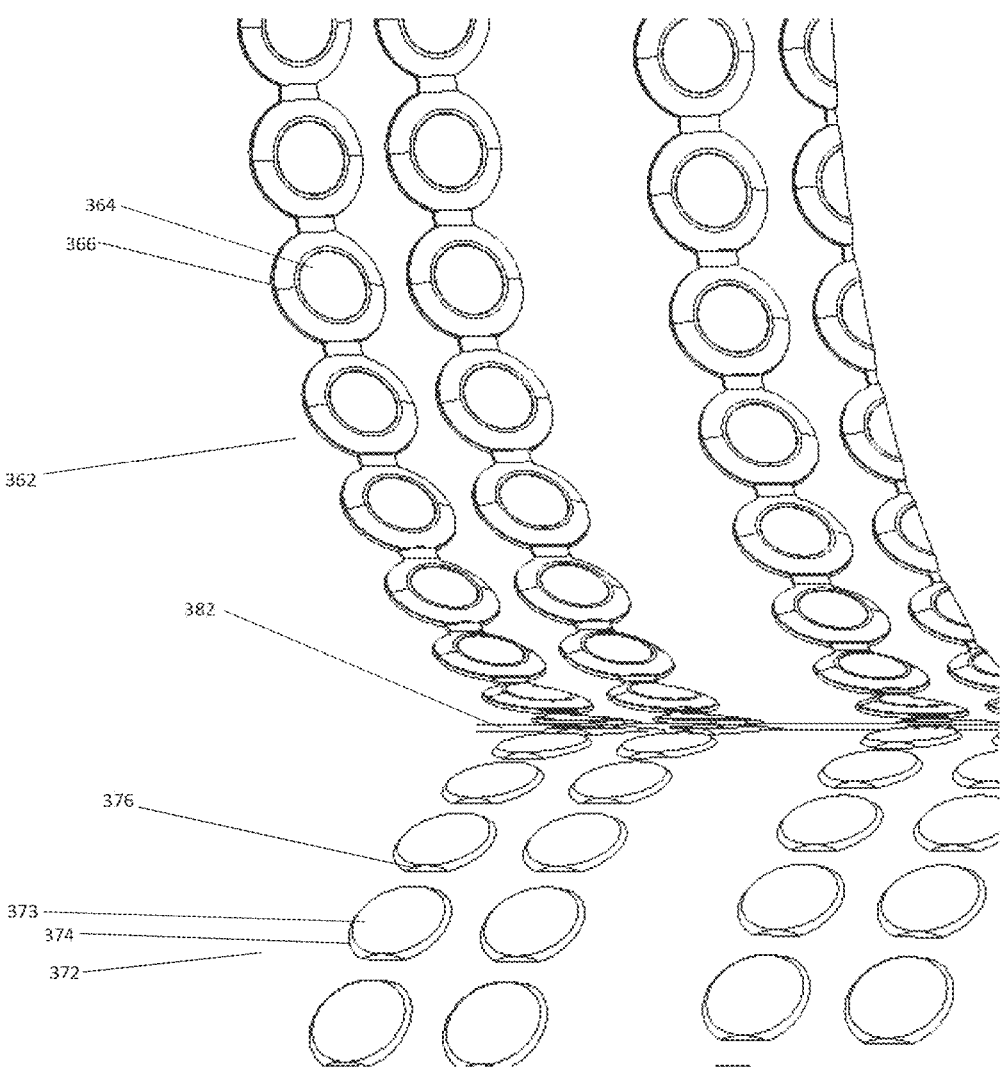
FIG. 17 shows an enlarged perspective view of the upper continuous roll mold and the lower continuous roll mold of FIG. 16.
Figure 18:
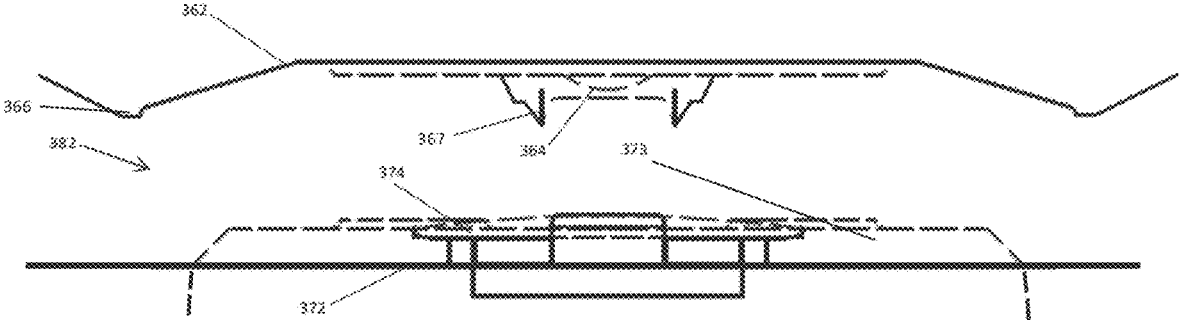
FIG. 18 shows a schematic profile of continuous roller molds according to various embodiments.

With reference to FIGS. 17-18, in some embodiments, upper mold 362 may include perpendicular knives 366 and horizontal knives 367. Because it is easier to cut along and across the grain with knives than across something more amorphous and unstructured, having both directional knives 366, 367 that cut along and across the macromolecular flow direction may increase the life of the knives. In some embodiments, the typical life of the knives may be between about 1 million and about 10 million revolutions (e.g., cuts). In certain embodiments, use of filler in thermoplastic sheet material 300 (FIG. 15) may reduce the amount of cuts. In some embodiments, the lifetime of the knives when cutting linear molecular material along and across the grain may about 50% greater than with amorphous material.

In some embodiments, lower mold 362 may include one or more shapes 374 to impart a shape onto a part. In some embodiments, shapes 374 may include one or more surfaces to provide surfaces against which knives 366 of upper mold 362 may cut against. In this way, lower mold 362 may be an anvil against which knives 366 cut.

In addition, shapes 374 of lower mold 372 may be made of a less hard steel or aluminum in comparison to knives 366 of upper mold 362. Upper mold 362 and lower mold 372 may have between about a Rockwell B 30 to 105 hardness and about a Rockwell C 10 to 70 hardness. In certain embodiments as shown with reference to FIG. 18, the materials of upper mold 362 and lower mold 372 may facilitate kiss cutting, or cutting parts between upper mold 362 and lower mold 372, by allowing knives 366 to land on the same plane as the surfaces of shapes 374 while limiting contact between knives 366 and surfaces of shapes 374. In this way, the overall shape of the part may be imparted onto thermoplastic sheet material 300 (FIG. 15). In other embodiments, crush cutting, or perforating methods may be used. In further embodiments, both kiss cutting and crush cutting cut along the profiles of the edge of the parts may be used. While kiss cutting lifts knives 366 from the surfaces of shapes 374 after lightly touching thermoplastic sheet material 300, crush cutting fully lowers knives 366 into or beyond surfaces of shapes 374. Accordingly, crush cutting may create a crush effect between knives 366 and surfaces of shapes 374, cutting and compressing thermoplastic sheet material 300 to form the parts.

In some embodiments, production tolerances may be within about 0.005 millimeters (mm). In other embodiments, depths within molds of continuous roll molder 360 may depend on part dimensions and material temperatures. In some embodiments, depths of walls that may be formed from thermoplastic sheet material 300 may be up to about 3 inches deep with an about 0.5 inch thick sheet. In other embodiments, the thermoplastic sheet material 300 may be stretched, moved, and thinned through the molds up to about 650% its original thickness, such as between about 300% and about 650%. In certain embodiments, thermoplastic sheet material 300 may be thinned between about 0.005 inch and about 4 inches.

In some embodiments, surface finishes may affect the part formation by increasing or decreasing surface contact between the finish on continuous roll molder 360 (FIG. 14), and the surfaces of thermoplastic sheet material 300, which may affect how thermoplastic sheet material 300 flows and forms in continuous roll molder 360. In certain embodiments, the gloss surface finish between about 0.2 Ra and about 16 Ra on continuous roll molder 360 may reduce the resistance to flow of thermoplastic sheet material 300, allowing it to flow more easily and uniformly into and through continuous roll molder 360. In other embodiments, a rougher matte surface finish from about 16 Ra to about 60 Ra may increase the resistance to flow of thermoplastic sheet material 300, leading to flow changes, allowing for increasing back pressure or a slowing of the flow, which is used for thickening and thinning particular dimensions in the final part. In still further embodiments, the rough satin finish between about 60 Ra and about 300 Ra may increase even more the resistance to flow of the material, leading to flow changes, allowing for increasing back pressure or a slowing of the flow, which is used for thickening and thinning particular dimensions in the final part.

In embodiments, the speed of the flow of thermoplastic sheet material 300 may be increased with the presence of larger, or more complex dimensions due to reduced surface contact, or the speed of the flow of the material may be reduced in simpler dimensions due to an increase in surface contact. In other words, the speed of flow of thermoplastic sheet material 300 may be slower across simpler dimensions having a lower surface roughness in comparison to larger or more complex dimensions having a higher surface roughness. Simpler dimensions may include the smooth or polished surfaces of continuous roll molder 360 or thermoplastic sheet material 300 while more complex dimensions may include first shape 364 and second shape 374 and rougher thermoplastic sheet material 300. Varying roughness may facilitate shaping and balancing features on the shapes on the part, as well as speed of exit from continuous roll molder 360 of the part and waste, which will be discussed further below.

Figure 19A:
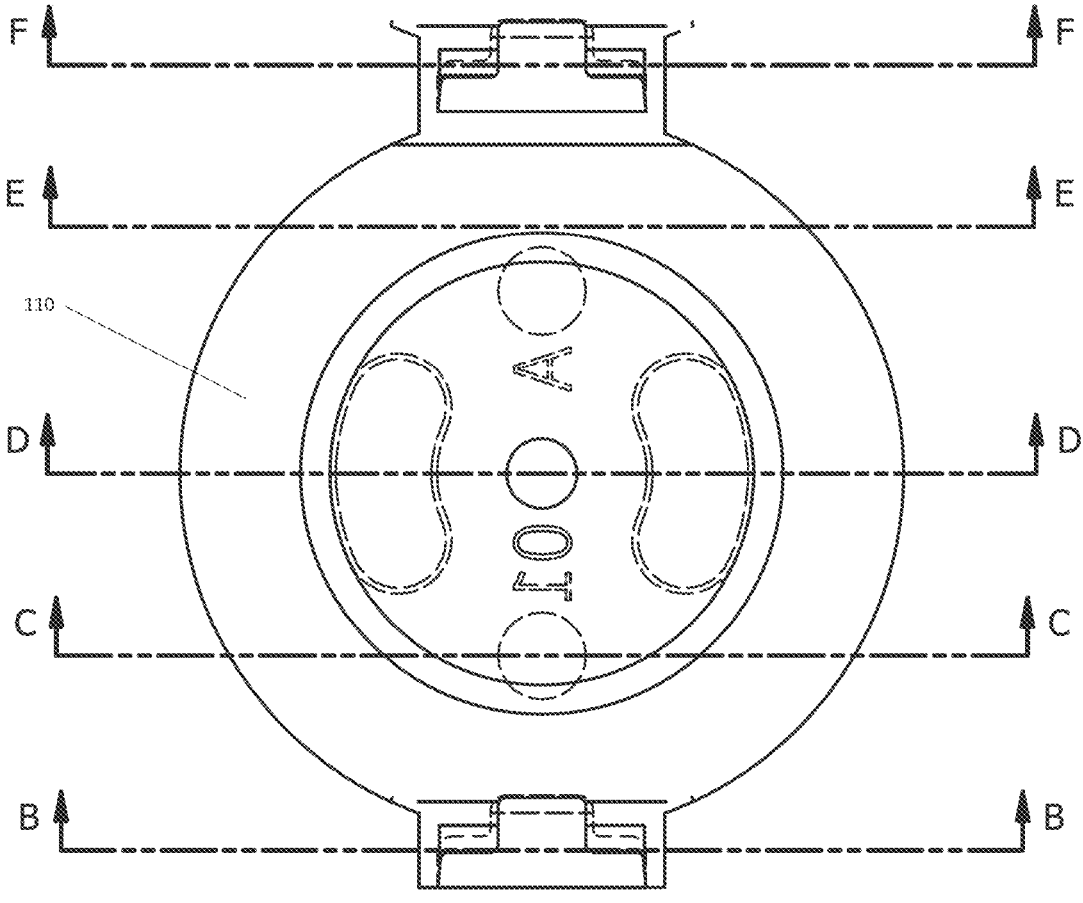
FIG. 19A shows a part formed by continuous roller molds according to various embodiments.
Figure 19B:
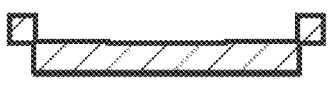
FIG. 19B shows a profile of the part of FIG. 19A along line B-B.
Figure 19C:
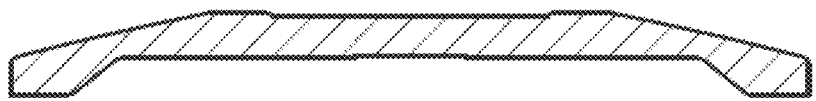
FIG. 19C shows a profile of the part of FIG. 19A along line C-C.
Figure 19D:
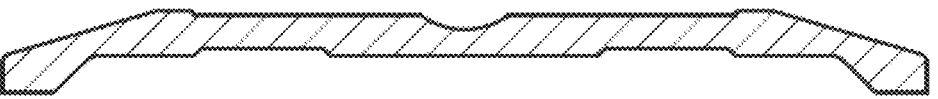
FIG. 19D shows a profile of the part of FIG. 19A along line D-D.
Figure 19E:
FIG. 19E shows a profile of the part of FIG. 19A along line E-E.
Figure 19F:
FIG. 19F shows a profile of the part of FIG. 19A along line F-F.

In certain embodiments, as thermoplastic sheet material 300 (FIG. 3A) is conveyed through continuous roll molder 360, the geometry of upper mold 362 and lower mold 372 may continuously change to form parts. With reference to FIGS. 18-19F, upper mold 362 (FIG. 16) and lower mold 372 (FIG. 16) roll over thermoplastic sheet material 300, applying pressure and temperature, and causing thermoplastic sheet material 300 to form into parts. In some embodiments, the geometry of continuous roll molder 360 may affect the flow of thermoplastic sheet material 300 (FIG. 3A). Greater pressure and higher temperatures may cause thermoplastic sheet material 300 to move more quickly, while cooler temperatures and lower pressures may cause thermoplastic sheet material 300 to move more slowly.

Figure 20:
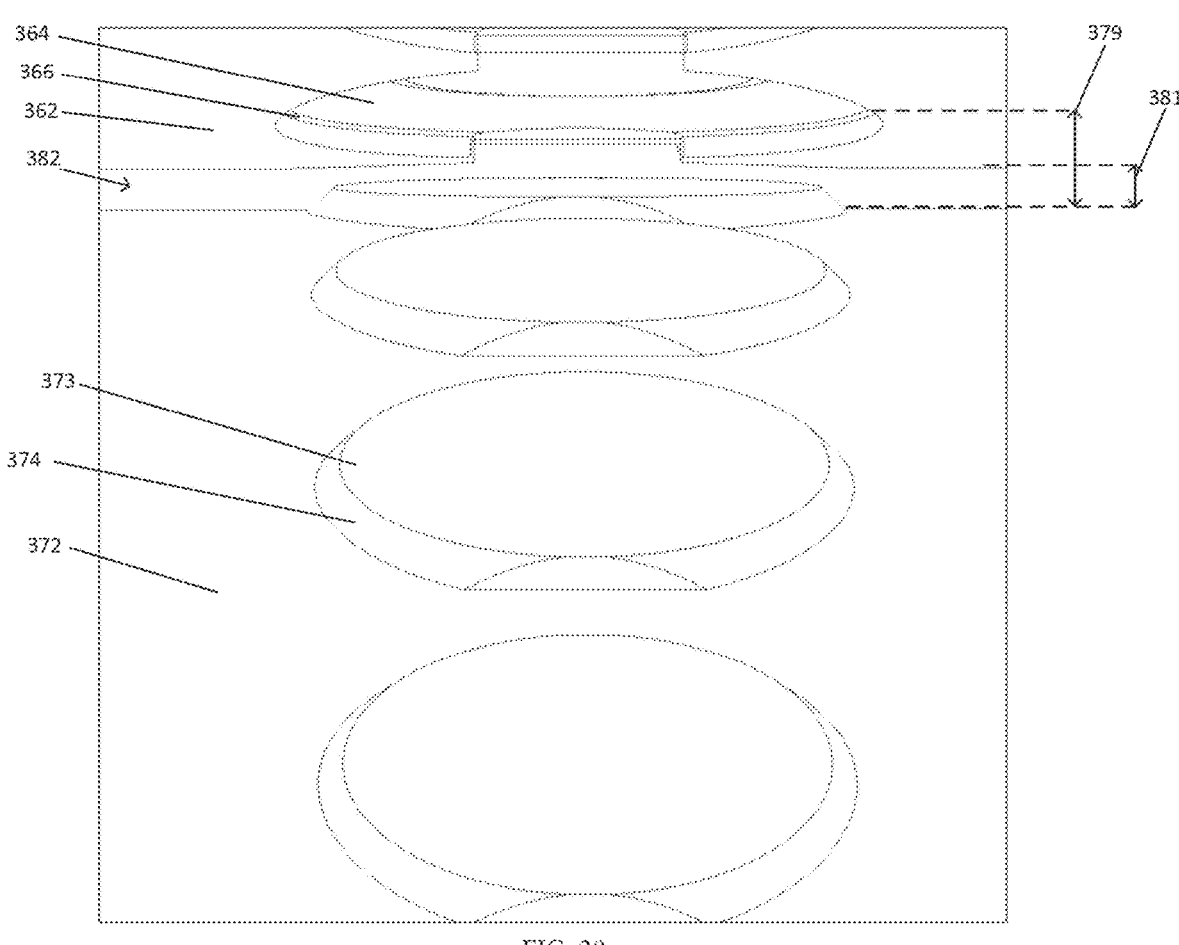
FIG. 20 shows an enlarged front view of the upper continuous roll mold and the lower continuous roll mold of FIG. 16.
Figure 21:
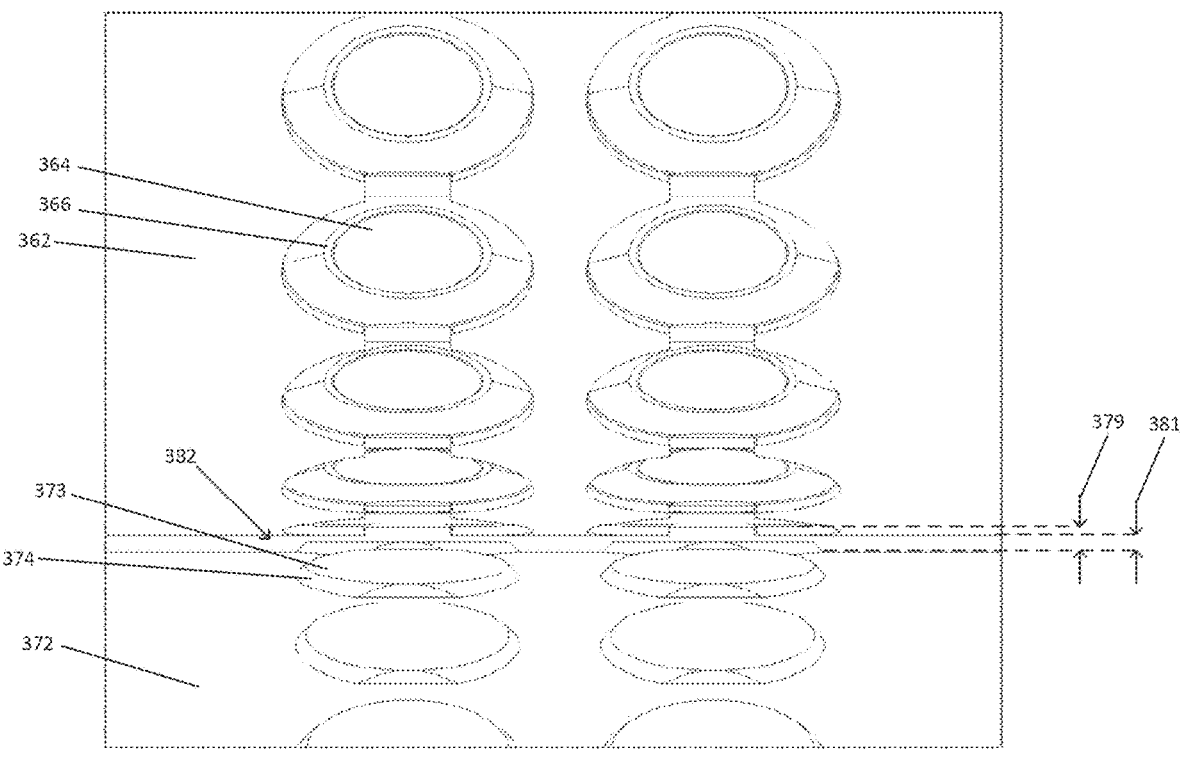
FIG. 21 shows an enlarged front view of the upper continuous roll mold and the lower continuous roll mold of FIG. 16.

Turning to FIGS. 20-29, in some embodiments, gap distances between upper mold 362 (FIG. 16) and lower mold 372 (FIG. 16) and components thereof may affect the flow and discharge of thermoplastic sheet material 300 (FIG. 3A). Embodiments of FIGS. 20-21 show upper mold 362 and lower mold 372 in an enlarged view. As shown, upper mold 362 and lower mold 372 may be separated by roll molder nip gap 382 to allow flow of thermoplastic sheet material 300. In some embodiments, faces of upper mold 362 and lower mold 372 may be separated by a gap 381. Gap 381 may be between about 0.05 and about 0.04 inches, such as between about 0.042 and about 0.048 inches, such as about 0.045 inches. In this way, thermoplastic sheet material 300 having a thickness of between about 0.040 and 0.045 inches may flow, or advance, between upper mold 362 and lower mold 372.

In some embodiments, shape 364 and shape 374 may be separated by a gap 379. Gap 379 may be between about 3 micron and about 7 micron, such as between about 4 micron and about 6 micron, such as about 5 micron. Gap 379 may facilitate kiss cutting, or cutting parts between upper mold 362 (FIG. 16) and lower mold 372 (FIG. 16). For example, shapes 374 of lower mold 372 may be made of a less hard steel in comparison to knives 366 (FIGS. 17-18) of upper mold 362. Gap 379 may provide separation between knives 366 and shapes 374 of lower mold 372 to allow knives 366 to land on the same plane as the surfaces of shapes 374 while limiting contact between knives 366 and surfaces of shapes 374. In this way, the overall shape of the part may be imparted onto thermoplastic sheet material 300 (FIG. 15) without damaging lower mold 372. Without gap 379, knives 366 may crash onto shapes 374 of lower mold 372, damaging lower mold 372 and preventing production of parts.

Nip gap 382 may be at least the same size as the larger of gap 379 and gap 381. Nip gap 382 may allow conveyance of thermoplastic sheet material 300 (FIG. 3A) through gap 381 between faces of upper mold 362 and lower mold 374. Gap 379 may be smaller such that the flow of thermoplastic sheet material 300 is drawn to shapes 364 and shapes 374.

Figure 22:
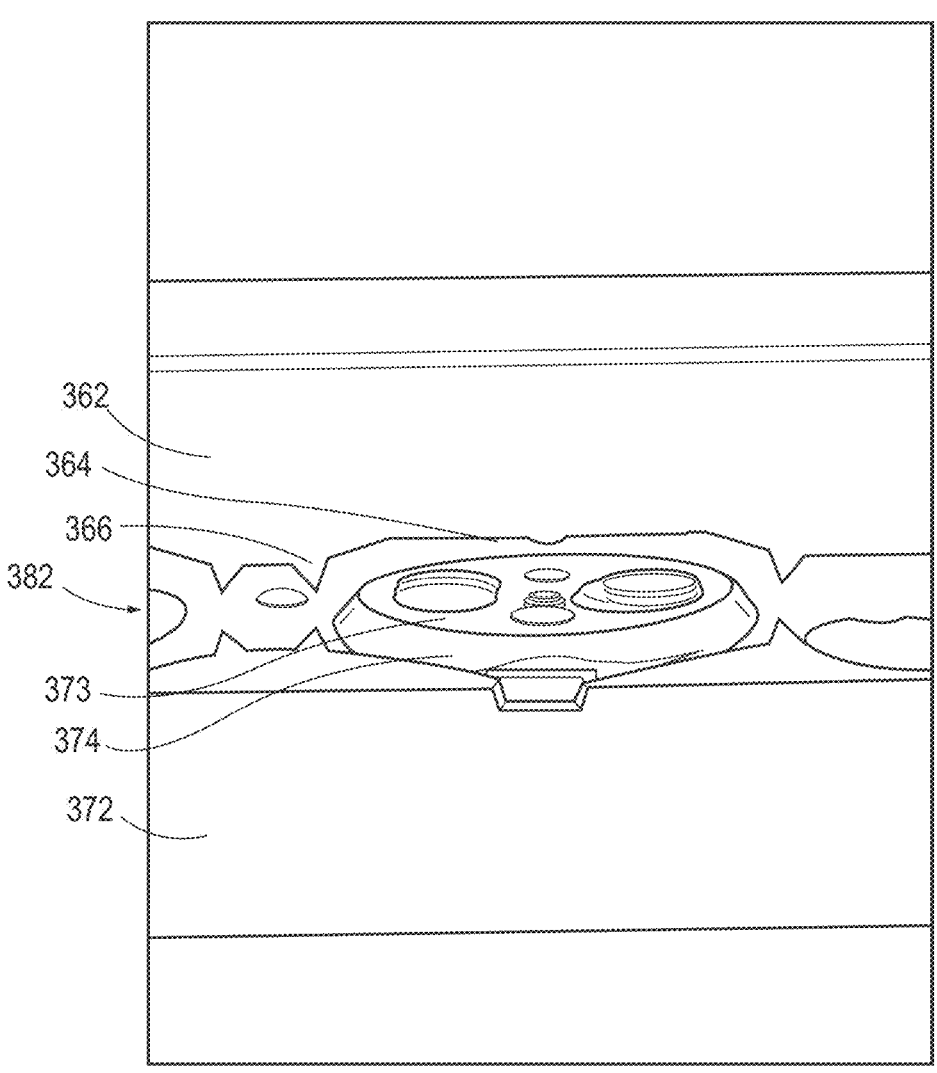
FIG. 22 shows a perspective view of the upper continuous roll mold and the lower continuous roll mold of FIG. 16.
Figure 23:
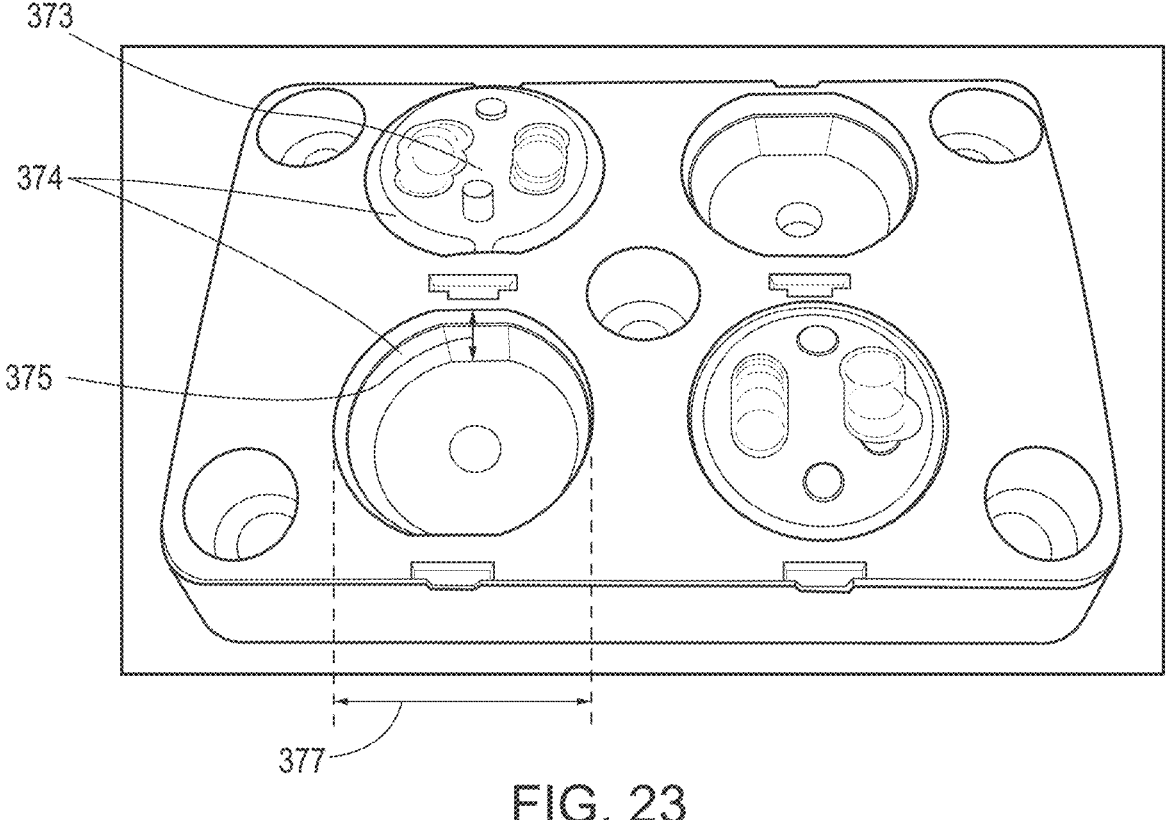
FIG. 23 shows a perspective view of an insert of the lower continuous roll molder and the lower continuous roll mold of FIG. 16.

In some embodiments, upper mold 362 (FIG. 16) may form a top surface of a part. In some embodiments, lower mold 372 (FIG. 16) may form a bottom surface of a part. FIGS. 20-23 show an insert 373, which may be disposed within shape 374 of lower mold 372. With reference to FIGS. 22-23, insert 373 may extend between surfaces of shapes 374. With reference to FIG. 23, insert 373 may extend laterally along a lateral length 377 of shape 374. In addition, insert 373 may extend transversely beyond a transverse length 375 of shape 374. In this way, insert 373 may fill shape 374 laterally and extend above shape 374 transversely. By extending above shape 374 transversely, in some embodiments, insert 373 may form a bottom surface of a part. As thermoplastic sheet material 300 (FIG. 3A) flows, or advances, between upper mold 362 and lower mold 372, insert 373 may contact thermoplastic sheet material 300 and impart a shape onto a bottom side of thermoplastic sheet material 300, forming a bottom surface of a part. In certain embodiments, insert 373 extends above shape 374 of lower mold 372 transversely additionally and may push thermoplastic sheet material 300 into upper mold 362. In this way, shape 364 of upper mold 362 may impart a shape onto a top side of thermoplastic sheet material 300, forming a top surface of a part. Accordingly, insert 373 may act as a negative for upper mold 362 by pushing thermoplastic sheet material 300 into upper mold 362 for molding.

In some embodiments, upper mold 362 may include one or more shapes 364 and lower mold 372 may include one or more inserts 373 to form thermoplastic sheet material 300 (FIG. 3A) into a part, e.g., a frangible cap strip. In some embodiments, shape 364 and insert 373 have different profiles. In some embodiments, shape 364 and insert 373 are complimentary. In some embodiments, shape 364 and insert 373 have the same profiles. In some embodiments, upper mold 362 and lower mold 372 are timed such that shape 364 and insert 373 are matched to produce a part, e.g., a frangible cap strip. In other words, shape 364 and insert 373 impart shapes at the same or about the same time to produce a part, e.g., a frangible cap strip.

Figure 24:
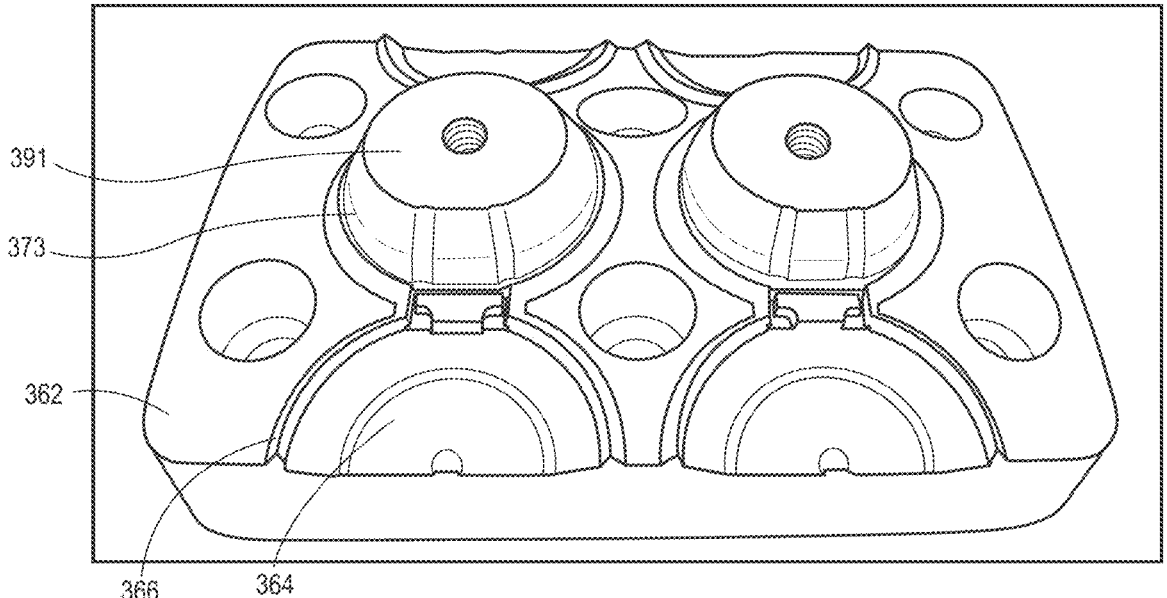
FIG. 24 shows a perspective view of the upper continuous roll mold and an insert of the lower continuous roll mold of FIG. 16.

In some embodiments, insert 373 may include material that expands at a greater rate under heat in comparison to the material of shape 364 (FIG. 18) and shape 374 (FIG. 18) of upper mold 362 (FIG. 16) and lower mold 372 (FIG. 16). In some embodiments, insert 373 may include aluminum. In other embodiments, insert 373 may be made entirely of aluminum, or substantially of aluminum. The aluminum may have between about a Rockwell A 35 to 6 hardness an da Rockwell B 29 to 96 hardness. In some embodiments, while shape 364 and shape 374 of upper mold 362 and lower mold 372 include steel, insert 373 may include aluminum. In some embodiments, aluminum expands at a greater rate than steel when heated. In some embodiments, to accommodate for the expansion, insert 373 may be secured, or fixed, to lower mold 372. In some embodiments, insert 373 may be bolted to lower mold 372 within shape 374, and from below insert 373, as shown with reference to FIG. 24. In FIG. 24, a bottom surface 391 of insert 373 is shown, which may be bolted to lower mold 372 within shape 374. In FIG. 24, upside-down inserts 373 are shown resting on corresponding upper mold 362. In embodiments where insert 373 is secured within shape 374, insert 373 may expand upward, or transversely, under heat beyond shape 374 such that insert 373 presses further into thermoplastic sheet material 300 (FIG. 3A) to form a bottom shape of a part, and pushes thermoplastic sheet material 300 further into shape 364 of upper mold 362 to form a top shape of a part. In some embodiments, the greater expansion of the aluminum insert 373 may also be important to maintain a gap distance between shape 364 of upper mold 362, which may be made of a harder steel, and shape 374 of lower mold 372, to limit damage to lower mold 372. Expansion of insert 373 may maintain this gap, e.g., gap 379 (FIGS. 20-21). In this way, insert 373 may act as a bumper between shape 374 of upper mold 362 and shape 374 of lower mold 372, which may lift upper mold 362 away from lower mold 372 to maintain a gap therebetween.

In certain embodiments, insert 373 may include a mixture of aluminum and other materials, in other embodiments, insert 373 may include non-aluminum materials. These materials, like aluminum, may expand at a greater rate in comparison to steel such that insert 373 may act as a bumper between shape 374 of upper mold 362 and shape 374 of lower mold 372. As a bumper, insert 373 may lift upper mold 362 away from lower mold 372 to maintain a gap therebetween. In some embodiments, insert 373 may be within shape 374 of lower mold 372. Alternatively, insert 373 may be disposed adjacent a respective shape 374. In some embodiments, multiple inserts 373 may be disposed along lower mold 372 such as both within and next to shapes 374 of lower mold 372. In some embodiments, insert 373 may be outside of continuous roll molder 360 and may extend between upper mold 362 and lower mold 372 to act as a bumper.

In certain embodiments, heat from the operations of the continuous roll molder 360 may cause the upper mold 362, lower mold 372, and frame 393 and other components to expand. This may result in a decrease in gap distances, e.g., gap 379 (FIGS. 20-21) between shape 364 (FIG. 18) of upper mold 362 (FIG. 16) and shape 374 (FIG. 18) of lower mold 372 (FIG. 16), and gap 381 (FIGS. 20-21) between faces of upper mold 362 and lower mold 372. In some embodiments, temperature control may facilitate maintaining the appropriate gap. Temperature control will be discussed with reference to FIGS. 25-30.

In some embodiments, during the continuous roll molding process, continuous roll molder 360 (FIG. 15) may be subject to heat, which may be monitored and counteracted for proper part formation. Accordingly, in some embodiments, continuous roll molder 360 may be housed in an environment where the ambient temperature is controlled. In some embodiments, this environment may be a room or an entire facility. In other embodiment, the environment may be an enclosure. The temperature within the environment may be fixed. In some embodiments, the ambient temperature of the air in the environment is about 62 degrees Fahrenheit, or a range of about 57 to about 67 degrees Fahrenheit. The temperature-controlled environment may cool the continuous roll molder 360 and components thereof, e.g., frame 393 (FIG. 15), thereby maintaining the environment temperature at between about 72 and about 76 degrees Fahrenheit during the continuous roll molding process, the temperature being monitored and measured inside of the environment by a digital thermometer and by the air conditioning unit, according to an embodiment.

Figure 25:
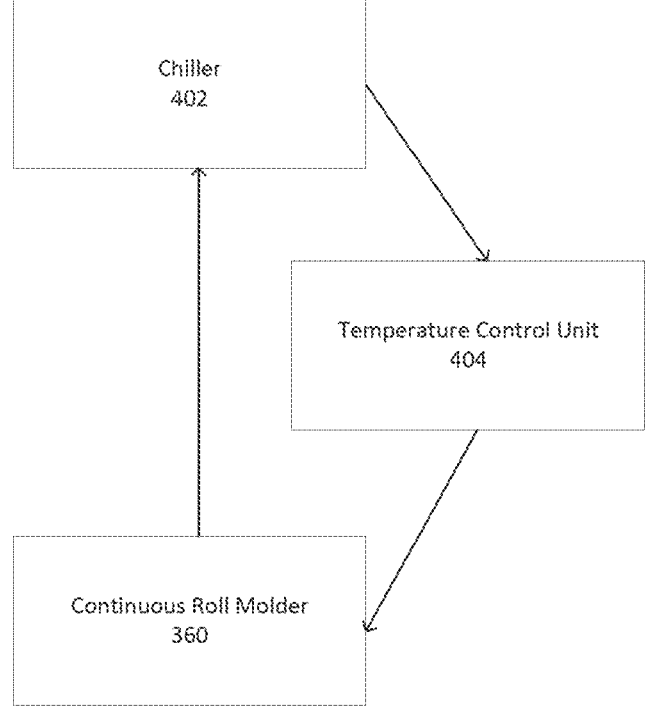
FIG. 25 shows a schematic of a cooling loop according to various embodiments.

In some embodiments, temperature control may maintain certain temperatures of one or more individual components of continuous roll molder 360 (FIG. 15). With reference to FIG. 25, a temperature control loop may include a chiller 402, a temperature control unit 404, and continuous roll molder 360. Chiller 402 may house and distribute a temperature-controlled mixture and may be set at a temperature, such as about 50 degrees Fahrenheit. In some embodiments, the temperature-controlled mixture may include water and coolant, such as about 70%-80% water and about 20%-30% coolant. In some embodiments, the coolant may be 100% propylene glycol.

In some embodiments, temperature control unit 404 may be coupled to chiller 402. Chiller 402 may distribute the temperature-controlled mixture to temperature control unit 404, which may adjust the temperature of the temperature-controlled mixture. In some embodiments, temperature control unit 404 may warm the temperature-controlled mixture. In some embodiments, the temperature of the temperature-controlled mixture is set to between about 5 and about 15 degrees above the temperature of a frame 393 (FIG. 15) of continuous roll molder 360, once the frame 393 has reached a steady state temperature in a temperature-controlled environment. For example, in one embodiment, if frame 393 is at about 75 degrees Fahrenheit, the temperature of temperature-controlled mixture may be set to 85 degrees Fahrenheit. In this way, the temperature of upper mold 362 and lower mold 388 may be maintained at between about 72 degrees Fahrenheit and about 76 degrees Fahrenheit. Continuous roll molder 360 may be coupled to temperature control unit 404. Accordingly, temperature control unit 404 may distribute the temperature-controlled mixture to continuous roll molder 360 of continuous roll molder 360. The temperature-controlled mixture may be circulated through continuous roll molder 360 before exiting continuous roll molder 360 and returning to chiller 402.

Figure 26:
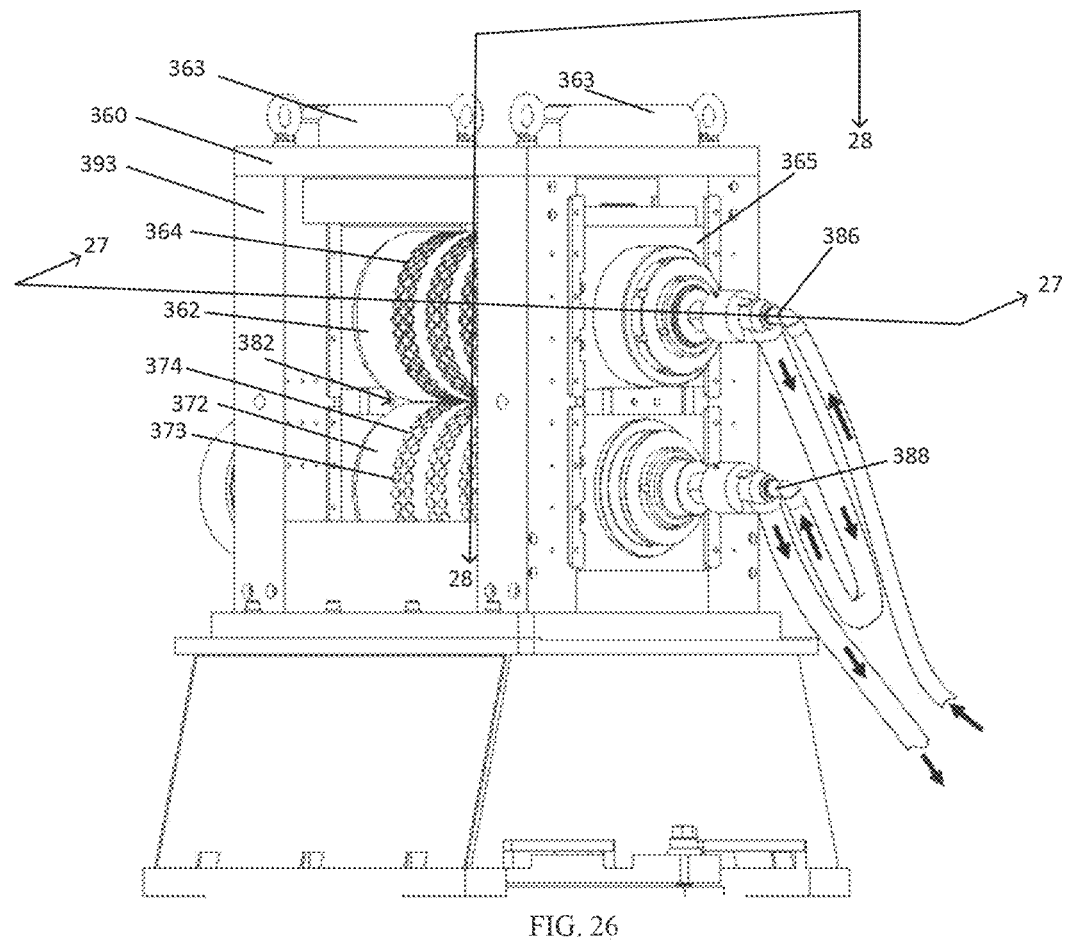
FIG. 26 shows a front perspective view of the continuous roll molder of FIG. 16 according to various embodiments.
Figure 27:
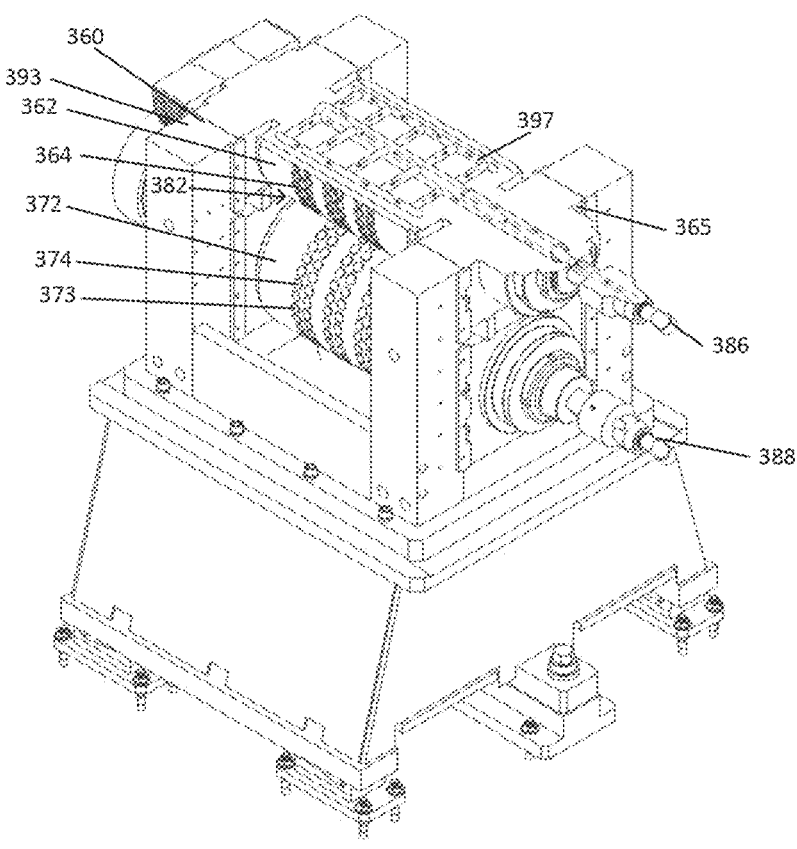
FIG. 27 shows a perspective cross-section view of the upper continuous roll mold and the lower continuous roll mold of FIG. 26 along line 27-27.

Referring to FIG. 26, in some embodiments, continuous roll molder 360 may include heating and cooling lines 386 for upper mold 362. In some embodiments, continuous roll molder 360 may include heating and cooling lines 386 for lower mold 388. In this way, upper mold 362 and lower mold 388 may receive the temperature-controlled mixture from temperature control unit 404 (FIG. 25) and return the temperature-controlled mixture to chiller 402 (FIG. 25). FIG. 27 shows an embodiment of circulating the temperature-controlled mixture through continuous roll molder 360. Bearing block 365 may receive the temperature-controlled mixture from temperature control unit 404. Bearing blocks 365 can be disposed on frame 393. Temperature control of continuous roll molder 360 may also affect bearing blocks

365, which are affected directly by expansion and contraction of frame 393, and also cooling.

As shown, the temperature-controlled mixture may flow through bearing block 365 and through one or more molds, e.g., upper mold 362 lower mold 372. In one embodiment, the temperature-controlled mixture may flow through upper mold 362 and through lower mold 372 in series, and exit through bearing block 365 to return to chiller 402. In another embodiment, the temperature-controlled mixture may flow through upper mold 362 and lower mold 372 in parallel, and exit frame 393 to return to chiller 402. A series of channels 379 may extend through each of upper mold 362 and lower mold 372 to circulate the temperature-controlled mixture through upper mold 362 and lower mold 372.

Figure 28:
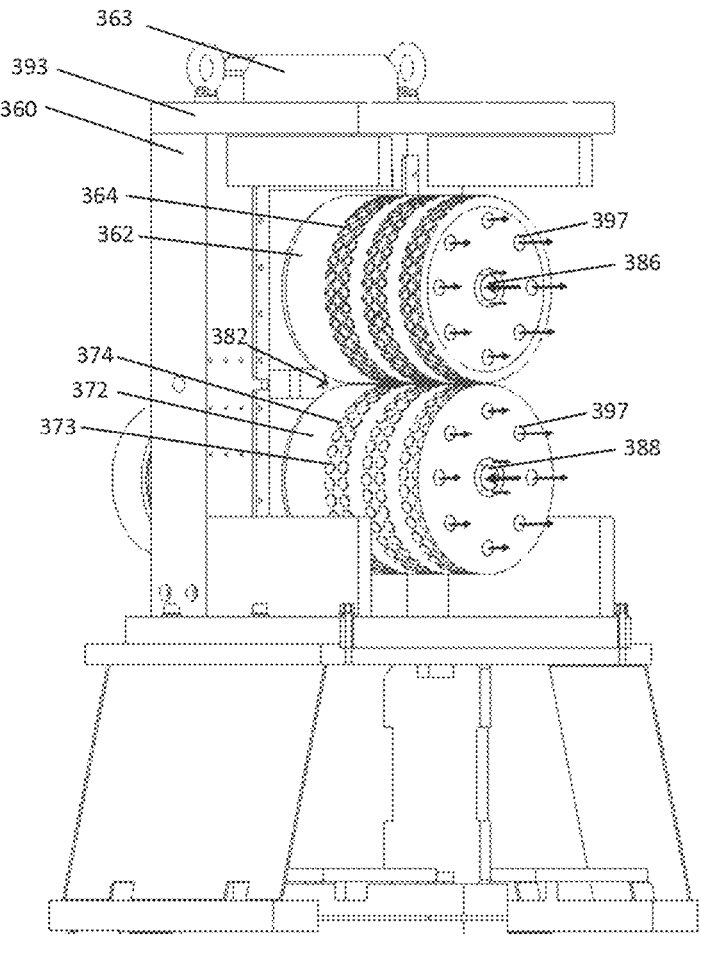
FIG. 28 shows a perspective cross-section view of the upper continuous roll mold and the lower continuous roll mold of FIG. 26 along line 28-28.
Figure 29:
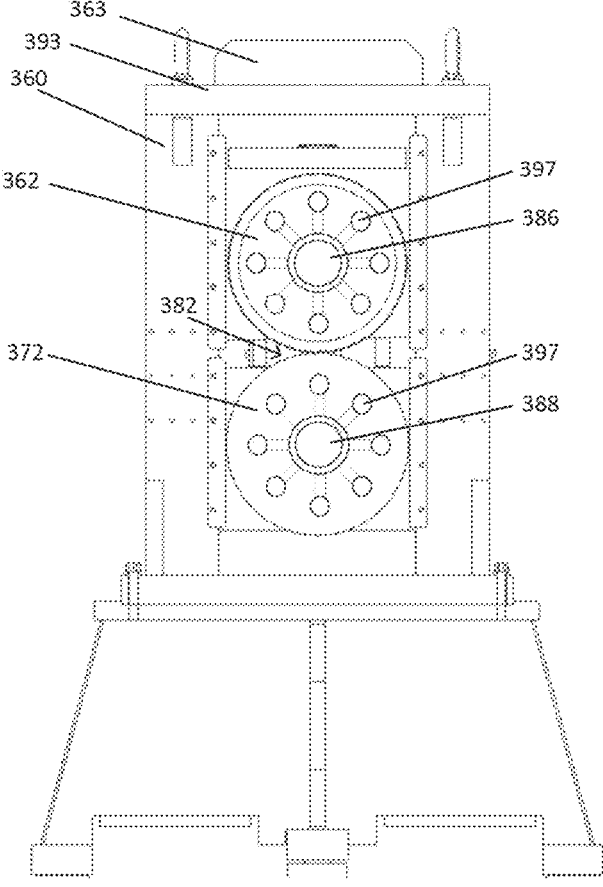
FIG. 29 shows a side cross-section view of the upper continuous roll mold and the lower continuous roll mold of FIG. 28.
Figure 30:
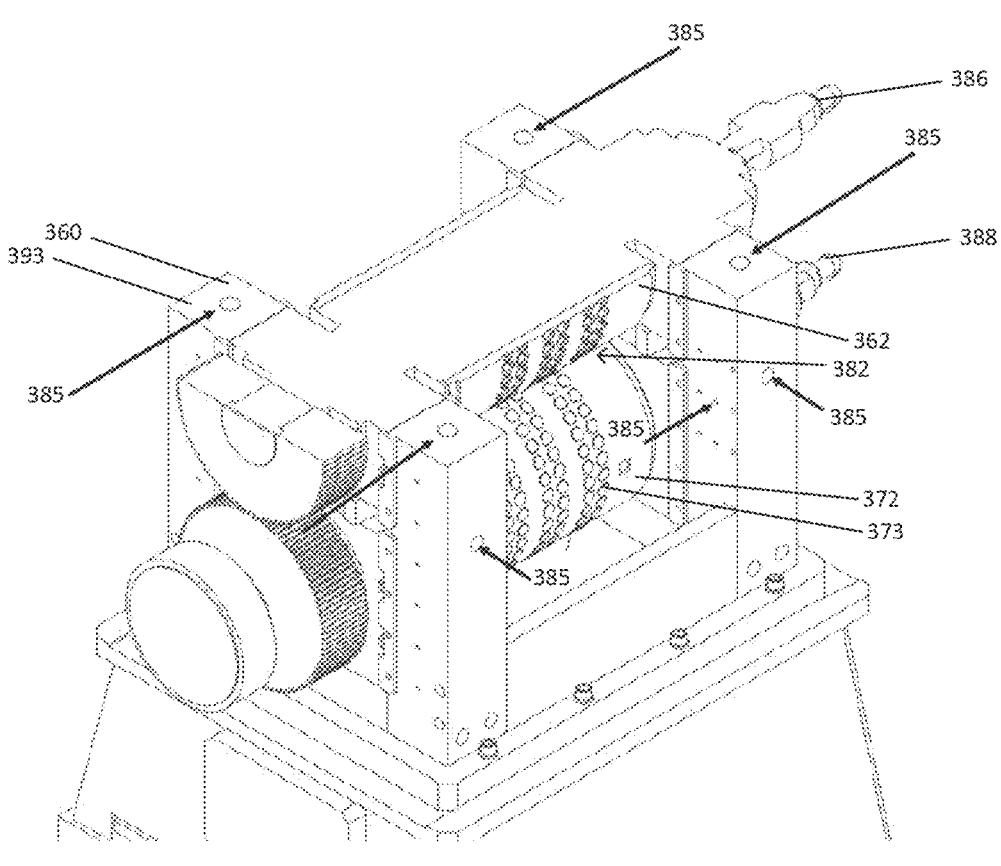
FIG. 30 shows a perspective cross-section view of the upper continuous roll mold and the lower continuous roll mold of FIG. 27 according to various embodiments.
Figure 31:
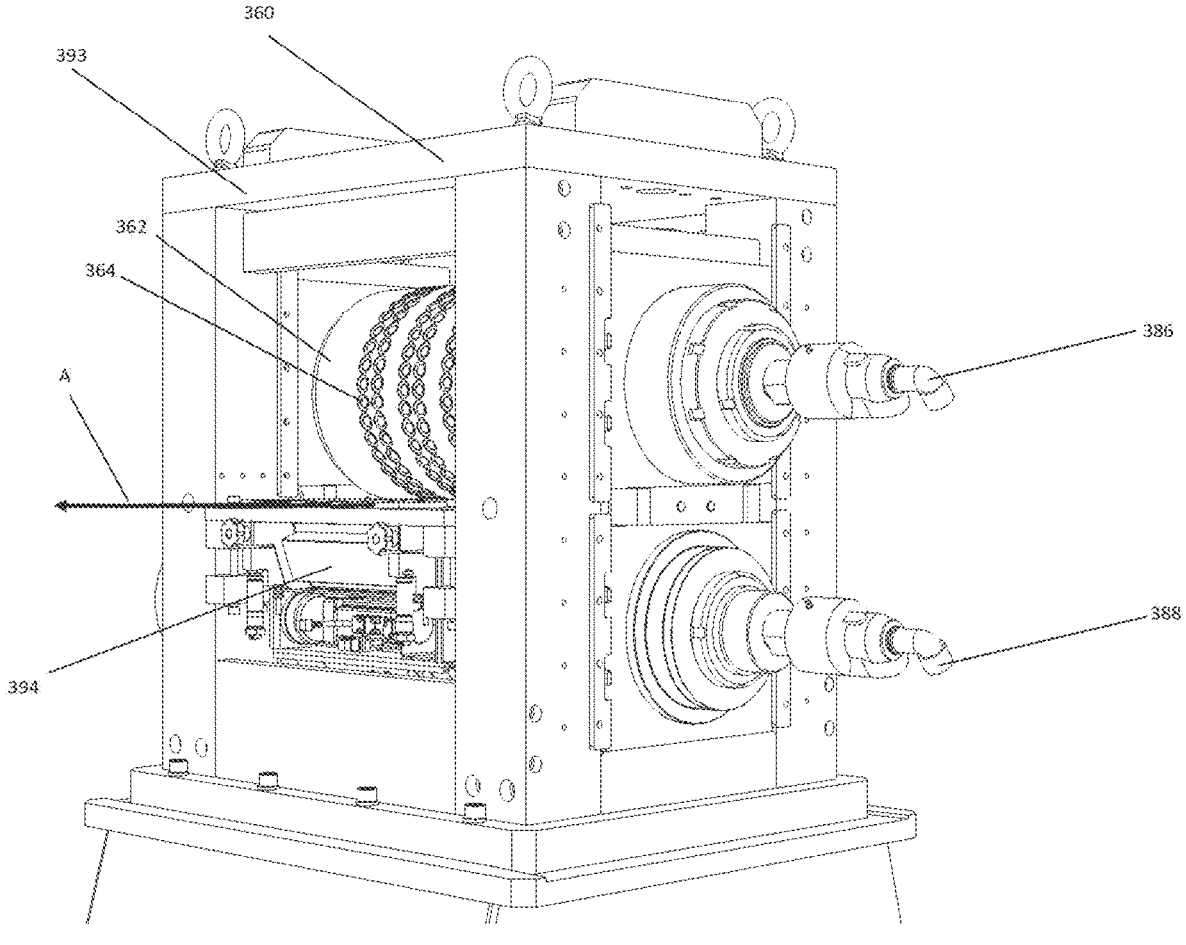
FIG. 31 shows a rear perspective view of the continuous roll molder of FIG. 15.
Figure 32:
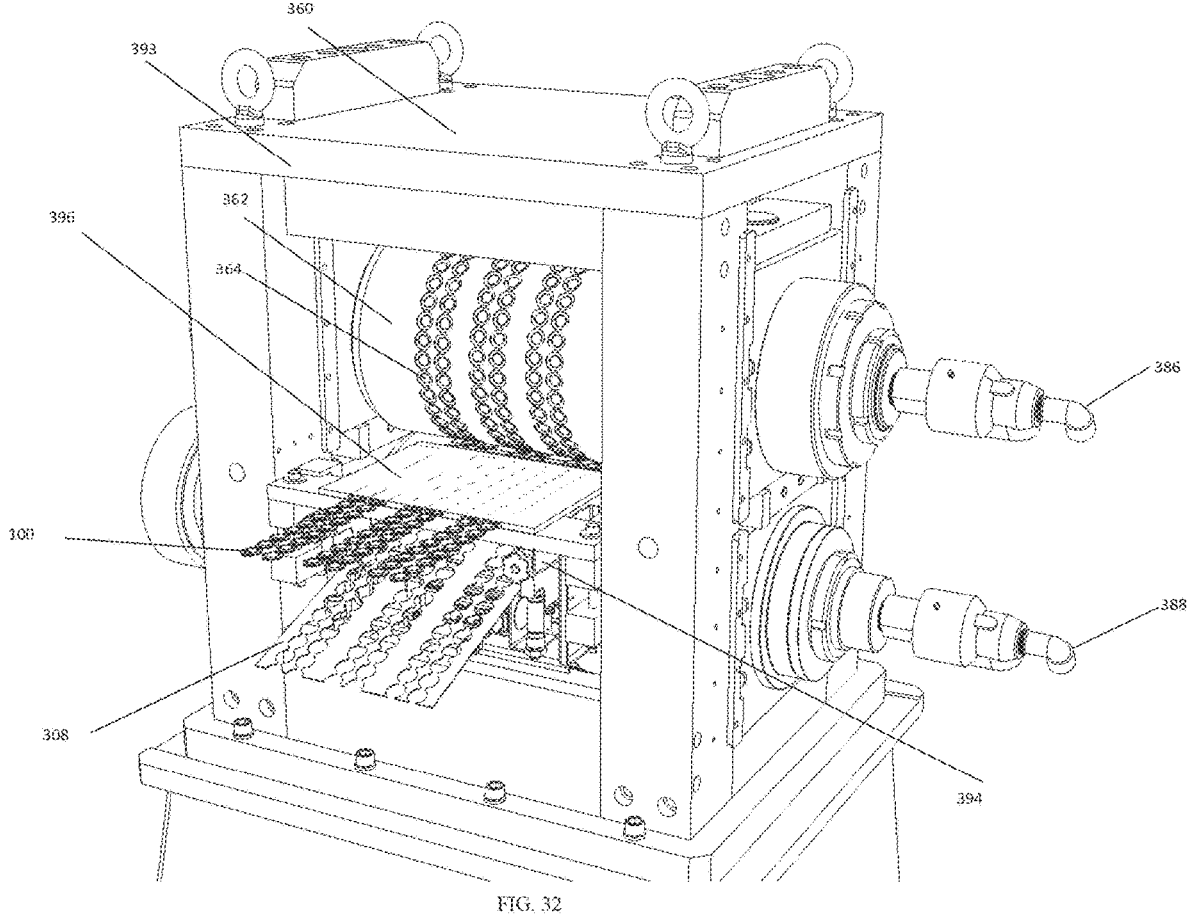
FIG. 32 shows a rear perspective view of the continuous roll molder of FIG. 15.
Figure 33:
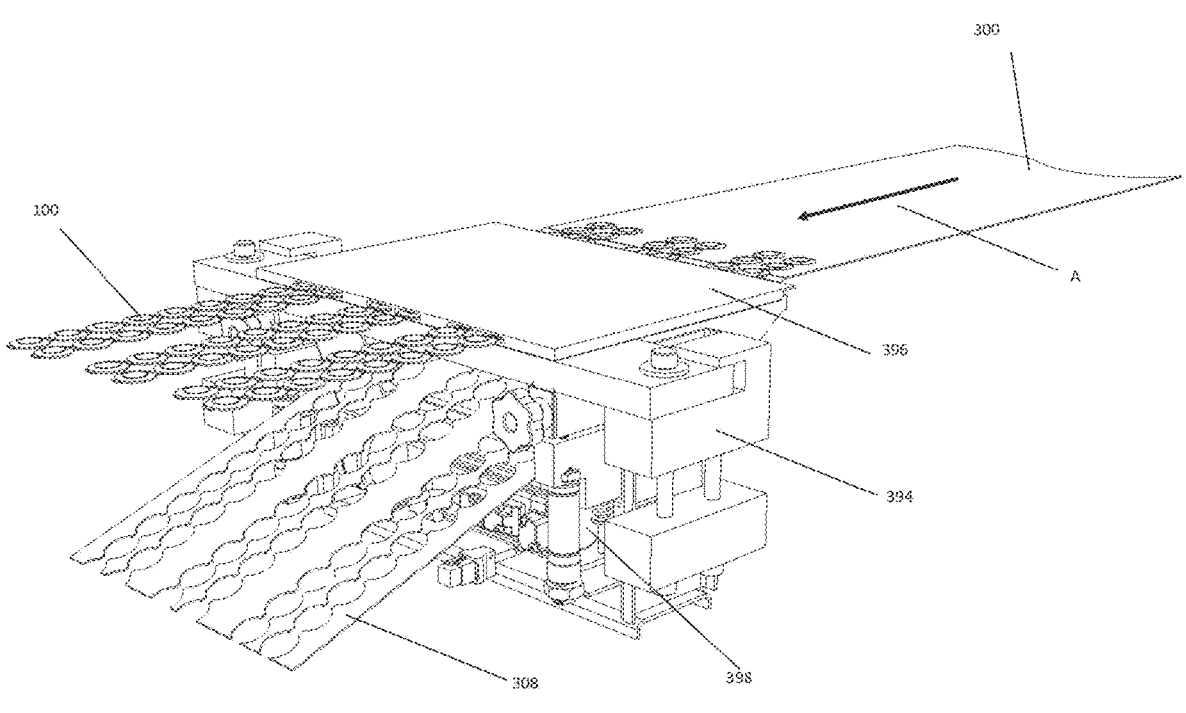
FIG. 33 shows a front perspective view of an outfeed system of the continuous roll molder of FIG. 15.
Figure 34:
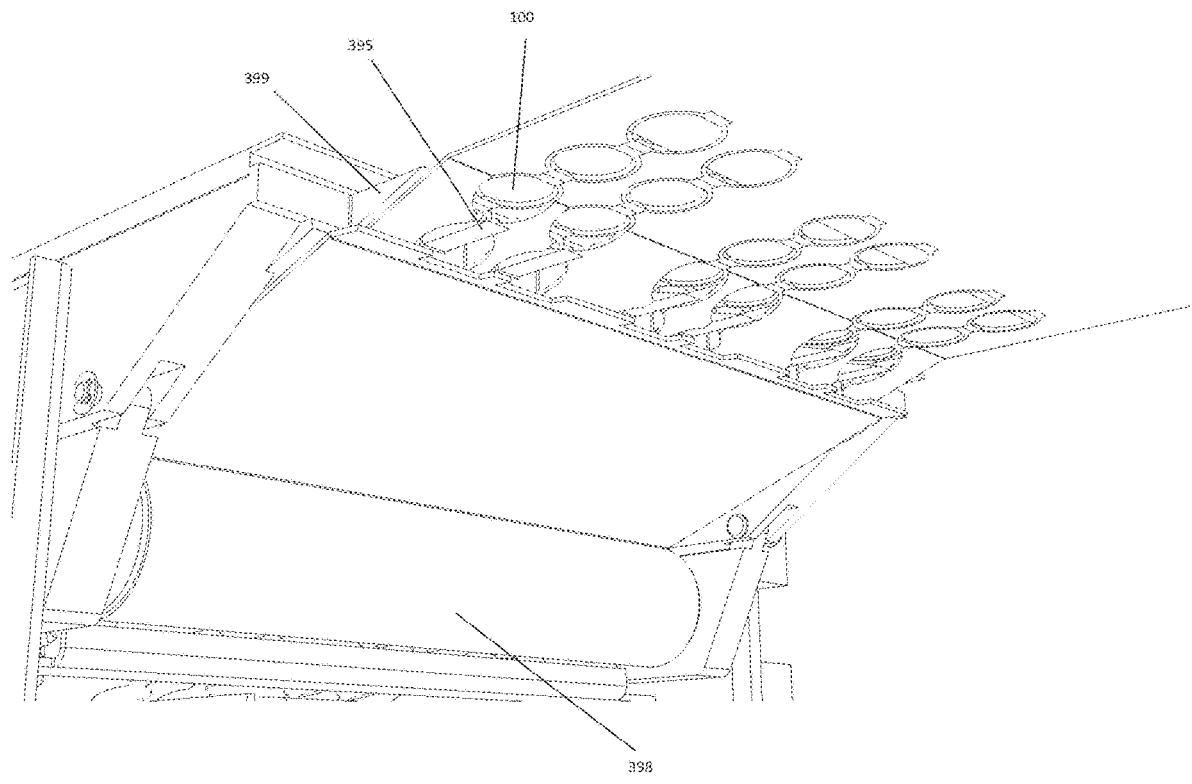
FIG. 34 shows a rear perspective view of the outfeed system of FIG. 33.

With reference to FIGS. 28-29, in certain embodiments, the temperature-controlled mixture may flow through upper mold 362 and lower mold 372 such that each pair of shape 364 of upper mold 362 and shape 374 of lower mold 372 may be cooled during the continuous roll molding process. Channels 379 may facilitate flow of the temperature-controlled mixture through each pair of shape 364 and shape 374. The cooling may facilitate maintaining gap distances, e.g., gap 379 (FIGS. 20-21) between shape 364 of upper mold 362 and shape 374 of lower mold 372, and gap 381 (FIGS. 20-21) between faces of upper mold 362 and lower mold 372. Cooling may be important to maintain gap distances, as for every degree Fahrenheit added to the continuous roll molding process, additional distance is added at each gap, e.g., gap 379 may experience an expansion of between about 5 and about 10 micron. Limiting temperature increase to limit expansion of the gaps may facilitate proper part formation and limit damage to upper mold 362 and lower mold 372.

One or more parts of continuous roll molder 360 may be monitored to maintain gap distances. For example, with reference to FIG. 30, temperature sensors 385 may be located at one or more positions along frame 393 of continuous roll molder 360. In this way, flow of the temperature-controlled mixture through chiller 402 (FIG. 25), temperature control unit 404 (FIG. 25), and continuous roll molder 360 may be adjusted to maintain gap distances and temperatures along continuous roll molder 360. Temperature to and from temperature control unit 404 may also be monitored at temperature control unit 404.

Differing speeds of the material flow through continuous roll molder 360 and components thereof, such as shape 364 of upper mold 362 and shape 374 of lower mold 372, may create specific challenges to consistent part formation. Increasing the pressure on upper mold 362 and lower mold 372 directs material flow through differing geometric shapes, such as such as shape 364 and shape 374. However, in certain embodiments, increasing pressure may create back pressure and forward pressure which causes material to move at different speeds through continuous roll molder 360. Referring to FIGS. 31-34, in some embodiments, there may be a speed differential between waste thermoplastic sheet material 308 and the molded parts. This may happen from there being greater pressures in continuous roller molder 360, which causes thermoplastic sheet material 300 (FIG. 3A) being formed into parts to be squeezed and stretched and therefore elongated more than waste thermoplastic sheet material 308 around thermoplastic sheet material 300. In some embodiments, waste thermoplastic sheet material 308 moves through continuous roller molder 360 at a more even flow of between about 30 linear feet per min and about 1,000 feet per min, while the parts being formed may move between about 3% and about 15% faster than the line speed due to the pressure being applied during molding creating an elongation of the parts compared to the scrap material.

FIGS. 31-34 also shows an embodiment including waste and product diverter 394, product and waste guide tooth 395, finished product outfeed track guide 396, material nip roller 398, and waste diverter guide tooth 399, which guide product 100 and waste thermoplastic sheet material 308 to exit continuous roll molder 360 along separate paths.

In some embodiments, waste and product diverter 394 may be mounted directly inside of the frame of continuous roll molder 360. In some embodiments, switchable product and waste guide tooth 395 may be adjacent to the face of continuous roll molder 360, or mounted outside of the frame, where the product and waste thermoplastic sheet material 308 enter further from the face of continuous roll molder 360. When continuous roll molder 360 forms product 100, the product and waste thermoplastic sheet material 308 may come out of continuous roll molder 360 at different speeds. Waste and product diverter 394 may act to separate the two streams.

In some embodiments, waste and product diverter 394 may capture waste thermoplastic sheet material 308 as it exits continuous roll molder 360, since it is located by the face of continuous roll molder 360. In some embodiments, waste thermoplastic sheet material 308 may be sent to a grinder for chopping and reintroduction into the extruder hopper as recycled material.

In some embodiments, waste diverter guide tooth 399 may be positioned adjacent to continuous roll molder 360 to feed exiting product into outfeed track guide 396. In some embodiments, outfeed track guide 396 may separate each stream of product 100 into individual lanes away from other product streams to avoid product streams from intersecting. Product may then be accumulated and spooled.

In some embodiments, at least one of product 100 and waste guide tooth 395 and waste diverter guide tooth 399 are switchable. Accordingly, the product guide teeth may switch up or down via an air cylinder, and may change the direction of the product stream from going towards the accumulator and send it into the waste and regrind streams instead. In other embodiments, rejecting the product lines into the waste stream may occur after product 100 stream passes through outfeed track guide 396.

In some embodiments, once parts 100 exit continuous roll molder 360, they may be conveyed by nip roller guide 398 on the other side that may have adjustable speeds. In some embodiments, nip roller guide 398 may be set to the same speed as molds of continuous roll molder 360. Nip roller guide 398 may not only feed the parts out and into a guided rail, but may also add a few last elements to the product. In some embodiments, with speeds set higher than speeds of continuous roll molder 360, nip roller guide 398 may also thin parts 100, particularly in frangible areas, or with speeds set lower than speeds of continuous roll molder 360, nip roller guide 398 may thicken parts. Accordingly, nip roller guide 398 may be used to adjust the shear force values of parts, particularly in frangible areas.

Figure 35:
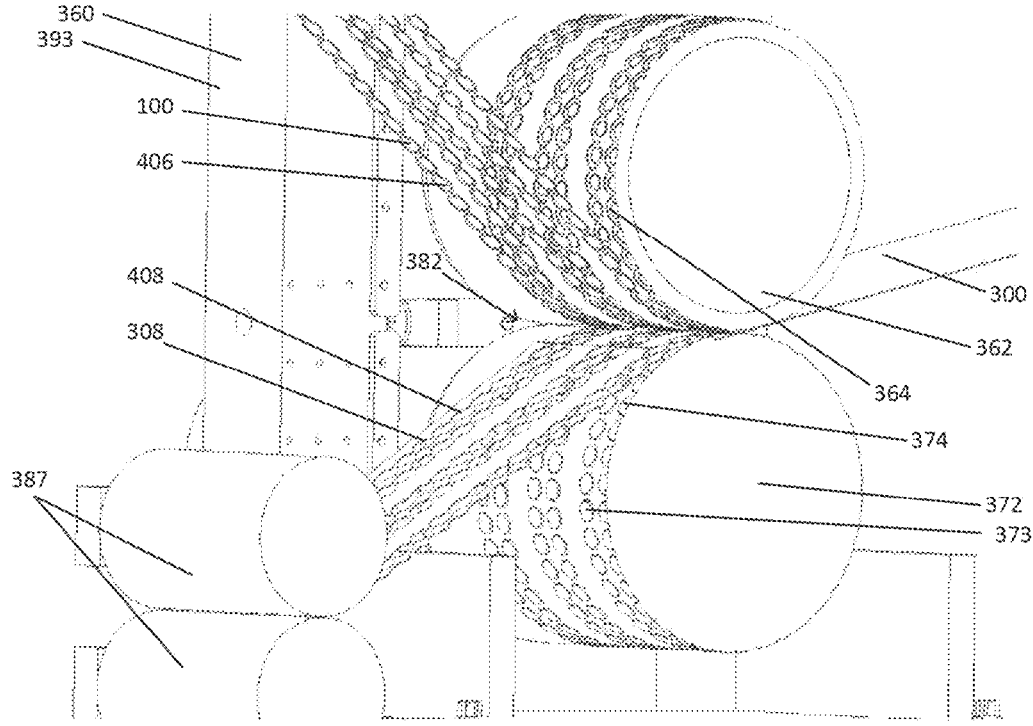
FIG. 35 shows a rear perspective view of a continuous roll molder according to various embodiments.
Figure 36:
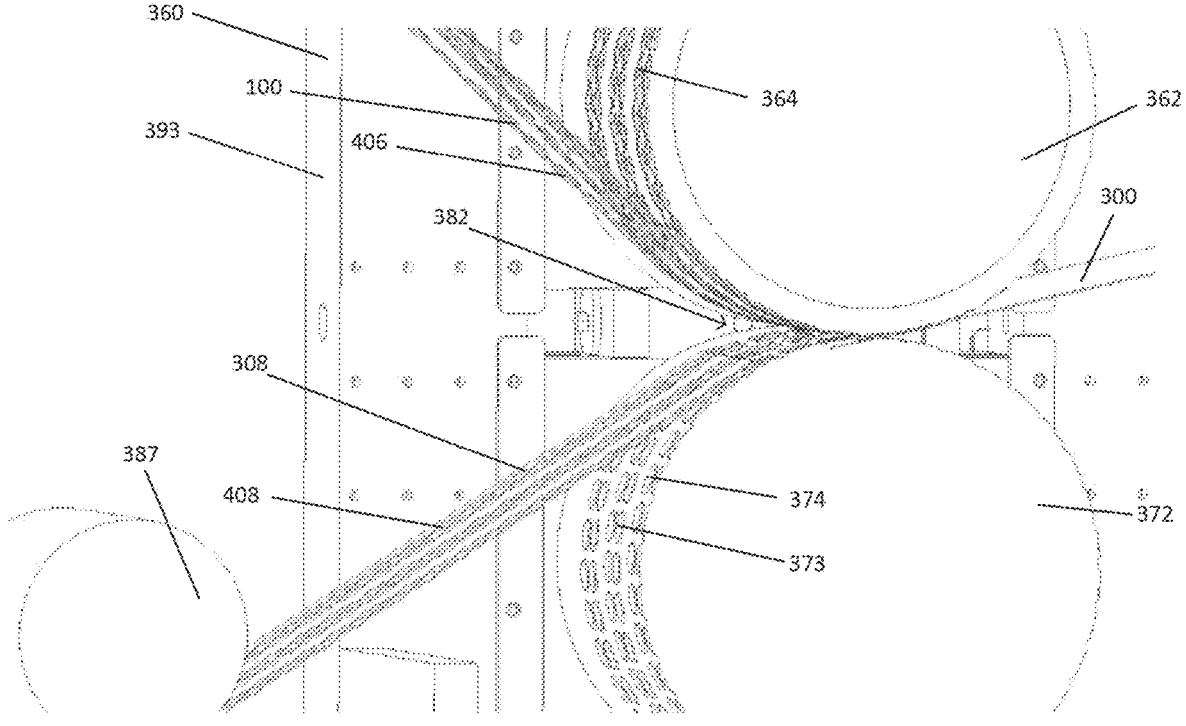
FIG. 36 shows an enlarged perspective view of the continuous roll molder of FIG. 24.
Figure 37:
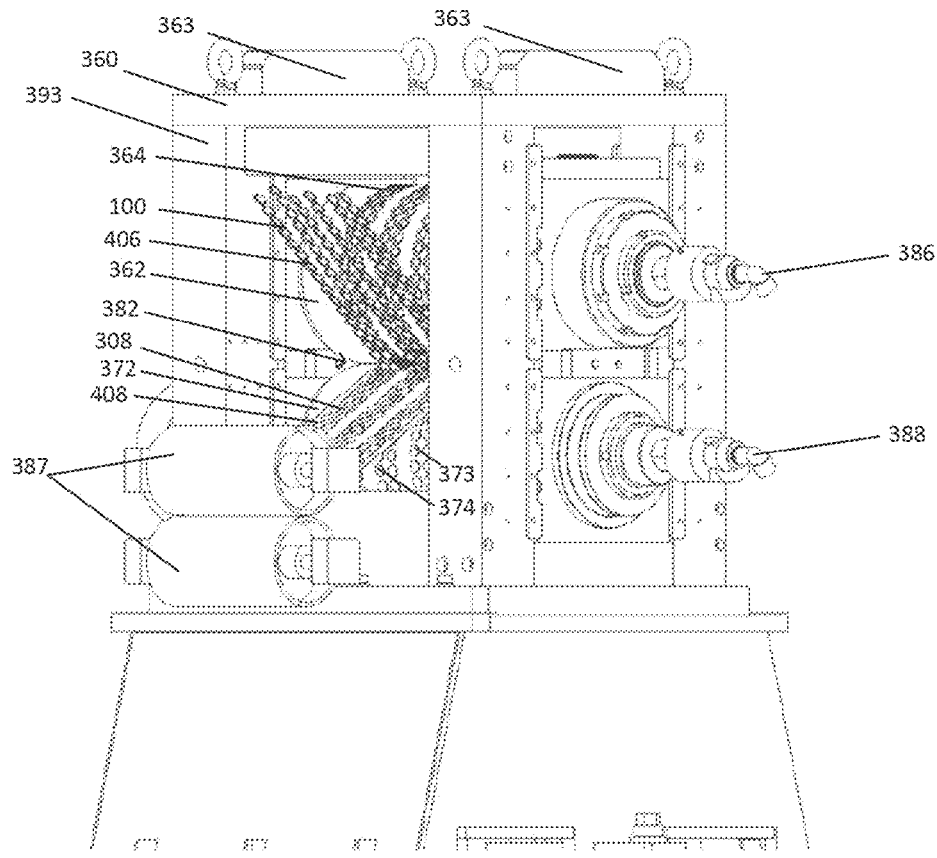
FIG. 37 shows a rear perspective view of the continuous roll molder of FIG. 35.
Figure 38:
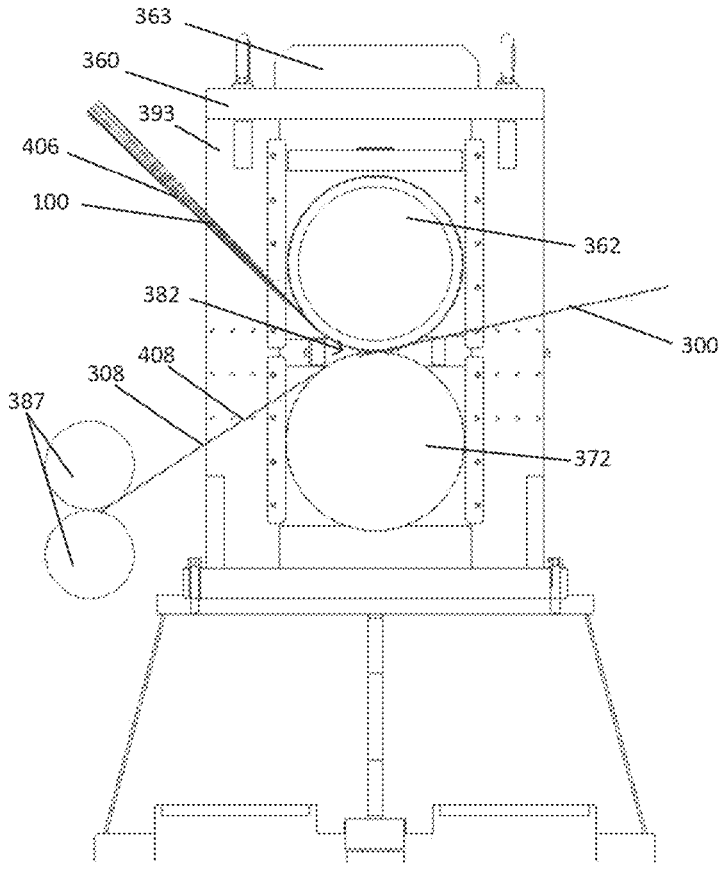
FIG. 38 shows a side view of the continuous roll molder of FIG. 35.
Figure 39:
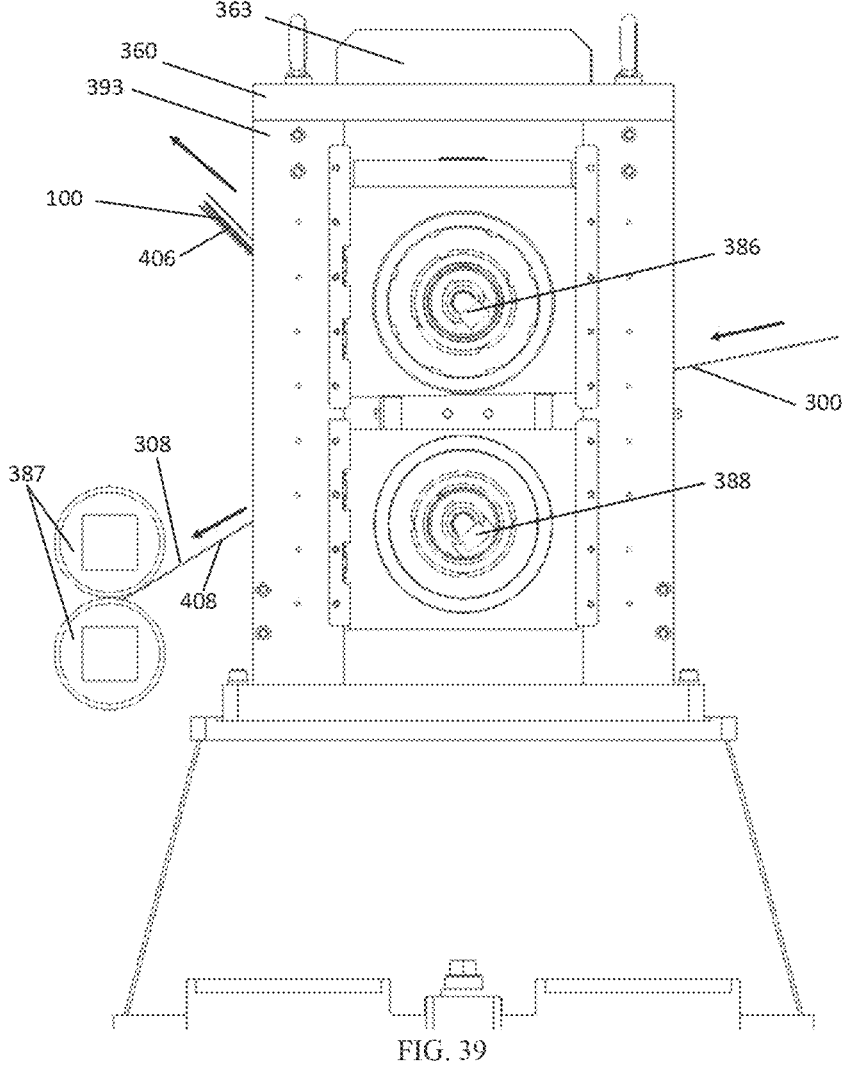
FIG. 39 shows a side view of the continuous roll molder of FIG. 35.
Figure 40:
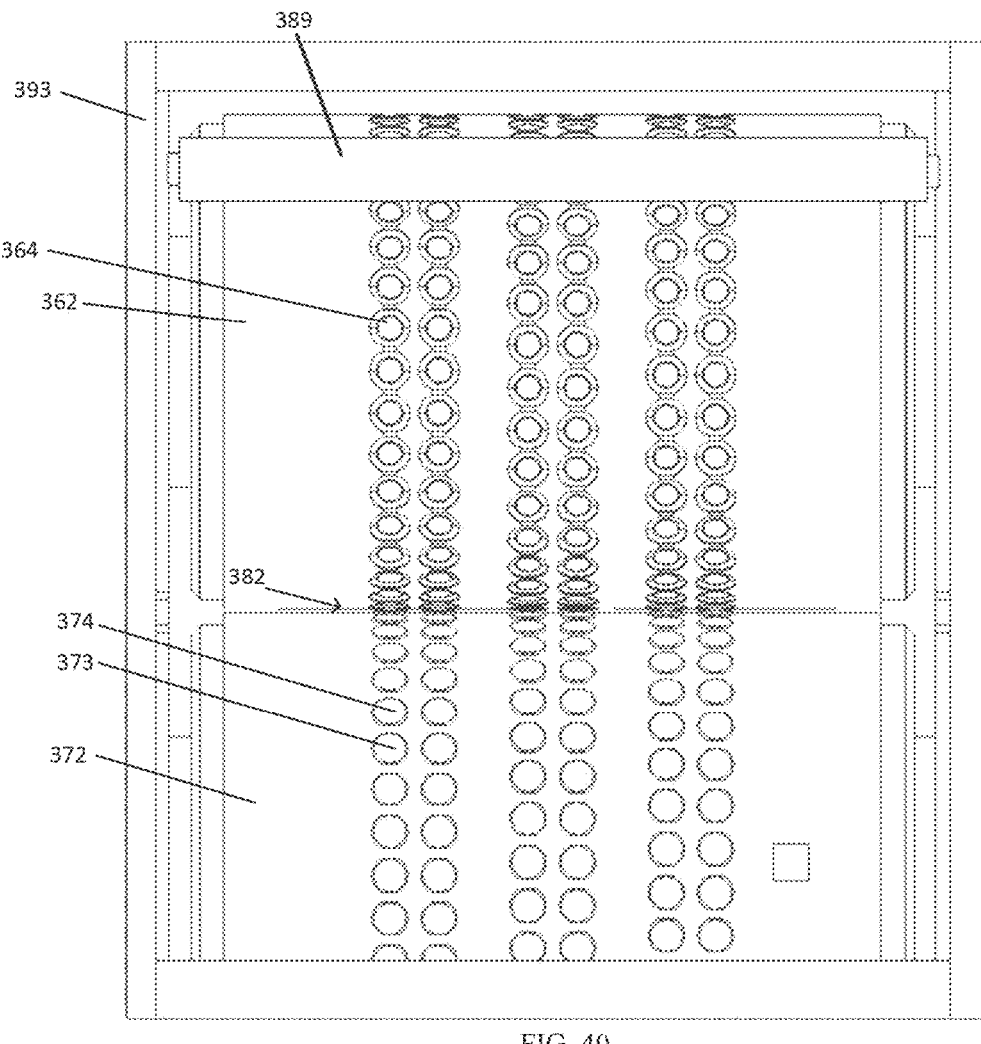
FIG. 40 shows a rear view of the continuous roll molder of FIG. 35.

Referring to FIGS. 35-40, in another embodiment, parts 100 may be guided away from continuous roll molder 360 along a separate path from waste thermoplastic sheet material 308 upon exit from continuous roll molder 360. Shape 364 and shape 374 may cut thermoplastic sheet material 300 into a part and separate the part from waste thermoplastic sheet material 308 such that the part and waste thermoplastic sheet material 308 continue along separate streams after release from continuous roll molder 360. Upper mold 362 and lower mold 372 may initiate separation of waste thermoplastic sheet material 308 from parts 100. As shown in FIGS. 35-37, parts 100 may remain coupled to upper mold 362 and waste thermoplastic sheet material 308 separately may remain coupled to lower mold 372 before being released from continuous roll molder 360. After release from continuous roll molder 360, waste thermoplastic sheet material 308 and parts 100 may continue along separate streams, such as a stream 406 for parts 100 and a stream 408 for waste thermoplastic sheet material 308.

In some embodiments, nip rollers 387, which may be lower nip rollers, may receive stream 408 of waste thermoplastic sheet material 308 from continuous roll molder 360. Stream 408 may be conveyed through the pair of nip rollers 387, which may convey stream 408 to continue the stream of waste thermoplastic sheet material 308 away from parts 100. In some embodiments, stream 408 may be angled downward via nip rollers 387 to separate from stream 406 of parts 100. In other embodiments, stream 406 may be angled upward via a bar 389, which may be an upper bar. In one embodiment shown in FIG. 40, bar 389 may receive stream 406 to separate parts 100 from waste thermoplastic sheet material 308. Continuous roll molder 360 may include bar 389 and nip rollers 387, bar 389 receiving the part being conveyed along stream 406 released from shape 364 and nip rollers 387 receiving waste thermoplastic sheet material 308 being conveyed along stream 308 released from shape 374. In this embodiment, stream 406 and stream 408 may be angled away from one another. The angle between stream 406 and stream 408 may be an obtuse angle. In some embodiments, the angle between stream 406 and stream 408 may be between about 60 degrees and about 180 degrees, such as between about 100 degrees and about 175 degrees, such as about 150 degrees. Tension from each of nip rollers 387 and bar 389 may allow waste thermoplastic sheet material 308 to separate from parts 100 along with upper mold 362 and lower mold 372. Without this tension, waste thermoplastic sheet material 308 could remain coupled to parts 100, causing breakage of parts 100. Downstream of bar 389, nip rollers may receive stream 406 where a constant torque is maintained across bar 389 and the nip rollers, before parts 100 along stream 406 are spooled and stored in a container.

Surface roughness of one or more of thermoplastic sheet material 300 (FIG. 3A) as it is conveyed through continuous roll molder 360 and continuous roll molder 360 and components thereof may affect speeds of stream 406 of parts 100 and stream 408 of waste thermoplastic sheet material 308 exiting continuous roll molder 360. Stream 406 may exit at a faster rate than stream 408 due to the forming, shaping, and squeezing, and surface contact differences from friction on each surface. Part 100 speed may be between about 1% and about 10%, such as between about 3% and about 7%, such as about 5% faster than waste thermoplastic sheet material 308.

Figure 41:
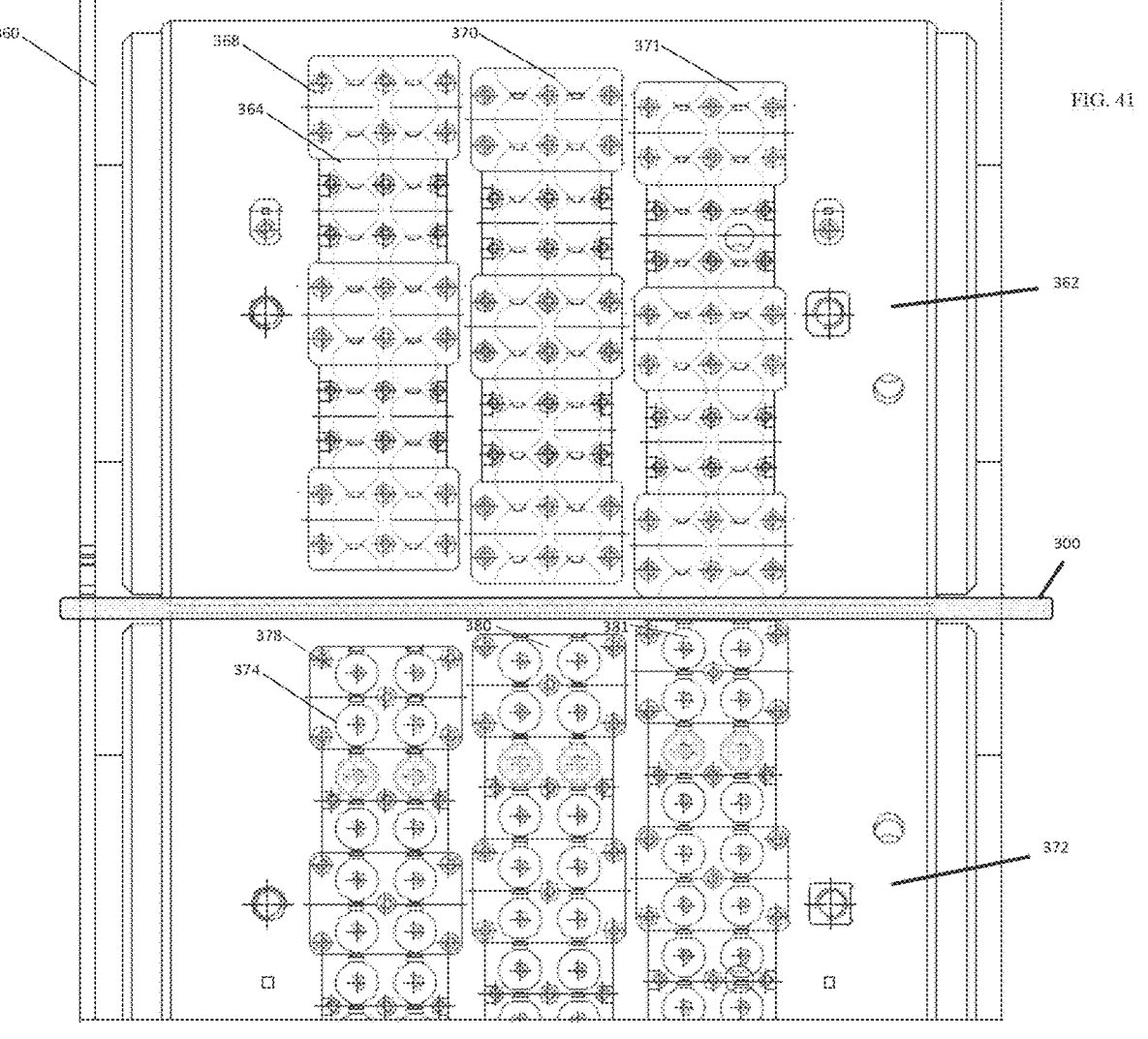
FIG. 41 shows a plan view of continuous roller molds according to various embodiments.

According to an embodiment with reference to FIG. 41, upper mold 362 and lower mold 372 may be arranged to enable even pressure profiles in parts, which allows for more consistent part formation, and reduces wear and tear on continuous roll molder 360. As shown, upper mold 362 may include a plurality of shapes 364. In some embodiments, shapes 364 may be arranged in pairs, the pairs being arranged in a first series 368 and a second series 370. In some embodiments, first series 368 and second series 370 are adjacent such that centers of pairs of shapes 364 of first series 368 and pairs of shapes 364 of second series 370 are aligned horizontally. In some embodiments, first series 368 and second series 370 are adjacent and offset. Accordingly, second series 370 may be positioned next to first series 368 such that centers of pairs of shapes 364 of first series 368 are adjacent and offset, or out of line horizontally, from centers of pairs of shapes 364 of second series 370. In some embodiments, shapes 364 may be arranged in pairs arranged in a third series 371. In some embodiments, first series 368 and second series 370 are adjacent and offset from third series 371. Accordingly, third series 371 may be positioned next to first series 368 and second series 370 such that pairs of shapes 364 of first series 368 and second series 370 are adjacent and offset, or out of line, from pairs of shapes 364 of third series 371. In other embodiments, the shapes 364 of the first, second, and third series may be arranged as a single, triple, quadruple, or any number of shapes aligned in a row, and the upper mold may include more than three series.

As shown, lower mold 372 may include a plurality of shapes 374. In some embodiments, shapes 374 may be arranged in pairs, the pairs being arranged in a first series 378 and a second series 380. In some embodiments, first series 378 and second series 380 are adjacent. In some embodiments, first series 378 and second series 380 are adjacent and offset such that pairs of shapes 374 of first series 378 are offset from pairs of shapes 374 of second series 380. In some embodiments, shapes 374 may be arranged in pairs arranged in a third series 381. In some embodiments, first series 378 and second series 380 are adjacent and offset from third series 381 such that pairs of shapes 374 of first series 378 and second series 380 are adjacent and offset from pairs of shapes 374 of third series 380. In other embodiments, the shapes 374 of the first, second, and third series may be arranged as a single, triple, quadruple, or any number of shapes aligned in a row, and the lower mold may include more than three series.

Certain embodiments provide for the use of roller deflection to accommodate the roller deflection for the purposes of even product formation and production. If a roller is designed such that all shapes align and are not offset, the roller pressure may peak and valley as the roller turns. When the roller reaches the portion of the shape corresponding to the highest pressure on the part, the roller pressure may peak. When the roller reaches the portion of the shape corresponding to the lowest pressure on the par, the roller pressure may valley. In embodiments where the molds shapes are offset, the portions of each shape corresponding to the highest pressure on the part are out of phase, which even out the roller pressure, and may help prevent roller deflection, which may result in more even product formation.

Certain embodiments provide for the use of waste trenches in continuous roll molder 360 for pressure relieving on the parts and waste. The waste trenches may exist in between each row of product strips, and include zones that are milled down into the face of the molds, creating a continuous gap that allows for the waste to slide into the gap as it moves through continuous roll molder 360. Accordingly, pressure on continuous roll molder 360 is reduced as waste is not pressed upon by the molds, the roller pressure being generated by the pressure on the shapes only.

Referring to FIG. 41, upper mold 362 and lower mold 372 may rotate in opposite directions, according to some embodiments. In some embodiments, upper mold 362 and lower mold 372 may rotate at particular speeds such that pairs of shapes 364 of upper mold 362 and pairs of shapes 374 of lower mold 372 impart shapes onto thermoplastic sheet material 300 (FIG. 15) at substantially the same time.

Figure 44:
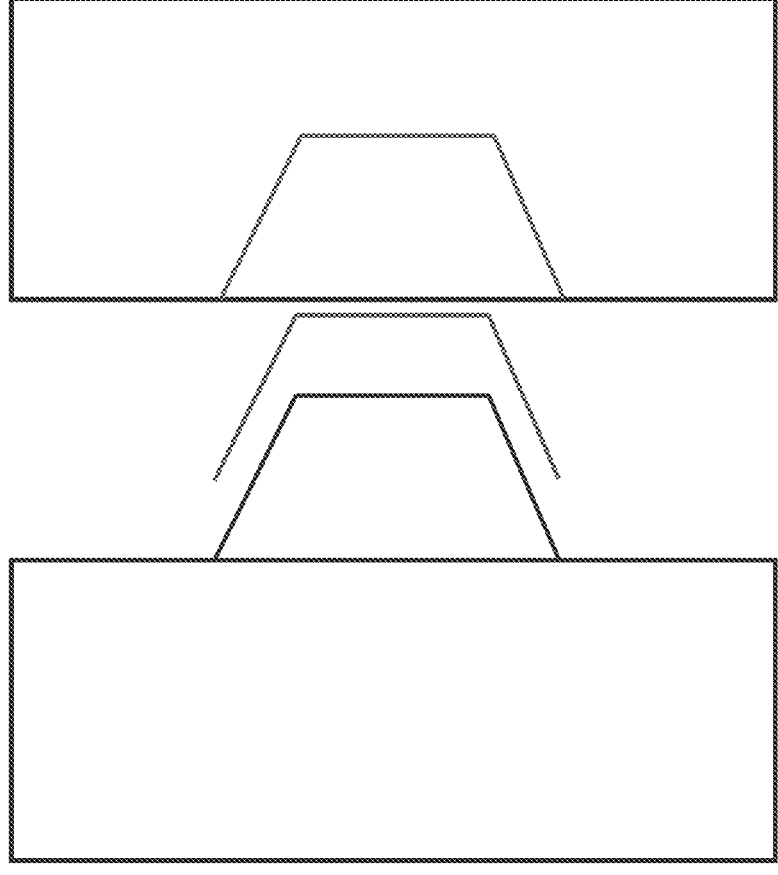
FIG. 44 shows an example of draft angles in injection molding.

Draft angles are needed in injection molding for part release due to vacuum, as shown in FIG. 44. In other words, an angle or taper is added to vertical side walls or surfaces of a mold to facilitate removal of an injection molded part. This angle or taper is then imparted onto the ejected part. The angle or taper may assist with breaking a mold vacuum for part release. To be able to break the vacuum and remove the part without damaging it and excessively wearing the mold, draft angles in the part design must be included, so that as the part is removed, it easily breaks the vacuum and may be removed without excessively wearing the mold.

Figure 42:
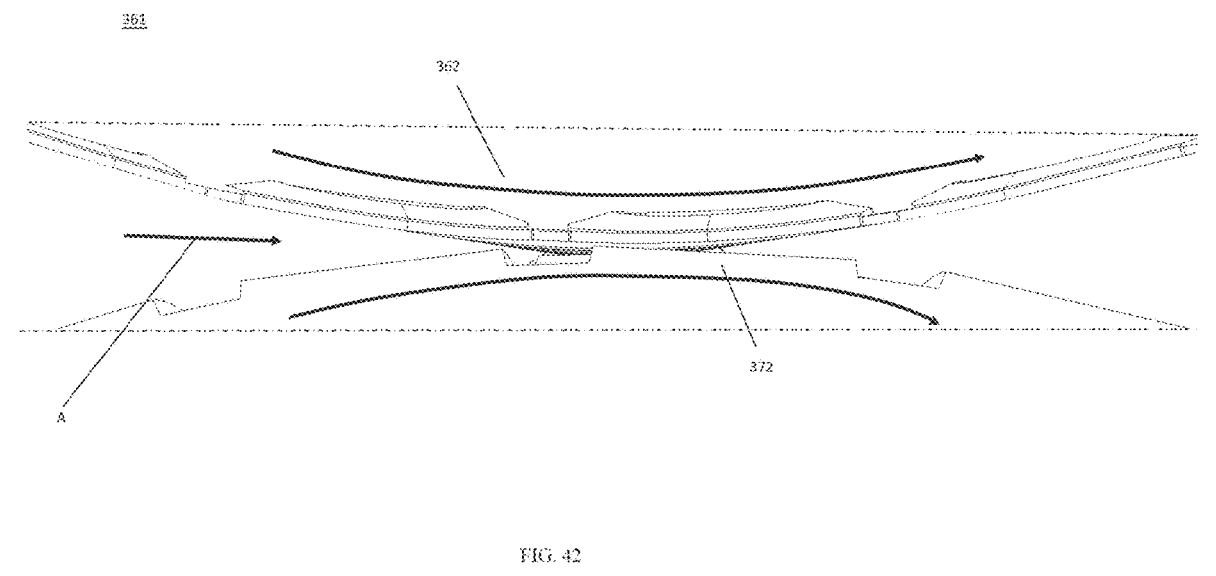
Figure 43:
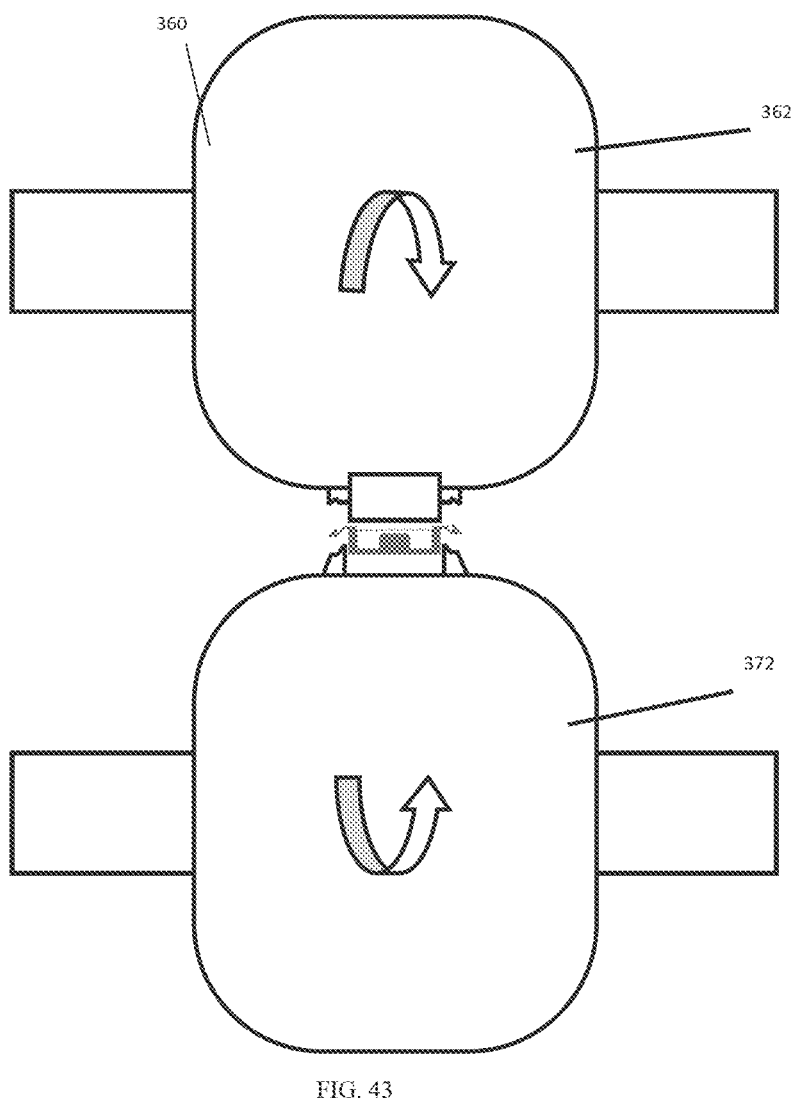
FIG. 43 shows an open mold of continuous roller molds according to various embodiments.

In one embodiment, upper mold 362 and lower mold 372 of continuous roll molder 360 are shown in FIGS. 42-43. As shown, because the part shape may be incorporated along a circumference of a roller and the machined cavities of upper mold 362 and lower mold 372 are not in an injection mold (e.g., flat), the cavities of upper mold 362 and lower mold 372 may not be machined as just a negative of the part as is typical in an injection mold. Instead, upper mold 362 and lower mold 372 cavities have a geometrically curvilinear shape that takes into account the circumference of the molds of continuous roll molder 360 and the final part geometries.

In addition, because the part shape is incorporated along a circumference, the molds of continuous roll molder 360 (FIG. 41) are never completely enclosed. Accordingly, in some embodiments, molds of continuous roll molder 360 remain in open position 361 in which they are open to atmospheric pressures. This may prevent a vacuum from forming in the molds, which allows for the design of parts that do not have draft/draw requirements, which may allow for tighter tolerance product shape designs and for more consistent part formation and less wear on molds of continuous roll molder 360. In embodiments, when the parts come out molds of continuous roll molder 360, there is no vacuum, which may allow for tolerances under about 5 degrees draft on walls and surfaces to be achieved.

In embodiments, roller molder 360 does not introduce a vacuum into upper mold 362 and lower mold 372 cavities. In other embodiments, roller molder 360 does not include ejector pins, air pressure, or other means of releasing the parts from the upper mold 362 and lower mold 372 cavities.

In some embodiments, minimal or no draft designs are created in the part from continuous roll molding due to no vacuum being present since molds of continuous roll molder 360 are in an open position 361 with respect to the atmosphere. Being in open position 461 may allow for inverse draft/draw designs, as the parts still flow. Open position 461 of the molds may prevent the forming of a mold vacuum, which may form along vertical mold side walls or surfaces in injection molding. Accordingly, in embodiments of continuous roll molding, the molded parts, unbounded by vertical mold walls or surfaces, may not need to break a mold vacuum for release In certain embodiments, use of thermoplastic sheet material 300 (FIG. 3A) with molecular alignment integrated into thermoplastic sheet material 300 through calendering with continuous roll molds to produce parts may reduce bubbling, cavitation, and uneven material flow and part production as is present in injection molded parts.

In certain embodiments, the pressures of continuous roll molder 360 (FIG. 41) may lower in comparison to the usual injection molding process. For continuous roll molder 360, the pressures may be between about 0.1 psi to about 5,000 psi. In contrast, the pressures in an injection mold machine may be between about 0.1 psi and about 150,000 psi, such as between about 2,000 psi and about 8,000 psi.

In certain embodiments, the continuous roll mold process described herein may improve speed and volume for producing parts, e.g., a frangible cap strip. For example, according to some embodiments, six lanes running on the continuous roll molder at about 60 linear feet per minute, may produce about 4,320 caps per minute. In some embodiments, the continuous roll molder at about 1,200 linear feet per minute may produce about 86,400 caps per minute. In contrast, injection molding with six lanes at about 15 second cycles may produce about 360 caps per minute.

In certain embodiments, continuous roll molding may produce complex parts with certain benefits over injection molded parts, including but not limited to greater depths, the formation of geometric elements having tightly engineered tolerances and low shrinkage rates. The continuous roll molding process may produce within a tolerance of about 0.001 inches, or within about 0.0762 mm, and may not require draft angles in parts. In contrast, injection molding may have tolerances within about 0.005 inches with an approximate 0.5-degree draft angle minimum. In addition, injection molding requires adding about one degree of draft for about every one inch of depth. In some embodiments, the shrinkage rate of the continuous roll molding process is between about 0.5% and about 1%. In contrast, the injection mold process has a shrinkage rate of about 2% and about 4%.

Manufacturing a Frangible Cap Strip Product by the Continuous Roll Molding System and Method Manufacturing a frangible cap strip product by the continuous roll molding system and method will now be described with reference to FIGS. 1-50. These embodiments may include some or all of the steps shown in FIGS. 1-2.

Referring to FIGS. 1-2, in one embodiment, continuous roll molding method 1000 or 2000 to form frangible cap strip parts may utilize about 50% recycled thermoplastic material. In another embodiment, the thermoplastic material is HDPE. In certain embodiments, the HDPE is Bapolene 2035 high density polyethylene copolymer, made by Bamberger Polymers (Jericho, New York).

In an embodiment, the HDPE may have a tensile strength of between about 3,500 psi and about 6,600 psi, such as about 3,900 psi. After processing the HDPE may have a tensile strength of between about 4,600 psi and about 4,800 psi. In an embodiment, the HDPE may have a shear strength of between about 4,600 psi and about 4,800 psi. In an embodiment, the HDPE may have a shear strength of about 4,800 psi. In an embodiment, the HDPE may have a tensile strength of between about 0.93 g/cm3 and about 0.97 g/cm3, or between about 27 megapascal (MPa) and about 33 MPa, or between about 1,700 psi and about 8,400 psi, such as about 5,000 psi. In an embodiment, the HDPE may have a tensile modulus of between about 600 MPa and about 1,550 MPa, such as about 1,280 MPa. In an embodiment, the HDPE may have a tensile elongation of between about 450% and about 600%, such as between about 450% and about 500%. In an embodiment, the HDPE may have a melt flow rate between about 0.3 g/10 min and about 30 g/10 min, such as about 0.35 g/10 min.

As discussed above with reference to FIG. 6, in some embodiments, HDPE thermoplastic material may be conveyed through an extruder 310 and a sheet die 320. The thickness of HDPE thermoplastic sheet material 300 after exiting sheet die 320 may be between about 0.004 inch and about 4 inches, such as between about 0.3 inch to about 0.06 inch, such as about 0.04 inch and 0.05 inch, such as about 0.045 inch. In other embodiments, the thickness of HDPE thermoplastic sheet material 300 after exiting sheet die 320 may be between about 0.04 inches and about 0.06 inches, such as about 0.045 inches.

HDPE macromolecules may be aligned as they extrude through sheet die 320. Therefore, HDPE thermoplastic sheet material 300 after being conveyed through sheet die 320 may have aligned molecules 204 of HDPE macromolecules and may be more crystalline and less amorphous. In some embodiments, HDPE thermoplastic sheet material 300 may have a crystallinity of between about 70% and about 80% before entering the roll molder 360.

In some embodiments, the HDPE thermoplastic material may be heated in extruder 310 and sheet die 320, which may mix the HDPE thermoplastic material for extrusion into HDPE thermoplastic sheet material 300 that is at or above its melt temperature $T_M$, which may be between about 60 degrees Celsius and 330 degrees Celsius, such as between about 100 and about 250 degrees Celsius, such as between about 190 and about 210 degrees Celsius. The melt temperature may be measured on a surface of HDPE thermoplastic sheet material 300 immediately upon exiting sheet die 320. In some embodiments, the vicat softening temperature of the HDPE maybe at about 127 degrees Celsius.

With reference to FIGS. 7 and 9, in some embodiments, HDPE thermoplastic sheet material 300 may be at a first temperature after exiting sheet die 320. In some embodiments, upper surface 302 (FIG. 3A) and lower surface 304 (FIG. 3A) may be at the first temperature after exiting sheet die 320. In some embodiments, the first temperature may be between about 100 degrees and about 300 degrees, such as between about 150 degrees and about 250 degrees, such as about 190 degrees.

In some embodiments, intermediate portion 306 (FIG. 3A) of HDPE thermoplastic sheet material 300 may be at a third temperature that is approximately the first temperature after exiting sheet die 320.

In some embodiments, HDPE thermoplastic sheet material 300 may include a first density when exiting sheet die 320. In some embodiments, the first density when exiting sheet die 320 may be between about 0 g/cm3 and about 2 g/cm3, such as about 0 g/cm3, as HDPE thermoplastic sheet material 300 is mostly molten at this stage.

As discussed above, in some embodiments, after conveying HDPE thermoplastic material through sheet die 320 and before conveying HDPE thermoplastic sheet material 300 (FIG. 3A) through continuous roll molder 360 (FIG. 14), HDPE thermoplastic sheet material 300 may be conveyed through a calendering system 330, shown in FIG. 9. Melted HDPE thermoplastic material may exit sheet die 320 in sheet form as HDPE thermoplastic sheet material 300 and into calendering system 330. Calendering may cool thermoplastic sheet material 300 to a temperature below its melt transition point $T_M$ (but above $T_G$), or the temperature at the exit of sheet die 320 (FIG. 7).

With reference to FIGS. 9-12, calendering system 330 may reduce the temperature of one or more parts of HDPE thermoplastic sheet material 300 via one or more temperature-controlled nip rollers 332, 336.

As calendering in calendering system 330 cools HDPE thermoplastic sheet material 300 below its melt temperature $T_M$, heating and cooling of HDPE thermoplastic sheet material 300 below the melt temperature $T_M$ of HDPE thermoplastic sheet material 300 may occur, and within the glass transition temperature (e.g., above $T_G$), but above the ductile brittle transition temperature which may be between about −118 degrees Celsius and about −70 degrees Celsius, such as about −80 degrees Celsius. Nip rollers 332, 336 may be maintained below the melt temperature $T_M$ and above the ductile brittle transition temperature, a range of between about 0 degrees Celsius and 220 degrees Celsius for HDPE thermoplastic sheet material 300, such as between about 5 degrees Celsius and about 100 degrees Celsius, such as between about 15 degrees Celsius and about 30 degrees Celsius. For heating or cooling surfaces polyethylene HDPE thermoplastic sheet material 300, one of a pair of nip rollers 332, 336 may be set to a higher temperature, while the other may be set to a lower temperature. As discussed below, nip rollers 332 may be at about the temperature of HDPE thermoplastic sheet material 300 after being conveyed through sheet die 320 (FIG. 7). The temperature of nip rollers 332, 336 may decrease until the temperature is below the melt temperature $T_M$, while remaining above the ductile brittle transition temperature. The temperature of nip rollers 332, 336 may be monitored and measured via digital infrared thermometers on their surfaces. In embodiments with heating or cooling with temperature-controlled liquid, the temperature of nip rollers 332, 336 may be monitored and measured via return flow of the liquid.

In some embodiments, first nip roller 332a may be between about 180 and about 200 degrees Celsius, such as about 190 degrees Celsius. In some embodiments, first nip roller 332a may have a gloss finish of between about 10 Ra and about 30 Ra. In some embodiments, second nip roller 332b may be cooler than first nip roller 332a. In some embodiments, second nip roller 332b may be between about 150 and about 170 degrees Celsius, such as about 160 degrees Celsius. In some embodiments, second nip roller 332b may have a satin finish of between about 90 Ra and about 110 Ra, such as about 100 Ra. In some embodiments, third nip roller 332c may be cooler than second nip roller 332b. In some embodiments, third nip roller 332c may be between about 120 and about 140 degrees Celsius, such as about 130 degrees Celsius. In some embodiments, third nip roller 332c may have a gloss finish.

Secondary nip rollers 336 may be cooler than nip rollers 332, rendering the secondary nip rollers 336 chiller rolls to create a cooler upper surface 302 (FIG. 3A) and lower surface 304 (FIG. 3A) around a molten intermediate portion 306 (FIG. 3A) of HDPE thermoplastic sheet material 300.

In some embodiments, secondary nip rollers 336 may be cooler than third nip roller 332c. In some embodiments, secondary nip rollers 336 may be between about 0 degrees Celsius and about 100 degrees Celsius, such as between about 60 degrees Celsius and about 80 degrees Celsius, such as about 70 degrees Celsius.

In certain embodiments, to have a softer intermediate portion 306, secondary nip rollers 336 may be at about 0 degrees Celsius while nip roller 332a may be at about 190 degrees Celsius, nip roller 332b may be at about 140 degrees Celsius, and nip roller 332c may be at about 100 degrees Celsius.

As, discussed above, the speed of nip rollers 332, 336 may be adjusted in accordance with the temperatures required for achieving a particular thickness of thermoplastic sheet material 300 to be formed. For example, if HDPE thermoplastic sheet material 300 needs to be reduced from about 190 degrees Celsius to about 100 degrees Celsius, and is moving at about 60 linear feet per min, the temperature of nip rollers 332, 336 may be adjusted down in about 30 degrees Celsius increments from about 190 degrees Celsius at nip roller 332a, to about 160 degrees Celsius at nip roller 332b, to about 130 degrees Celsius in nip roller 332c, through guide and tension rollers 338, to nip rollers 336, which may be set at about 100 degrees Celsius. The temperature of nip rollers 332, 336 may be measure on the surface of nip rollers 332, 336.

Referring to FIGS. 11-12, in an embodiment, HDPE thermoplastic sheet material 300 may be heated to between about 180 degrees Celsius and about 200 degrees Celsius, such as about 190 degrees Celsius to provide a glossier finish after the calendering process. In an embodiment, HDPE thermoplastic sheet material 300 may be heated to facilitate material flow into tighter elements of roller mold dies of a continuous roll molder. In an embodiment, upper surface 302 (FIG. 3A) may be between about 180 degrees Celsius and about 200 degrees Celsius, such as about 190 degrees Celsius, lower surface 304 (FIG. 3A) may be between about 180 degrees Celsius and about 200 degrees Celsius, such as about 190 degrees Celsius, and intermediate portion 306 (FIG. 3A) may be between about 70 degrees Celsius and about 100 degrees Celsius, such as about 70 degrees Celsius.

Crystallinity may be represented by density. In some embodiments, the density of HDPE thermoplastic sheet material 300 may be between about 0.93 g/cm3 and about 0.97 g/cm3 after the calendering process. In some embodiments, after being processed in continuous roll molder 360 (FIG. 14), the density of HDPE thermoplastic sheet material 300 may be between about 0.955 g/cm3 and about 0.970 g/cm3. In some embodiments, the produced frangible cap strip may have a greater density per part than an injected molded part. In some embodiments, the part density from the continuous roll mold process may be between about 0.93 g/cm3 and about 1.3 g/cm3, whereas injection molding may include part density of between about 0.925 g/cm3 and about 0.995 g/cm3.

As discussed above, after calendering, HDPE thermoplastic sheet material 300 may be conveyed into continuous roll molder 360, shown in FIGS. 14-15.

In some embodiments, the thickness of HDPE thermoplastic sheet material 300 may be between 0.04 inches and 0.05 inches when entering continuous roll molder 360, such as about 0.045 inches.

In some embodiments, HDPE thermoplastic sheet material 300 may include a second density when entering continuous roll molder 360 greater than the first density after exiting sheet die 320 (FIG. 7). In some embodiments, the second density when entering continuous roll molder 360 may be between about 0.5 g/cm3 and about 1.5 g/cm3, such as about 0.933 g/cm3.

In some embodiments, HDPE thermoplastic sheet material 300 may be at a second temperature when entering continuous roll molder 360. In some embodiments, the second temperature of HDPE thermoplastic sheet material 300 may be lower than the first temperature after exiting sheet die 320 (FIG. 7). In some embodiments, upper surface 302 (FIG. 3A) and lower surface 304 (FIG. 3A) may be at the second temperature when entering continuous roll molder 360. In some embodiments, the second temperature may be between about 50 degrees Celsius and about 100 degrees Celsius, such as between about 60 degrees Celsius and about 90 degrees Celsius, such as about 71 degrees Celsius, where the temperature is measured at a surface of HDPE thermoplastic sheet material 300.

In some embodiments, upper surface 302 (FIG. 3A) and lower surface 304 (FIG. 3A) may be at a different temperature than intermediate portion 306 (FIG. 3A) of HDPE thermoplastic sheet material 300 (FIG. 3A) when entering continuous roll molder 360. In an embodiment, intermediate portion 306 may be at a fourth temperature greater than the second temperature when entering continuous roll molder 360. In an embodiment, the fourth temperature may be greater than the second temperature of HDPE thermoplastic sheet material 300 when entering continuous roll molder 360, in one embodiment by at least about five degrees Celsius. In an embodiment, the fourth temperature may be greater than the second temperature of HDPE thermoplastic sheet material 300 when entering continuous roll molder 360 by between about five degrees Celsius and about fifteen degrees Celsius, such as about ten degrees Celsius. In some embodiments, the fourth temperature may be between about 72 degrees Celsius and about 90 degrees Celsius.

In some embodiments, continuous roll molder 360 may include a surface at a fifth temperature lower than the second temperature of upper surface 302 (FIG. 3A) and lower surface 304 (FIG. 3A) of HDPE thermoplastic sheet material 300 (FIG. 3A) when entering continuous roll molder 360. In an embodiment, the fifth temperature may be greater than an ambient temperature. In an embodiment, the fifth temperature may be between about 45 degrees Celsius and about 55 degrees Celsius, such as about 50 degrees Celsius.

As shown in FIG. 14, in some embodiments, nip rollers 383 at the entrance of continuous roll molder 360 may have braking capabilities. As braking is applied, HDPE thermoplastic material 300 may be selectively thinned because continuous roll molder 360 continues to intake HDPE thermoplastic material 300, causing it to stretch forward in the direction of the feed flow A, shown in FIG. 15, and thin out in at least the frangible zones.

As discussed above, nip roller guide 398 may stretch out the frangible elements of the cap strip, narrowing them further to reduce the shear force needed to sever them. With set speeds of continuous roll molder 360, nip roller guide 398 may act to compress the frangible elements of the cap strip, thickening them to increase the shear force needed to cut them. Accordingly, nip roller guide 398 may be used to adjust the shear force values of the frangible elements of the cap strips up and down.

As shown in FIG. 16, in some embodiments, continuous roll molder 360 may include upper mold 362 and lower mold 372 having engineered designs for forming frangible cap strip parts. In some embodiments, upper mold 362 may form a top surface of a part, such as a frangible cap strip. In some embodiments, lower mold 372 may form a bottom surface of a part, such as a frangible cap strip.

In some embodiments, the speed of upper mold 362 and lower mold 372 may be between about 1 revolutions per min (rpm) and about 400 rpm, such as about 20 rpm, when product is being conveyed at about 1 foot per second. In some embodiments, for every foot per second increase, the speed of upper mold 362 and lower mold 372 may be increased by 20 rpms.

In some embodiments, upper surface 302 (FIG. 3A) of HDPE thermoplastic sheet material 300 may have a matte finish. In some embodiments, lower surface 304 (FIG. 3A) of HDPE thermoplastic sheet material 300 may have a gloss finish. The gloss finish of lower surface 304 (FIG. 3A) of HDPE thermoplastic sheet material 300 may increase surface contact and friction between lower surface 304 and the face of lower mold 372. The increased surface contact and friction may enhance gripping and may allow for a cleaner cut from knives 366 on upper mold 362 and limit flashing, or where plastic is not cut cleanly by the knives, and is instead stretched out from the surface of the intended cut edge of the parts.

With reference to FIGS. 17-18, in some embodiments, upper mold 362 may include perpendicular knives 366 and horizontal knives 367 to impart the shape of the frangible cap strip part. For HDPE, the life span of the knives may be between about 5 million revolutions and about 10 million revolutions, such as about 10 million revolutions.

As HDPE thermoplastic sheet material 300 (FIG. 3A) is conveyed through continuous roll molder 360, the geometry of upper mold 362 and lower mold 372 may continuously change to form frangible cap strip parts. HDPE thermoplastic sheet material 300 phases and forms to form part—a cap 110 of a frangible cap strip-shown in FIG. 19A. Upper mold 362 (FIG. 16) and lower mold 372 (FIG. 16) roll over HDPE thermoplastic sheet material 300, applying pressure and temperature, and causing HDPE thermoplastic sheet material 300 to form. Gap profiles opposite imparted shapes to form parts are shown in FIGS. 19B-F.

In some embodiments, the density of the frangible cap strip parts after being conveyed through continuous roll molder 360 may be between about 1 g/cm3 and about 2 g/cm3, such as about 1.27 g/cm3.

Parts 100, such as frangible cap strip parts 100, may exit continuous roll molder 360 along a separate stream from waste thermoplastic sheet material 308, as shown with reference to FIGS. 35-40. Separation may begin at upper mold 362 and lower mold 372. Tension from bar 389 and nip rollers 387 receiving parts 100 and waste, respectively, may facilitate proper product formation without lingering waste. Frangible cap strip parts 100 may continue along stream 406 while waste thermoplastic sheet material 308 may continue along stream 408.

Experimental results from an injection molding process and the continuous roll molding process for forming frangible cap strips described herein will now be described with reference to FIGS. 45-50.

Figure 45:
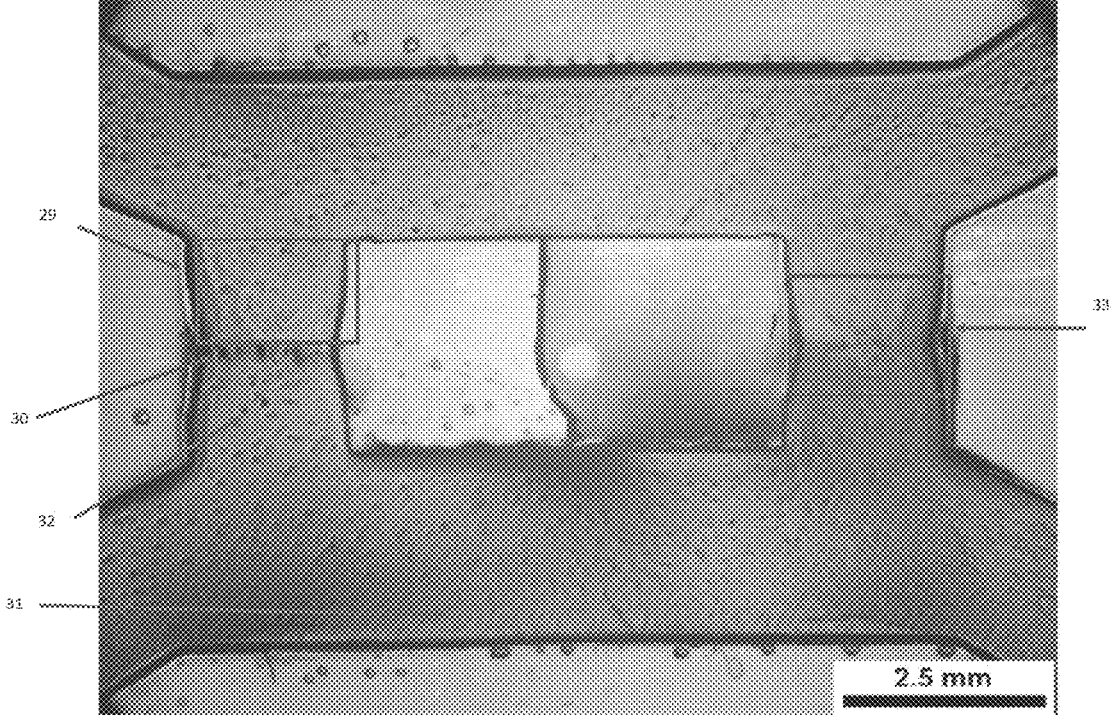
FIG. 45 shows an example of an injection molded surface.
Figure 46:
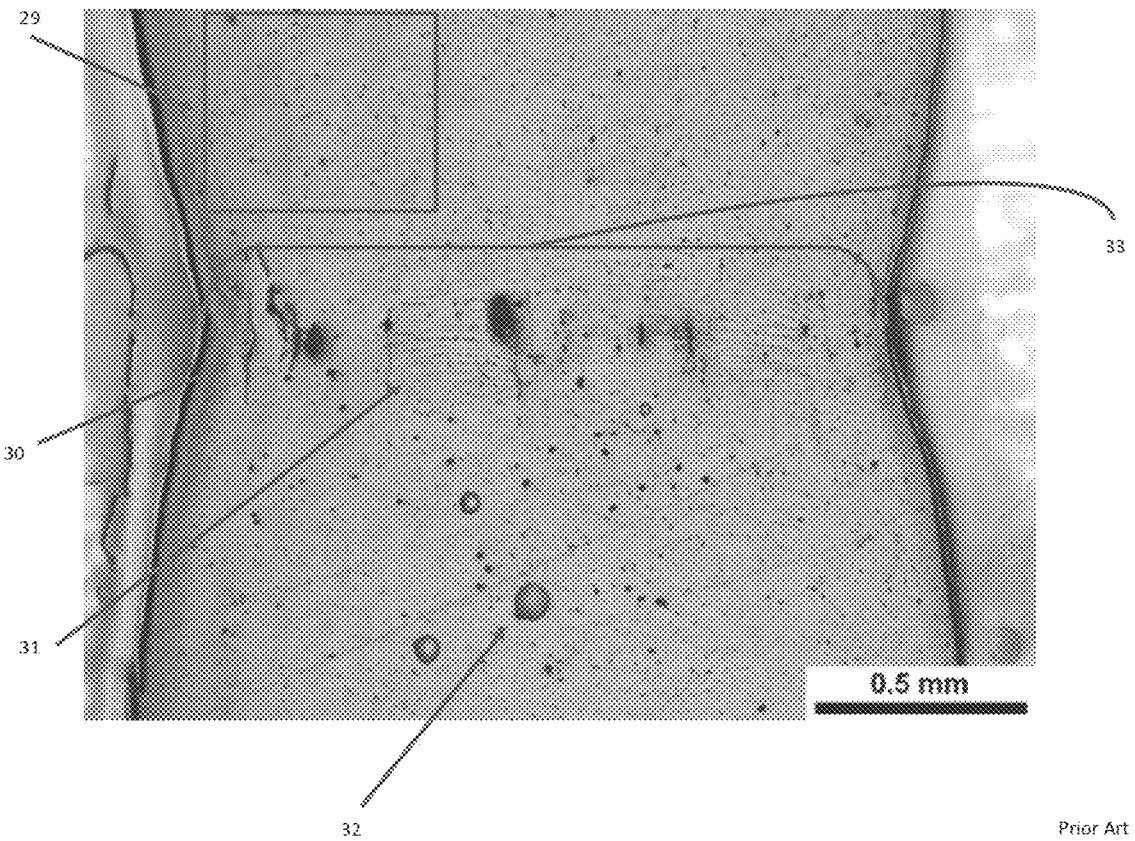
FIG. 46 shows an example of an injection molded surface.
Figure 47:
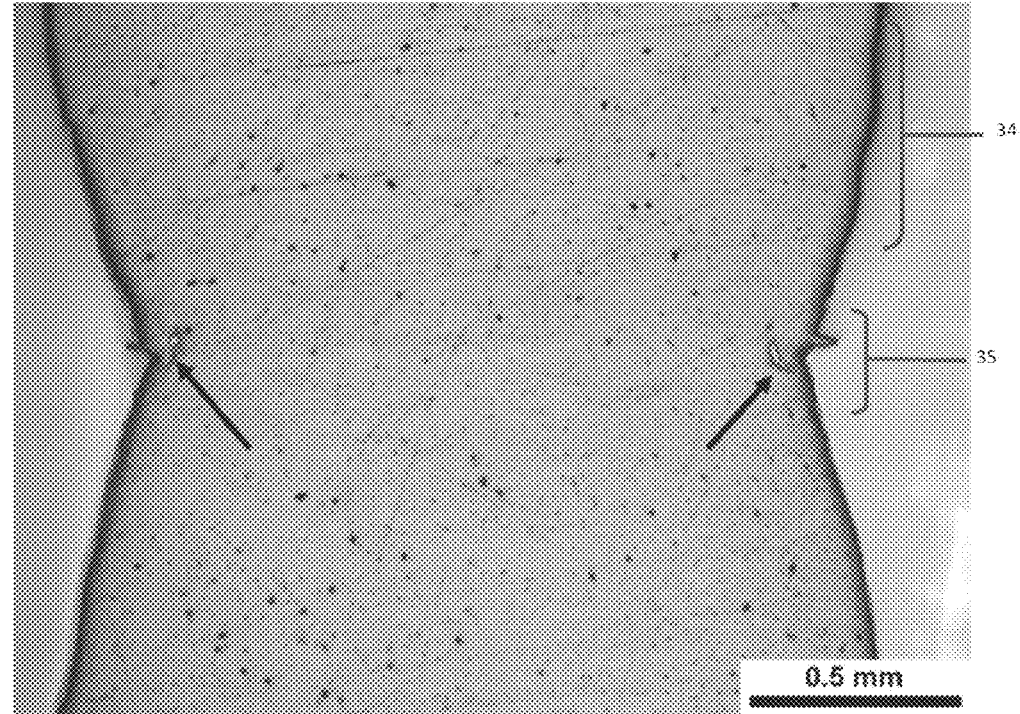
FIG. 47 shows an example of an injection molded surface.

In injection molding, there is limited or no control over the direction of macromolecular flow. Accordingly, the plastic macromolecules may tumble, squeeze, and roll through the injection ports and dies, filling cavities and shapes in a random, uncontrolled manner. FIGS. 45-47 shows frangible zones of cap strips from injection molding. As shown, hilling, bunching, inconsistent surfaces, wrinkling, thickening, thickening in the frangible zone, bunching of material, bubbling, cavitation, and uneven material flow and part production are present in injection molded frangible cap strips. As shown in FIG. 47, hilling and inconsistent surfaces 29 from material flow tumbling in injection molds from lack of macromolecular flow control is shown. Holes, rips, tears 30; wrinkling 31; and bubbling 32 may be seen. Also as shown, inconsistencies in the frangible zone may cause inadvertent thickening in the frangible zone 33, resulting in an about 1.7 mm wide frangible zone, for example, with one leg and having about six pounds (lbs) of tensile strength, and highly variable shear values (between about 0.5 lbs and about six lbs). FIG. 47 shows inconsistent edges 34 from flow issues and tears 35 from removing the part from the injection molded cavities against mold vacuums.

Figure 48:
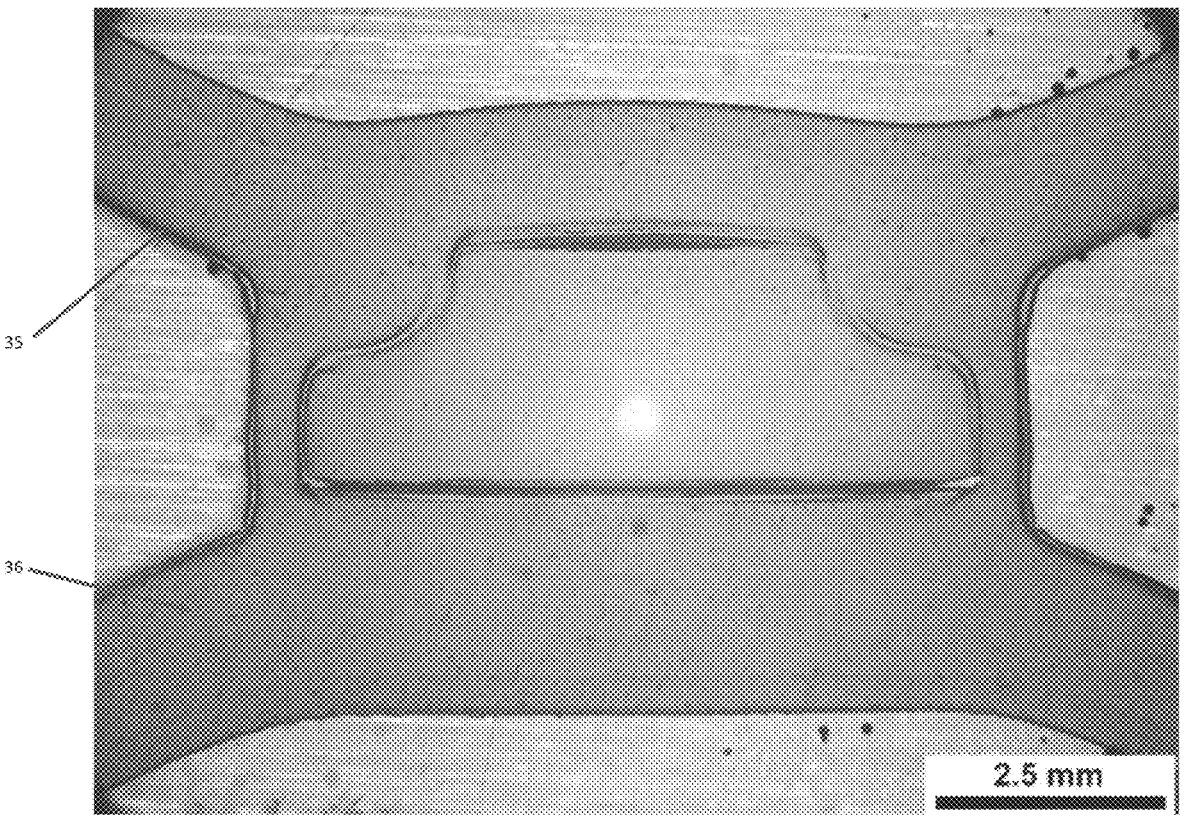
FIG. 48 shows a continuous roller molded surface according to various embodiments.
Figure 49:
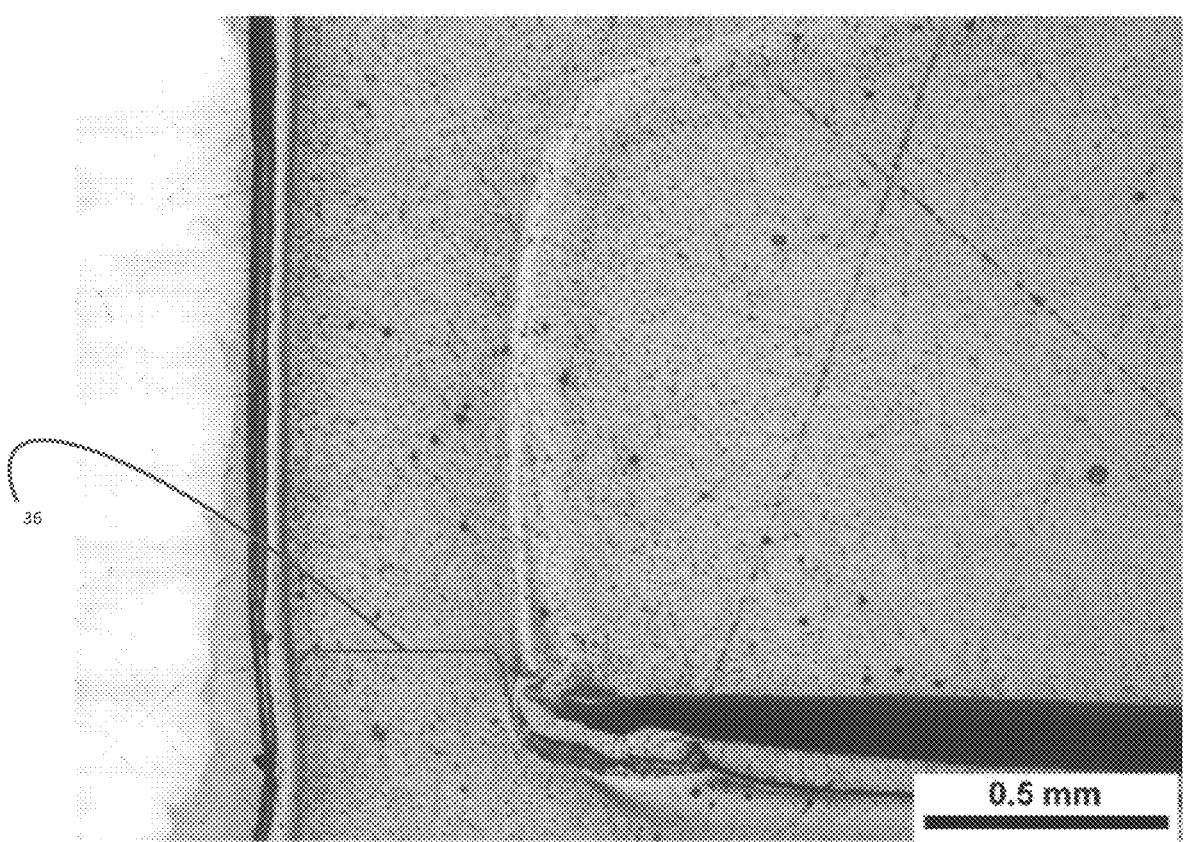
FIG. 49 shows a continuous roller molded surface according to various embodiments.
Figure 50:
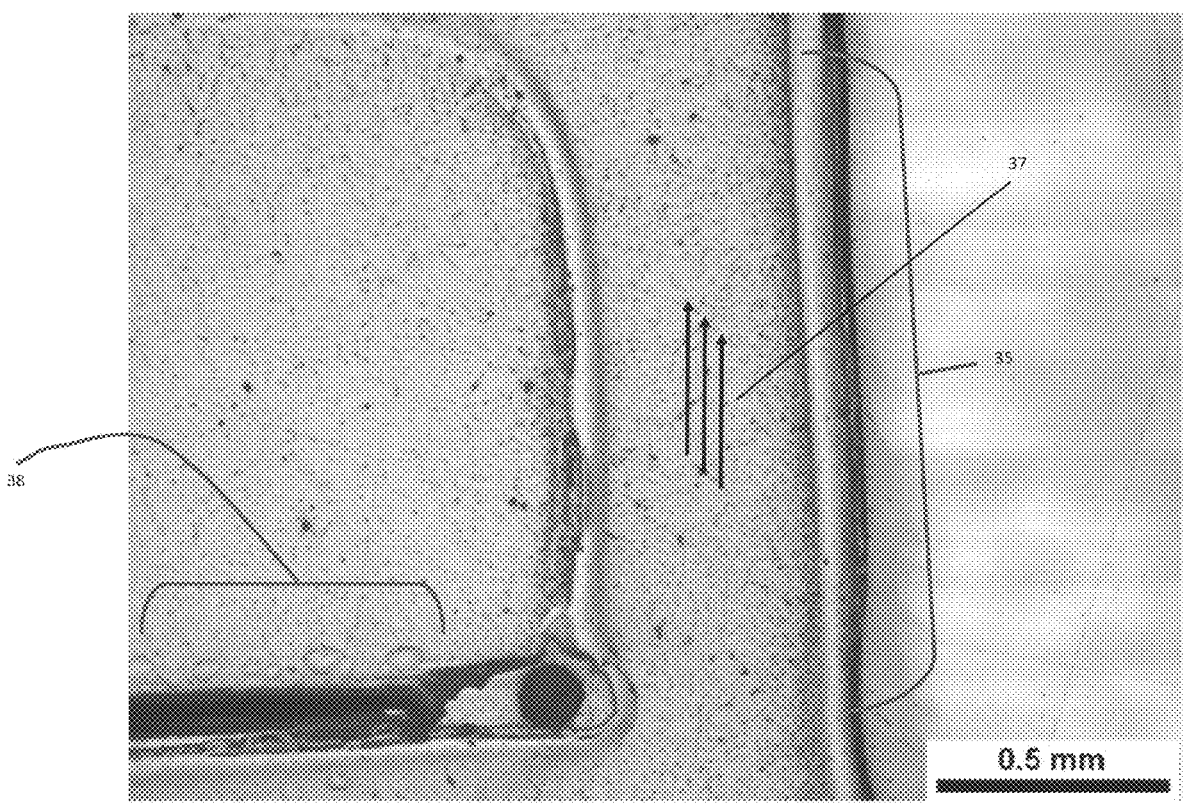
FIG. 50 shows a continuous roller molded surface according to various embodiments.

FIGS. 48-50 shows images of frangible zones of cap strips from the continuous roll molding process described herein. FIG. 48 shows a T-shaped frangible zone, according to some embodiments. FIGS. 49-50 show opposite sides of a frangible zone, according to some embodiments.

As shown, consistent edges 35 are imparted by the continuous roll molding process and the thermoplastic macromolecular flow directions in thermoplastic sheet material 300 (FIG. 3A) and part. FIG. 48 shows consistent surfacing 36, no wrinkling, no bubbling, no hilling or wrinkling, no holes, no tears, and cleaner, more consistent shaping in the continuous roll molded part, which is feasible due to molecular direction control, and material flow feed through the continuous roll molds, as well as the other processes. In contrast to the wider frangible zone from injection molding, shown in FIG. 46, an about 0.5 mm wide frangible zone 36 is shown on one leg with about six lbs of tensile strength, and consistent shear values between about 1 lbs and about 5 lbs, such as between about 1.5 lbs and about 4 lbs, such as between about 2.5 lbs and about 3 lbs due to consistencies in the frangible areas imparted by the continuous roll molding processes. The continuous roll molding process allows for smaller cross sections in the frangible zones to lower the shear value. FIG. 50 also shows the feed flow 37 of the product and material, which when it is a calendered sheet material, e.g., thermoplastic sheet material 300, is also the macromolecular flow direction. In addition, FIG. 50 shows consistent edges 35 imparted by the molds of continuous roll molder 360 (FIG. 41) and the thermoplastic macromolecular flow directions in thermoplastic sheet material 300. As will be discussed further, FIG. 50 shows perforations 38 made by continuous roll molder 360 for making the frangible cap strip more frangible.

The Frangible Cap Strip Part

Embodiments of the frangible cap strip part formed by the continuous roll mold system and method described herein will now be described with reference to FIGS. 51-60.

Figure 51:
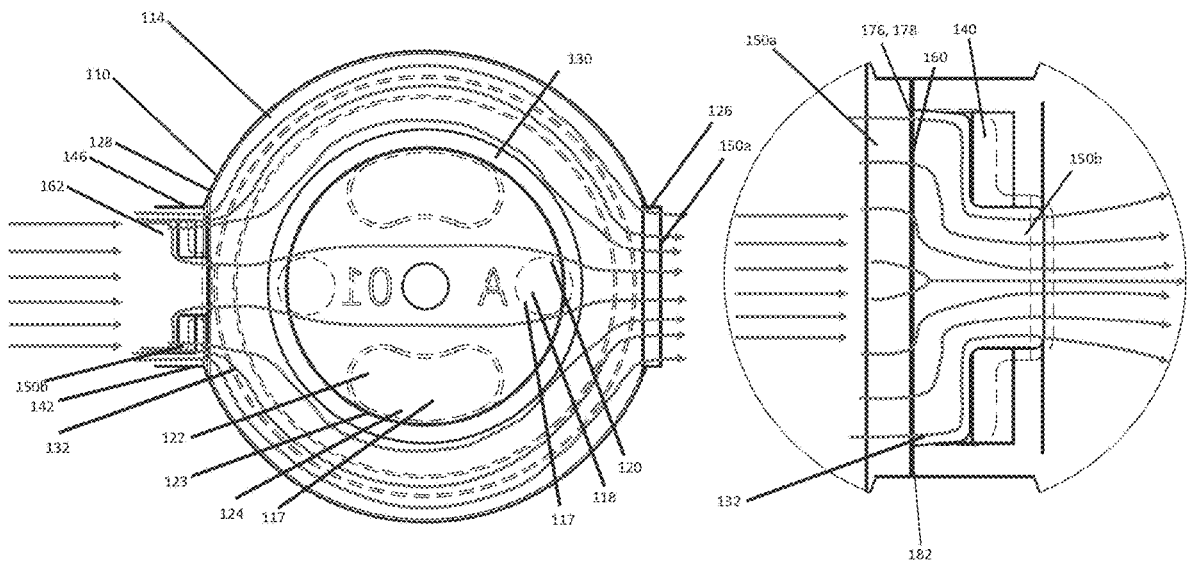
FIG. 51 shows a schematic top view of a frangible cap according to various embodiments.

An embodiment of cap 110 of a frangible cap strip product is shown in FIG. 51. Cap 110 may be a continuous roll-molded fastening cap produced by the continuous roll mold process described with reference to FIGS. 1-44, rather than by injection molding. As shown, flow channels 132 show the lateral macromolecular flow direction in thermoplastic sheet material 300 (FIG. 3A) that helps to create even formation of the frangible cap strips. Cap 110 shown is therefore formed with a multirotoaxial molding direction. Continuous roll molder 360 may further align the molecular direction, as it squeezes, pulls, cuts, forms, and molds thermoplastic sheet material 300 (FIG. 3A) in strategic flow directions that take advantage of the molecular direction present in thermoplastic sheet material.

In the molds of continuous roll molder 360, thermoplastic sheet material 300 may be flowing in a general direction with the entire production line as indicated by the arrows in FIG. 51. The flow channels in the molds may be shaped to divert or deviate thermoplastic sheet material 300 from its straight course to conform to and fill the molds. As thermoplastic sheet material 300 enters the mold, it may be compressed and squeezed in different parts of the flow channels. In certain embodiments, the flow channels have openings that go from smaller to larger, or larger to smaller, depending on where in the mold thermoplastic sheet material 300 is being squeezed into. Some of these flow channels open into areas of the mold that are larger in total volume than the thickness of thermoplastic sheet material 300. These oversized zones in the molds may create spots in the mold for thermoplastic sheet material 300 to flow into and fill up. Thermoplastic sheet material 300 may fill these larger spaces due to the other areas of the mold being smaller and thinner than the thickness of thermoplastic sheet material 300. As thermoplastic sheet material 300 flows through the mold, the thinner areas may squeeze thermoplastic sheet material 300 around through the flow channels, and the only area left in the mold for thermoplastic sheet material 300 to go, may be to fill up and squeeze into the larger zones. This guided squeezing of thermoplastic sheet material 300 may allow for there to be dimensions of the parts being formed that may be thicker and larger than thermoplastic sheet material 300 being used to form the parts.

Flow channels 132 shown in FIG. 51 show the lateral macromolecular flow direction over cap 110. Bottom side 114 of cap 110 is shown in FIG. 51. In some embodiments bottom side 114 may include a circumferential bevel. As shown, flow channels 132 may move over at least a bottom side 114 of cap 110. In an embodiment, flow channels 132 may move over a center 130 of cap 110.

In embodiments, cap 110 may include one or more depressions 117. In some embodiments, bottom side 114 may include a first depression 118. In some embodiments, bottom side may include a second depression 122. In some embodiments, bottom side 114 may include first depression 118 and second depression 122.

In some embodiments, first depression 118 may act as a material anchor or stop to prevent or reduce sliding of thermoplastic sheet material 300 (FIG. 3A). First depression 118 may help to facilitate the flow of thermoplastic sheet material 300 to divert or deviate from its straight course, as shown in FIG. 51. Because the molecules may be aligned in the flow direction, and because of thermoplastic sheet material 300 is moving in the flow direction, thermoplastic sheet material 300 material may prefer to flow in the flow direction, rather than at an angle away from the flow direction. Accordingly, first depression 118 may cause thermoplastic sheet material 300 to conform and fill the molds, particularly in a direction other than the flow direction.

In an embodiment, first depression 118 may include a circular shape. In some embodiments, second depression 122 may be a flow channel to facilitate flow of thermoplastic sheet material 300. In an embodiment, second depression 122 may include a kidney shape. In an embodiment, second depression 122 may have a ramped edge to facilitate material flow. In some embodiments, cap 110 may include a plurality of first depressions 118. In some embodiments, cap 110 may include a plurality of second depressions 122. In some embodiments, cap 110 may include a plurality of first depressions 118 and a plurality of second depressions 122.

Figure 52:
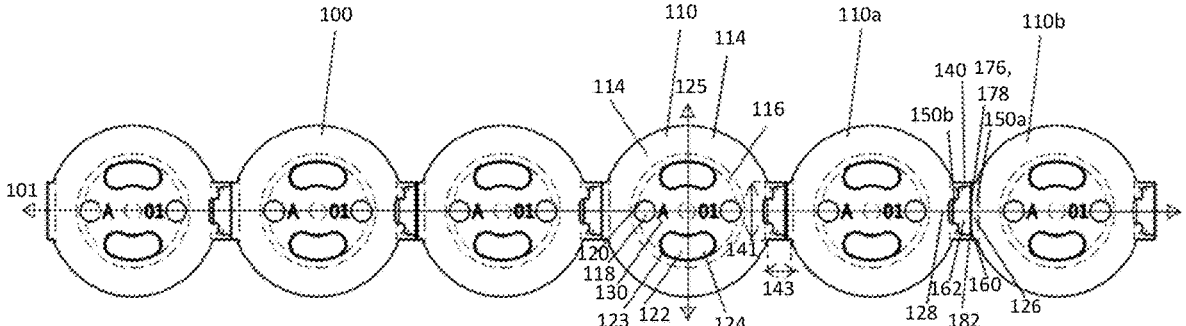
FIG. 52 shows a top view of a frangible cap strip according to various embodiments.

With reference to the embodiment shown in FIG. 52, first depression 118 may be positioned along a first axis 101 extending through center 130 of cap 110. In some embodiments, a plurality of first depressions 118 may be positioned along first axis 101.

Second depression 122 may be positioned along a second axis 125 perpendicular to first axis 101. In some embodiments, a plurality of second depressions 122 may be positioned along second axis 125. As shown in FIG. 52, in some embodiments, first depression 118 may be positioned along an inner circumference 116 of bottom side 114. In some embodiments, second depression 122 may be positioned along inner circumference 116 of bottom side 114. In some embodiments, a plurality of first depressions 118 and a plurality of second depressions 122 may be positioned along inner circumference 116 of bottom side 114. In some embodiments, first depressions 118 and second depressions 122 may be alternately positioned along inner circumference 116 of bottom side 114. In some embodiments, first depression 118 may include a surface area 120. In some embodiments, second depression 122 may include a surface area 124 larger than surface area 120.

FIG. 52 shows a frangible cap strip 100 produced by an embodiment the continuous roll mold process described herein. In some embodiments, frangible cap strip 100 may include molecularly aligned, sheet extruded thermoplastic material, or thermoplastic sheet material 300 (FIG. 3A). As shown, frangible cap strip 100 may include a plurality of caps 110. First axis 101 may extend through center 130 of each cap 110 along frangible cap strip 110.

Figure 53:
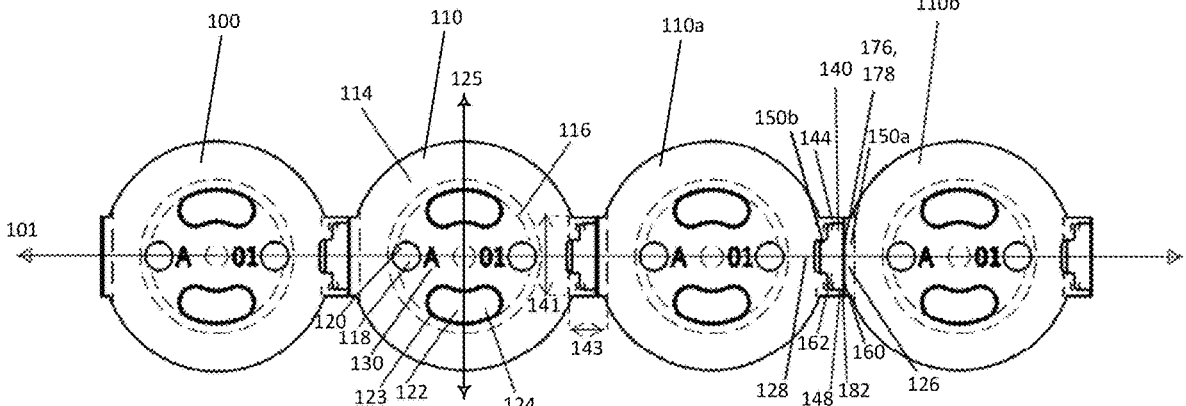
FIG. 53 shows an enlarged top view of the frangible cap strip of FIG. 52.

Each cap 110 may be spaced from one another. In some embodiments, frangible cap strip 100 may include a plurality of frangible tabs 140. Each frangible tab 140 may join adjacent caps 110. In some embodiments, each cap may be between about 0.5 inch by about 0.5 inch and about 2 inches by about 2 inches, such as about 1 inch by about 1 inch. With reference to FIG. 53, in some embodiments, each frangible tab 140 may be devoid of through openings. Each frangible tab may include a length 141. In some embodiments, length 141 may be between about 0.1 inch and about 0.6 inch, such as about 0.3 inch. Each frangible tab may include a width 143. In some embodiments, width 143 may be between about 0.05 inch and about 0.2 inch, such as about 0.1 inch. Each frangible tab 140 may include a frangible zone 160 to shear each cap 110, allowing for release of each cap 100 from frangible cap strip 100.

In some embodiments, each frangible zone 160 may include thermoplastic sheet material 300 (FIG. 3A) having a molecular alignment integrated into thermoplastic sheet material 300 through calendering with continuous roll molds. In some embodiments, the molecular alignment may be in the general direction of first axis 101. The molecular alignment of frangible cap strip 100 may be more linear than the molecular alignment of frangible cap strips that are injection molded. Accordingly, frangible zones 160 may be sheared more easily and more consistently by a non-powered cap feeder tool or a powered cap feeder tool in comparison to injection-molded counterparts.

Frangible zone 160 may facilitate shearing to allow for release of a cap 110 from frangible cap strip 100. For example, FIG. 53 shows a pair of adjacent caps 110, first one of a pair of adjacent caps 110a and second one of the pair of adjacent caps 110b. Frangible zone 160 may facilitate release of second one of the pair of adjacent caps 110b from frangible cap strip 100 while first one of the pair of adjacent caps 110a remains joined in frangible cap strip 100.

In some embodiments, frangible zone 160 may include a depression 162, a shear line 176, and a divot 178 disposed at shear line 176. Accordingly, frangible zone 160 may be bounded by depression 162 and divot 178. In some embodiments, divot 178 may be closer along first axis 101 to first one of the pair of adjacent caps 110a than to second one of the pair of adjacent caps 110b. In some embodiments, divot 178 may be perforated to facilitate shearing at shear line 176. Divot 178 may be a depression along shear line 176 that is kiss cut in the continuous roll molding process. As discussed above, in some embodiments, the continuous roll molding process may impart perforation on divot 178. Accordingly, divot 178 may be partially cut along its length to facilitate shearing at shear line 176. In some embodiments, divot 178 may be cut along its entire length such that shear line 176 is partially cut before being sheared.

In some embodiments, each frangible tab 140 may include a first tab portion 150a formed between divot 178 and first one of the pair of adjacent caps 110a. Similarly, in some embodiments, each frangible tab 140 may include a second tab portion 150b formed between divot 178 and second one of the pair of adjacent caps 110b. In some embodiments, first tab portion 150a may be adjacent a second side 126 of second one of the pair of adjacent caps 110b. In some embodiments, second tab portion 150b may be adjacent a second side 128 of first one of the pair of adjacent caps 110a.

Figures 54A, 54B:
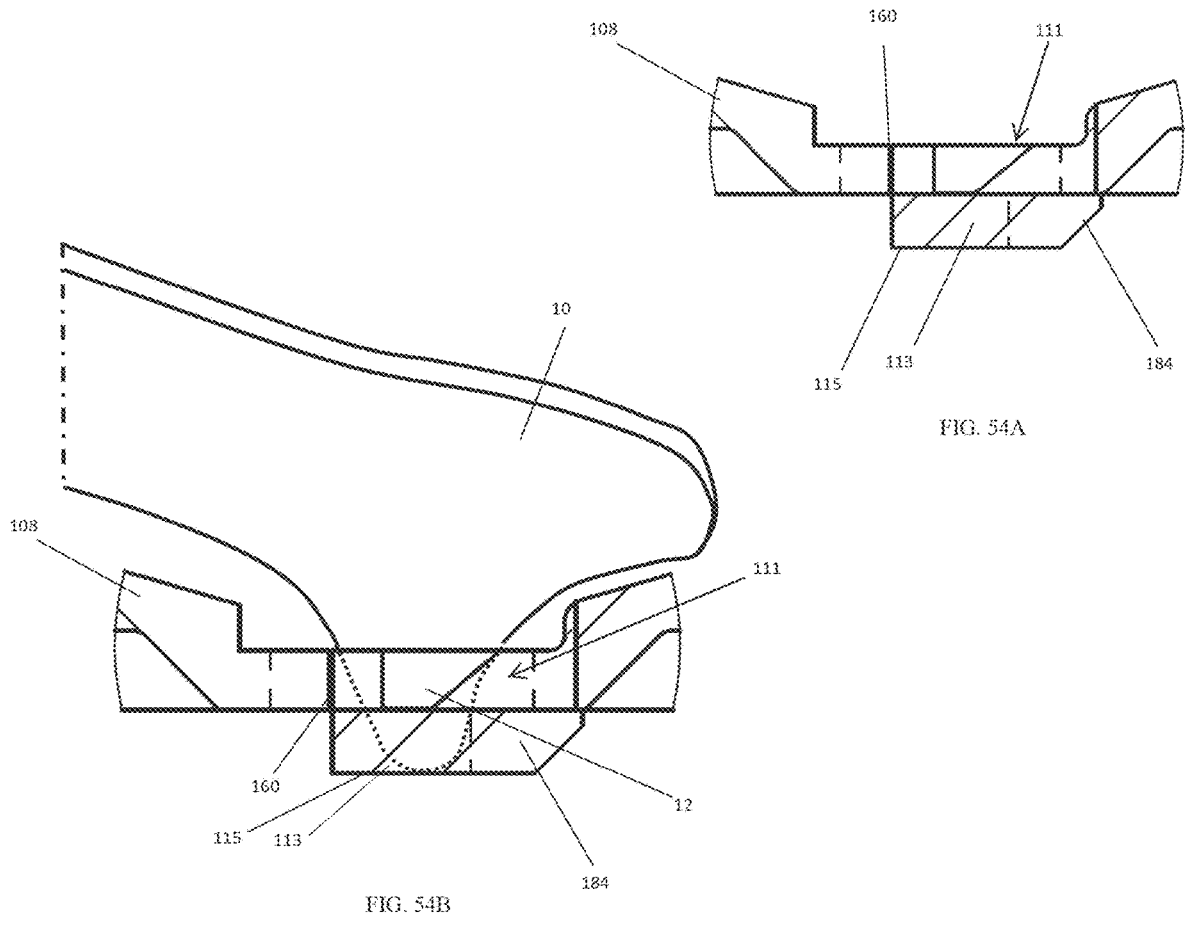
FIG. 54A shows a schematic side view of a frangible cap according to various embodiments.
FIG. 54B shows a schematic side view of a cap feeding mechanism and the frangible cap of FIG. 54A according to various embodiments.

With reference to FIGS. 54A-B, embodiments of frangible cap strip 100 may include a cap feed zone 108 between each cap 110 (FIG. 52). Cap feed zone 108 may include frangible zone 160. As shown, cap feed zone 108 may include a pocket 111 having a base 113 for receiving a cap feeder 10, such as the CH38, CH38A, CN100B, CS150B, and CS58 cap feeders from National Nail and the GCS8116 and LCS6838 cap feeders from the Spotnails division of Peace Industries Ltd. In some embodiments, a lower guide portion or feed finger 12 of cap feeder 10 may engage a sidewall 115 of base 113. Cap feed zone 108 may facilitate conveying frangible cap strip 100 continuously through cap feeder 10 to release caps 110. Other cap feeders may engage frangible cap strip 100 from one or more lateral sides or bottom side 114 of a cap 110.

Figure 55:
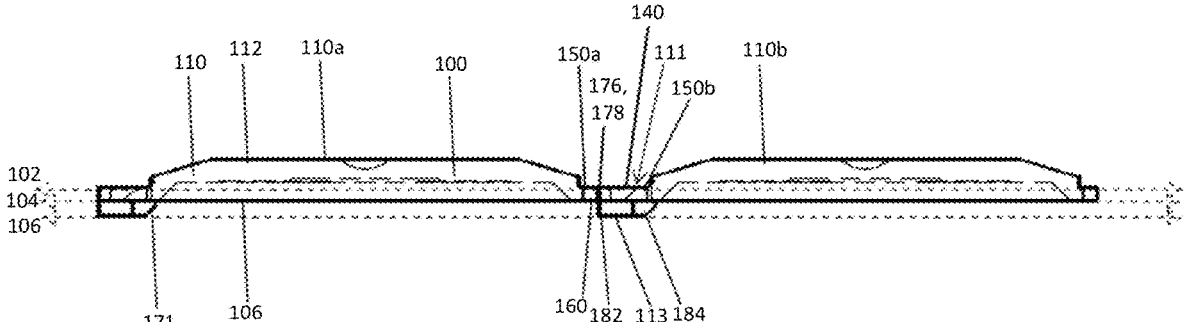
FIG. 55 shows an enlarged side view of the frangible cap strip of FIG. 52.

Referring to FIG. 55, in some embodiments, base 113 may act as a hinge element 184 when being installed with a nail or staple onto a surface. The hinge element 184 may serve to increase compression, and prevent inversion of cap 110 from overshooting or overpressing the cap down onto a work surface as the nail or staple is driven into cap 110. Such inversion may cause cap 110 to unseal from the work surface. In other words, hinge element 184 may increase stability in cap 110 by maintaining cap 110 on the work surface to prevent cap 110 from lifting.

With reference to FIGS. 54A-55, hinge element 184 may extend along a lower plane 106. Lower plane 106 may be below a medial plane 104 defined by bottom side 114 of each cap 110 and an upper plane 102 defined by a top side 112 of each cap 110.

Figure 56:
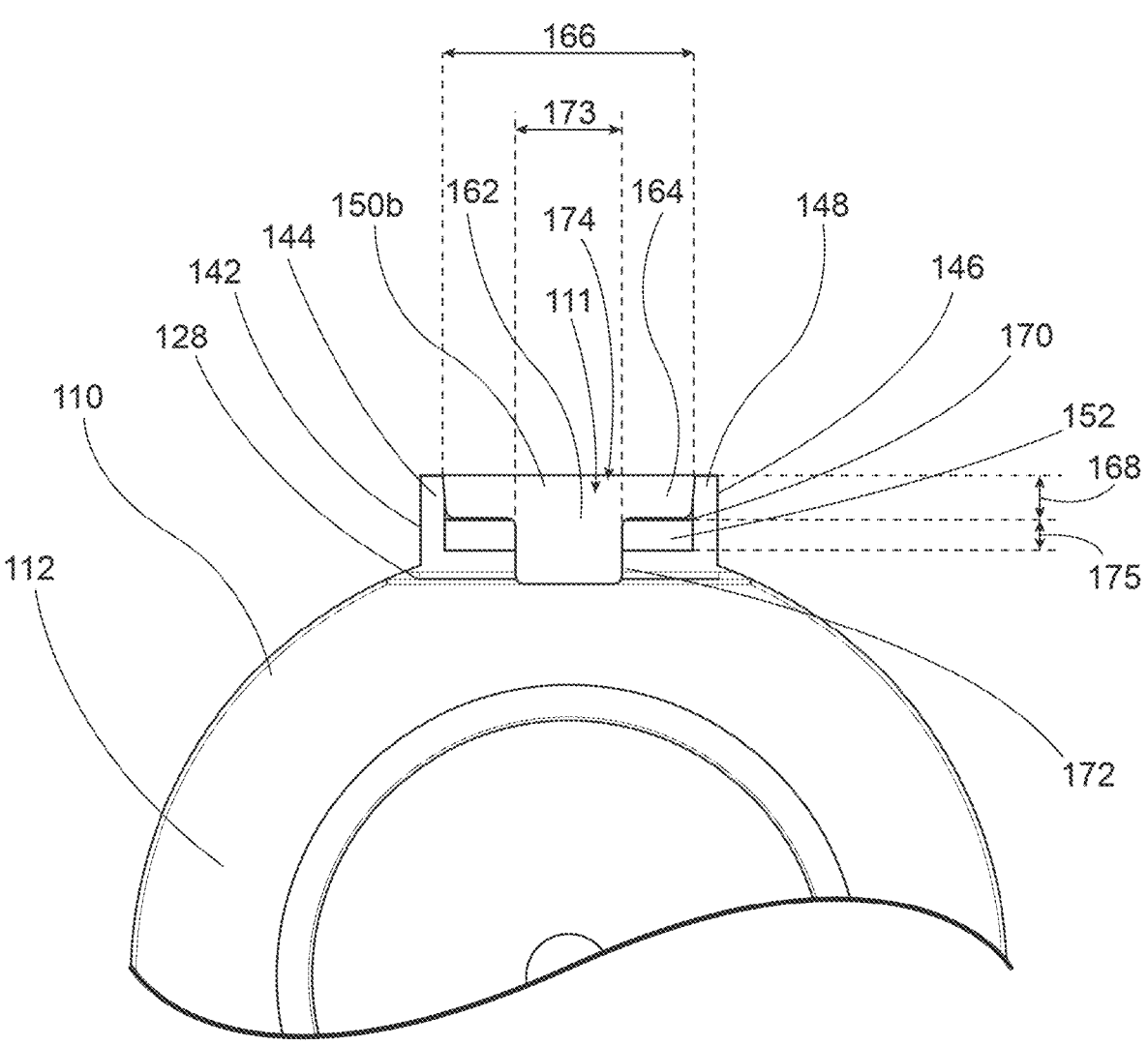
FIG. 56 shows a top view of a frangible cap of FIG. 52.
Figure 57:
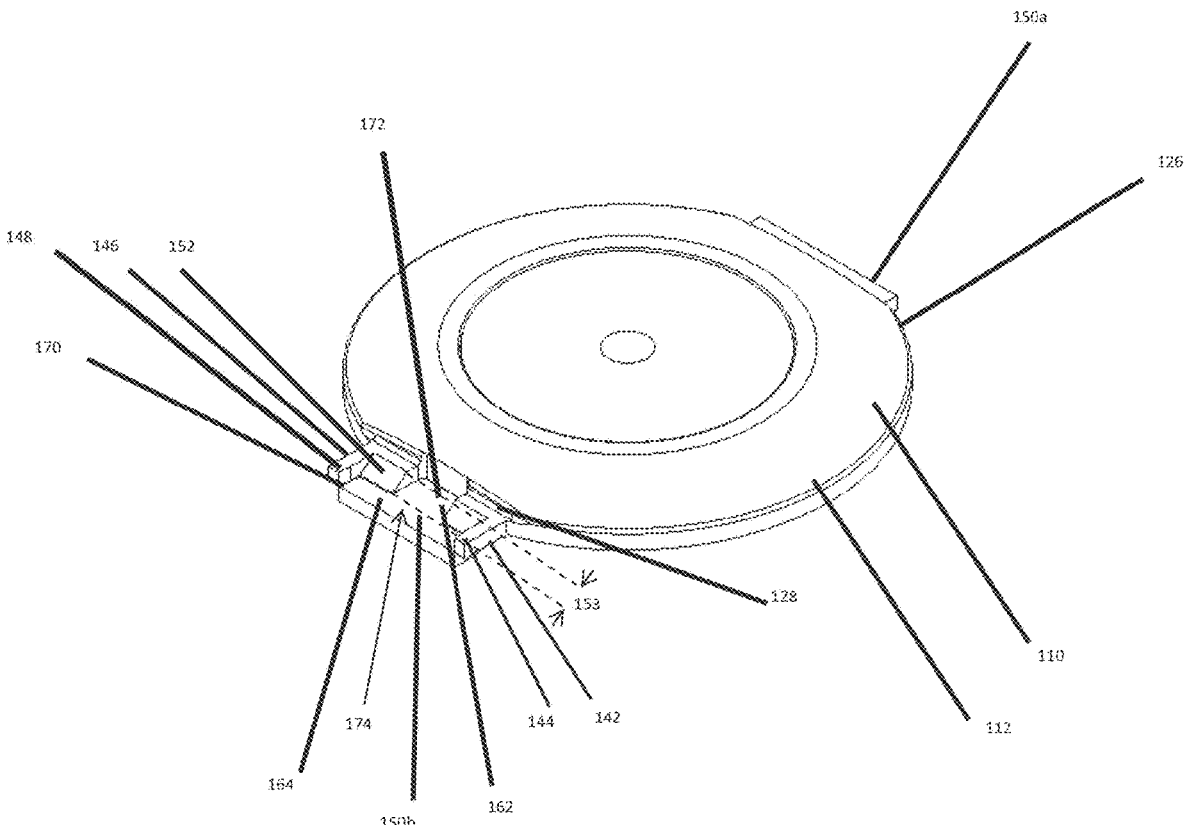
FIG. 57 shows a top perspective view of the frangible cap of FIG. 56.
Figure 58:
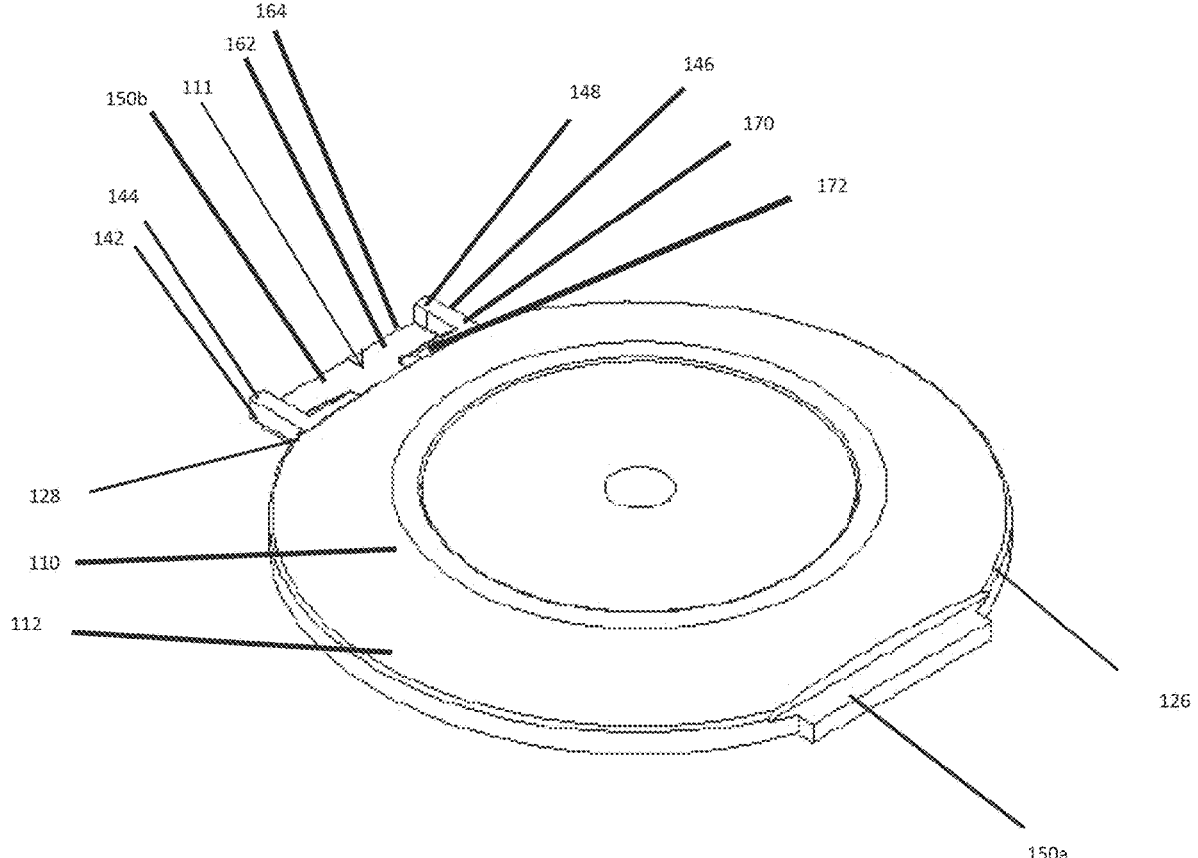
FIG. 58 shows a top perspective view of the frangible cap of FIG. 56.

In embodiments, depression 162 may extend into hinge element 184, as shown with reference to FIGS. 53-55. Accordingly, depression 162 may extend below medial plane Top sides 112 of a cap 110 is shown in FIGS. 56-58. With reference to FIGS. 56-57, in some embodiments, a transition 182 from divot 178 to second tab portion 150b may include a slope or ramp. In some embodiments, a transition 182 from divot 178 to second tab portion 150b may include a curve.

In some embodiments, depression 162 may be substantially T-shaped. As shown, depression 162 may include a first portion 164 and a first portion 172. In some embodiments, first portion 164 and first portion 172 may be the same length. In some embodiments, first portion 164 and first portion 172 may have different lengths. In some embodiments first portion 164 may have a length 166. In some embodiments, first portion 172 may have a length 173 smaller than length 166. In some embodiments, length 166 may be between about 0.2 inch and about 0.4 inch, such as about 0.29 inch. In some embodiments, length 173 may be between about 0.05 inch and about 0.3 inch, such as about 0.15 inch. In some embodiments, first portion 164 may have a width 168. In some embodiments, first portion 172 may have a width 175 equal to width 168. In some embodiments, a transition 174 between first portion 164 and first portion 172 may include a curve.

As shown in FIG. 56-57, in some embodiments, T-shaped depression 162, or depression 162 having first portion 164 and 172, may have an outer edge 172. Outer edge 172 may be a sidewall of base 113 (FIG. 55). In some embodiments, outer edge 172 may engage a cap feeder, such as cap feeder 10 (FIG. 54B), such as a CH38A cap feeder. In some embodiments, outer edge 172 may engage a lower guide portion or feed finger 12 (FIG. 54B) of cap feeder 10.

With reference to FIG. 57, depression 162 may be disposed in second tab portion 150b. As shown, in some embodiments, second tab portion 150b may also include a raised surface 152 disposed between depression 162 and a cap 110. In some embodiments, raised surface 152 may be ramped. In some embodiments, raised surface 152 may be curved. Raised surface 152 may include a depth 153. In some embodiments, depth 153 may be between about 0.2 inch and about 0.8 inch, such as about 0.555 inch.

Figure 59:
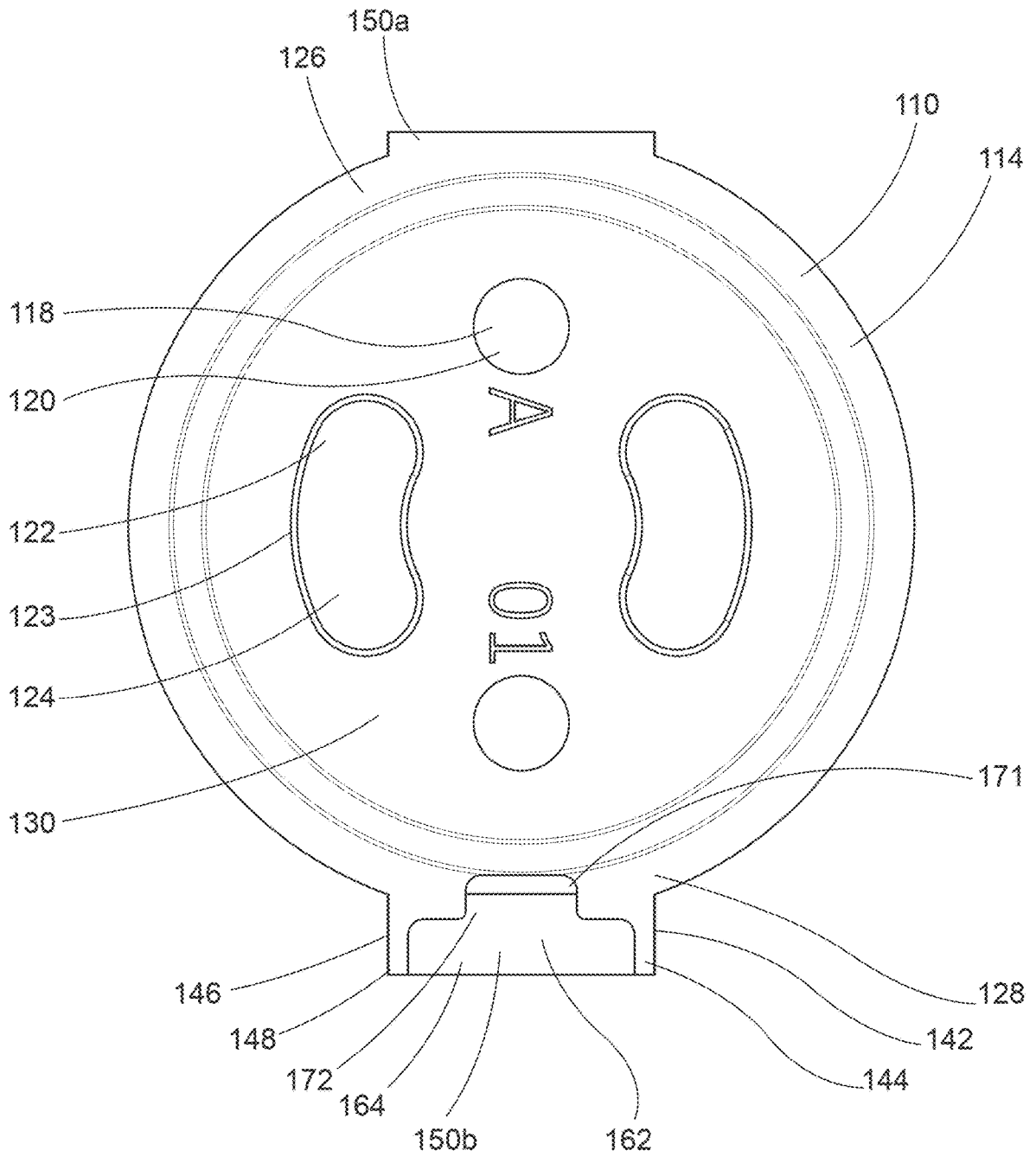
FIG. 59 shows a bottom view of the frangible cap of FIG. 56.
Figure 60:
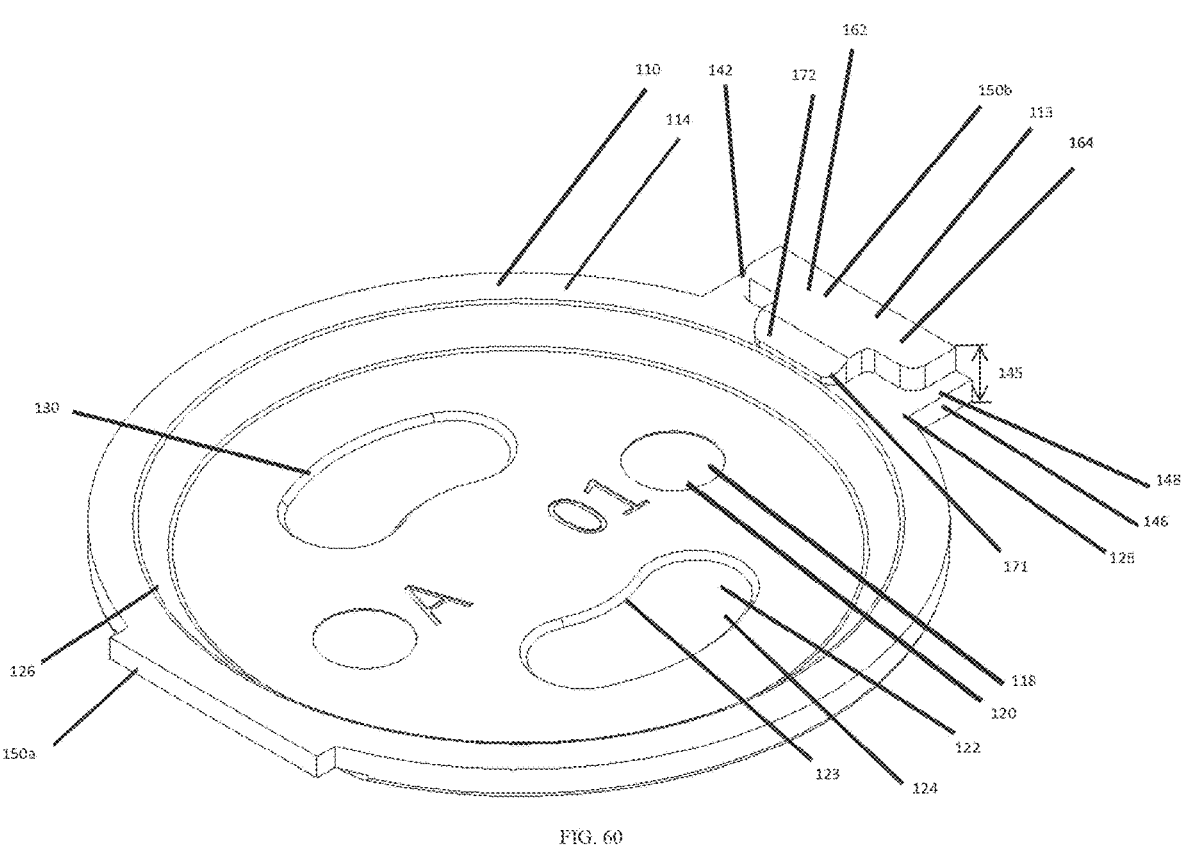
FIG. 60 shows a bottom perspective view of the frangible cap of FIG. 56.

An embodiment of bottom side 114 of a cap 100 is shown in FIGS. 59-60. As shown, depression 162 may include a depth 145. In some embodiments, depth 145 may be between about 0.01 inch and about 0.05 inch, such as about 0.02 inch. In some embodiments, depression 162 may include a shape 171 at transition 174 between first portion 164 and first portion 172. In some embodiments, shape 171 may be a slope or ramp. In other words, shape 171 may extend upwards from lower plane 106 (FIG. 55) toward medial plane 104 (FIG. 55). In some embodiments, shape 171 may be a curve.

Depression 162 may be disposed between ends of second tab portion 150*b*. As shown in FIGS. 59-60, second tab portion 150*b* may include a first end 142 and a second end 146. In some embodiments, a first leg portion 144 may be disposed between first end 142 and depression 162. Similarly, in some embodiments, a second leg portion 148 may be disposed between second end 146 and depression 162. Accordingly, depression 162 may be disposed between first leg portion 144 and second leg portion 148. In some embodiments, depression 162 may extend below first leg portion 144 and second leg portion 148, which may form part of raised surface 152. In some embodiments, first leg portion 144 and second leg portion 148 may each be about 0.015 inches long adjacent length 166.

In some embodiments, thickness of part shapes is increased over the thickness of thermoplastic sheet material 300 (FIG. 3A) after entering the roll molders, due to guided pressuring and squeezing of thermoplastic sheet material 300 through flow channels in continuous roll molder 360. In some embodiments, depression 162 inside the T-shape may be thinner than the surrounding wall. In some embodiments, first depression 118 material anchor or stop may be thinner. In some embodiments, second depression 122 flow channel may be thinner. In some embodiments, the thickness of parts of cap 110 may be increased by more than 30% the original thickness of thermoplastic sheet material 300, such as from 0.045 inches to 0.065 inches.

With reference to FIGS. 51 and 59-60, in some embodiments, first leg portion 144 and second leg portion 148 may be continuous with first tab portion 150*a*. As shown in FIG. 51, first leg portion 144 and second leg portion 148 may be adjacent divot 178, which may be at least partially cut along its length to facilitate shearing at shear line 176. Accordingly, divot 178 may be at least partially cut while first leg portion 144 and second leg portion 148 may be devoid of cuts or openings and may be continuous with first tab portion 150*a*. In this way, first leg portion 144 and second leg portion 148 may facilitate maintaining first one of the pair of adjacent caps 110*a* and second one of the pair of adjacent caps 110*b* in a joined state. In some embodiments, frangible zone 160 may have a tensile strength of about 6 lbs, and in other embodiments between 5 lbs and 7 lbs. In some embodiments, frangible zone 160 may have a shear strength of about two lbs. In contrast, existing frangible zones of frangible cap strips may have a higher shear strength of about six lbs to about eight lbs.

Figure 61:
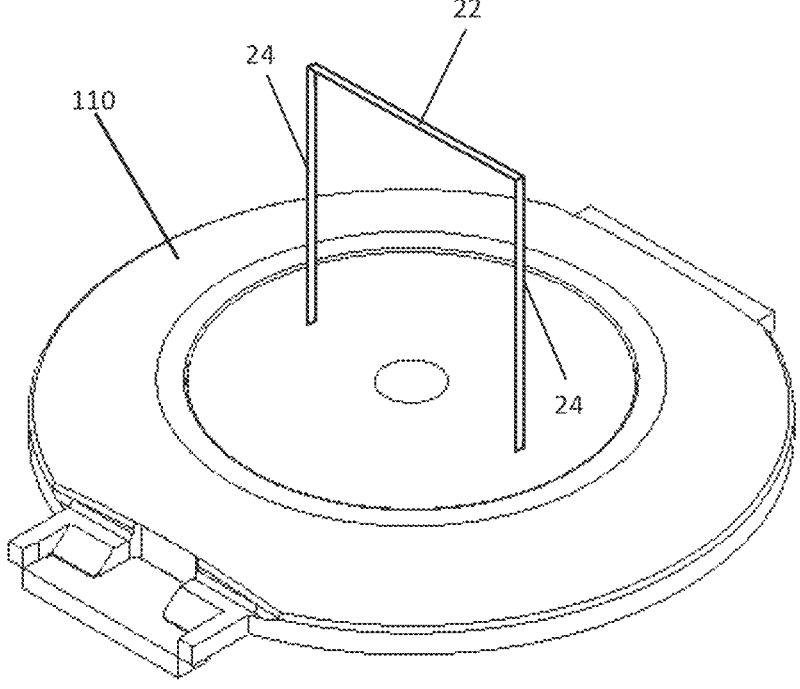
FIG. 61 shows a top perspective view of the frangible cap of FIG. 56.
Figure 63A:
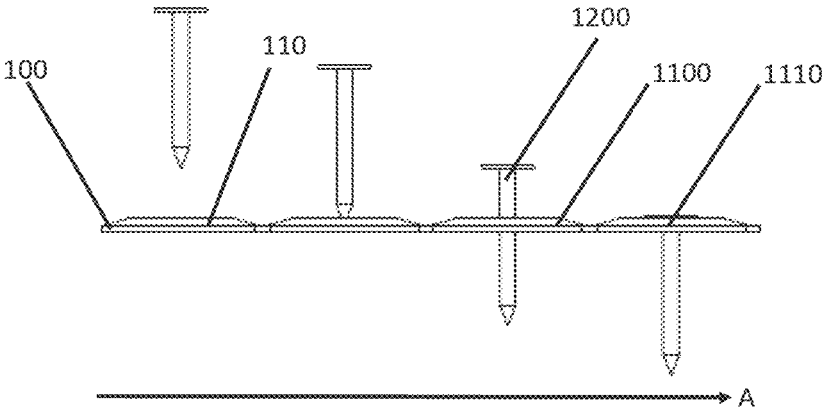
FIG. 63A shows a side view of the nail cap strip of FIG. 62A.
Figure 63B:
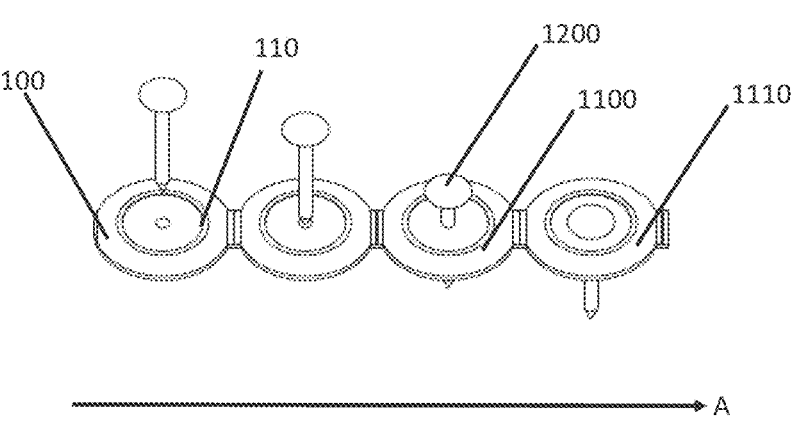
FIG. 63B shows a top perspective view of the nail cap strip of FIG. 62A.

As discussed, the continuous roll molding process may provide a variety of finishes to parts. With reference to FIGS. 60-61, in some embodiments, the gloss finish of lower surface 304 (FIG. 3A) of thermoplastic sheet material 300 (FIG. 3A) may result in a bottom side 114 of caps 110 including a substantially glossy surface. A substantially glossy bottom side 114 of caps 110 may provide better surface contact for caps 110 when they are shot down onto work surfaces (roof felt, house wrap, etc.) and provide better leak and moisture resistance. In contrast, a textured bottom side 114 of caps 110 may allow for moisture to bypass the seal that the cap creates when it is shot down.

As shown in FIG. 61, a cap 110 may be shot down onto a work surface such that a staple 20 may pierce through cap 110. Cap 110 may surround legs 24 of staple 20 such that head 22 is exposed while legs 24 enter the work surface. In some embodiments, the macromolecular flow direction of cap 110 made of crystalline thermoplastic sheet material 300 (FIG. 3A) may facilitate shooting staple 20 through cap 110. This is because the grain structure of crystalline thermoplastic sheet material 300 may split more easily side to side when it is being pierced by a fastener in the depicted vertical direction as legs 24 may have an axis parallel to the molecular grain of thermoplastic sheet material 300.

Referring to FIGS. 62A-64, a process for producing nail cap strip 1100 is shown. In some embodiments, nail cap strip 1100 may be made from the frangible cap strip formed by the continuous roll molding process described herein.

As shown in FIG. 62A, frangible cap strip 100 parts may be conveyed in feed flow direction A along a track, for example. While being conveyed in feed flow direction A, nails 1200 may be introduced proximate to frangible cap strip 100. Nails 1200 may be procured from belts or feeder bowls, for example. With reference to FIGS. 62A-63B, nails 1200 may be pressed down through caps 110 of frangible cap strip 100 to form nail cap strip 1100. In some embodiments, nails 1200 may be continuously pressed down through caps 110 through a feed track with a ceiling until nails 1200 are retained in caps 110. In some embodiments, nails 1200 may be pressed or shot into caps 110 at a rapid pace from a nail press or punch machine. Once nails 1200 are coupled to caps 110, nail cap strip 1100 may be formed.

Figure 64:
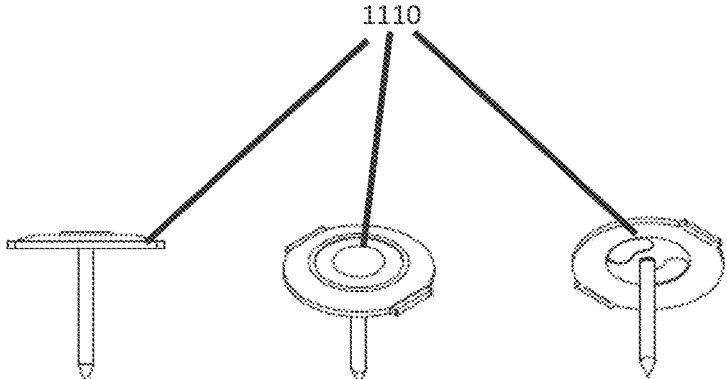
FIG. 64 shows various views of a nail cap of the nail cap strip of FIG. 62A.

At the end of the track following feed flow direction A, nail cap strip 1100 may be spooled, in some embodiments. With reference to FIG. 64, an end user may separate individual nail caps 1110 from nail cap strip 1100 (FIG. 62A). For example, the user may break off a nail cap 1110 as nail cap 1110 is hammered into the work surfaces. In another example, nail caps 1110 may be released from nail cap strip 1110 via a shear on nail cap strip 110A, similar to shear line 176 (FIG. 53) of frangible cap strip 100 (FIG. 53). Loose nail caps 1110 may be packaged in a bin, reducing the labor and machinery needed at a work site to release and utilize nail caps 1110.

Injection molded nail caps, in contrast, create caps individually in single cavity molds. The individual caps are then collected in a bin and transported to an assembly station, where they are dispersed onto a table and manually coupled to nails. The process described herein to produce nail cap strip 1100 (FIG. 62A) via the continuous roll molding process may allow for faster, controlled production without the additional processing required by injection molding.

It should be noted that the use of particular terminology when describing certain features or embodiments of the disclosure should not be taken to imply that the terminology is being re-defined herein to be restricted to include any specific characteristics of the features or embodiments of the disclosure with which that terminology is associated. Terms and phrases used in this application, and variations thereof, especially in the appended claims, unless otherwise expressly stated, should be construed as open-ended as opposed to limiting. As examples of the foregoing, the term "including" should be read to mean "including, without limitation," "including but not limited to," or the like; the term "comprising" as used herein is synonymous with "including," "containing," or "characterized by," and is inclusive or open-ended and does not exclude additional, unrecited elements or method steps; the term "having" should be interpreted as "having at least"; the term "such as" should be interpreted as "such as, without limitation"; the term "includes" should be interpreted as "includes but is not limited to"; the term "example" is used to provide exemplary instances of the item in discussion, not an exhaustive or limiting list thereof, and should be interpreted as "example, but without limitation"; adjectives such as "known," "normal," "standard," and terms of similar meaning should not be construed as limiting the item described to a given time period or to an item available as of a given time, but instead should be read to encompass known, normal, or standard technologies that may be available or known now or at any time in the future; and use of terms like "preferably," "preferred," "desired," or "desirable," and words of similar meaning should not be understood as implying that certain features are critical, essential, or even important to the structure or function of the present disclosure, but instead as merely intended to highlight alternative or additional features that may or may not be utilized in a particular embodiment.

Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should be read as "and/or" unless expressly stated otherwise. The terms "about" or "approximate" and the like are synonymous and are used to indicate that the value modified by the term has an understood range associated with it, where the range may be ±20%, ±15%, ±10%, ±5%, or ±1%. The term "substantially" is used to indicate that a result (e.g., measurement value) is close to a targeted value, where close may mean, for example, the result is within 80% of the value, within 90% of the value, within 95% of the value, or within 99% of the value. Also, as used herein "defined" or "determined" may include "predefined" or "predetermined" and/or otherwise determined values, conditions, thresholds, measurements, and the like.

What is claimed is:

1. A method of forming a strip of frangibly connected parts comprising:
   providing a thermoplastic sheet material; and
   conveying the thermoplastic sheet material through a continuous roll molder comprising a first roller and an opposing second roller,
      the first roller comprising a circumference, and further comprising a first series of first shapes arranged around the circumference of the first roller,
      the second roller comprising a circumference, and further comprising a second series of second shapes arranged around the circumference of the second roller, the first and the second rollers configured so that the first series of first shapes opposes the second series of second shapes to form the strip of frangibly connected parts comprising a three dimensional shape on both sides of the strip of frangibly connected parts,
      a first shape of the first series of first shapes and a corresponding second shape of the second series of second shapes are configured to form a first part of the strip of frangibly connected parts, at least one of the first shapes and the second shapes comprising a projection portion projecting radially from the circumference of the respective first and second roller and is configured for imparting a three-dimensional shape on a surface of the first part of the strip of frangibly connected parts,
the first shape of the first series of first shapes further comprising one or more knives configured to cut the thermoplastic sheet material,
the second shape of the second series of second shapes further comprising one or more anvil surfaces against which the one or more knives of the first shape of the first series of first shapes are configured to cut against,
adjusting a temperature control system to maintain a gap between the one or more knives and the one or more anvil surfaces, wherein the continuous roll molder further comprises one or more channels configured to receive a temperature-controlled fluid of the temperature control system;
cutting the thermoplastic sheet material into the strip of frangibly connected parts utilizing the one or more knives of the first shape of the first series of first shapes and the one or more anvil surfaces of the second shape of the second series of second shapes;
forming a frangible zone between adjacent parts of the strip of frangibly connected parts utilizing the one or more knives of the first shape of the first series of first shapes and the one or more anvil surfaces of the second shape of the second series of second shapes;
separating the strip of frangibly connected parts from a waste thermoplastic sheet material such that the strip of frangibly connected parts and the waste thermoplastic sheet material are separated after cutting the thermoplastic sheet material into the strip of frangibly connected parts.

2. The method of claim 1, wherein providing a thermoplastic sheet material comprises conveying a thermoplastic material through a sheet die to form a thermoplastic sheet material, the thermoplastic sheet material comprising a first surface, a second surface, and an intermediate portion disposed between the first surface and the second surface.

3. The method of claim 2, wherein the thermoplastic sheet material comprises a single layer.

4. The method of claim 2, further comprising:
   between conveying the thermoplastic sheet material through the sheet die to form a thermoplastic sheet material and conveying the thermoplastic sheet material through the continuous roll molder:
   conveying the thermoplastic sheet material through a calendering system configured to reduce a temperature of the first surface and the second surface when conveying the thermoplastic sheet material through the calendering system.

5. The method of claim 1, wherein the continuous roll molder comprises a bar and a nip roller, the bar configured to receive the strip of frangibly connected parts being conveyed along a first stream released from the one or more knives, and the nip roller configured to receive the waste thermoplastic sheet material being conveyed along a second stream released from the one or more anvil surfaces.

6. The method of claim 5, wherein the first stream and the second stream are angled away from one another, an angle between the first stream and the second stream being an obtuse angle.

7. The method of claim 1, wherein the gap comprises a distance of approximately five microns.

8. The method of claim 2, wherein the thermoplastic material comprises high density polyethylene and calcium carbonate.

9. The method of claim 8, wherein the thermoplastic material comprises between about 20% and about 30% calcium carbonate by weight.

10. The method of claim 1, wherein the strip of frangibly connected parts comprises a frangible cap strip comprising:

a plurality of fastening caps arranged consecutively along the frangible cap strip, the fastening caps being spaced from one another;

a plurality of frangible tabs, each of the frangible tabs configured to join adjacent fastening caps and to extend along a first axis extending through a center of each of the fastening caps along the frangible cap strip, each of the frangible tabs comprising:

the frangible zone comprising a divot, the divot being closer along the first axis to a first one of a pair of adjacent fastening caps than to a second one of the pair of adjacent fastening caps;

a first tab portion formed between the divot and the first one of the pair of adjacent fastening caps; and a second tab portion formed between the divot and the second one of the pair of adjacent fastening caps.

11. The method of claim 10, wherein the frangible zone further comprises a depression and a shear line, wherein the divot is disposed at the shear line, and wherein the depression is disposed at the second tab portion.

12. The method of claim 11, wherein the depression of each of the frangible tabs extends below a medial plane defined by a bottom side of each of the fastening caps.

13. The method of claim 11, wherein the depression of each of the frangible tabs is substantially T-shaped.

14. The method of claim 10, wherein the second tab portion is configured to form a hinge configured to increase compression, and prevent inversion of the fastening cap from overshooting or overpressing the fastening cap down onto a working surface.

15. The method of claim 10, wherein the frangible zone comprises a thermoplastic material having a molecular alignment, and wherein the molecular alignment is in a general direction of the first axis.

16. The method of claim 10, wherein the method does not comprise injection molding.

17. The method of claim 10, wherein each of the fastening caps comprises a top side and a bottom side opposing the top side, each of the bottom sides comprising at least one depression, and wherein the at least one depression comprises at least one of a kidney shape and a circular shape.

\* \* \* \* \*